3,271,390
SULFURENIC ACID AND DERIVATIVES
THEREOF
Josef Fried, Princeton, N.J., assignor, by mesne assignments, to E. R. Squibb & Sons Inc., New York, N.Y., a corporation of Delaware
No Drawing. Filed Sept. 13, 1963, Ser. No. 308,677
20 Claims. (Cl. 260—239.5)

This invention relates to and has as its object the provision of new physiologically active steroids, processes for their preparation and novel intermediates useful in said preparation.

The final products of this invention may be represented by the following formulae

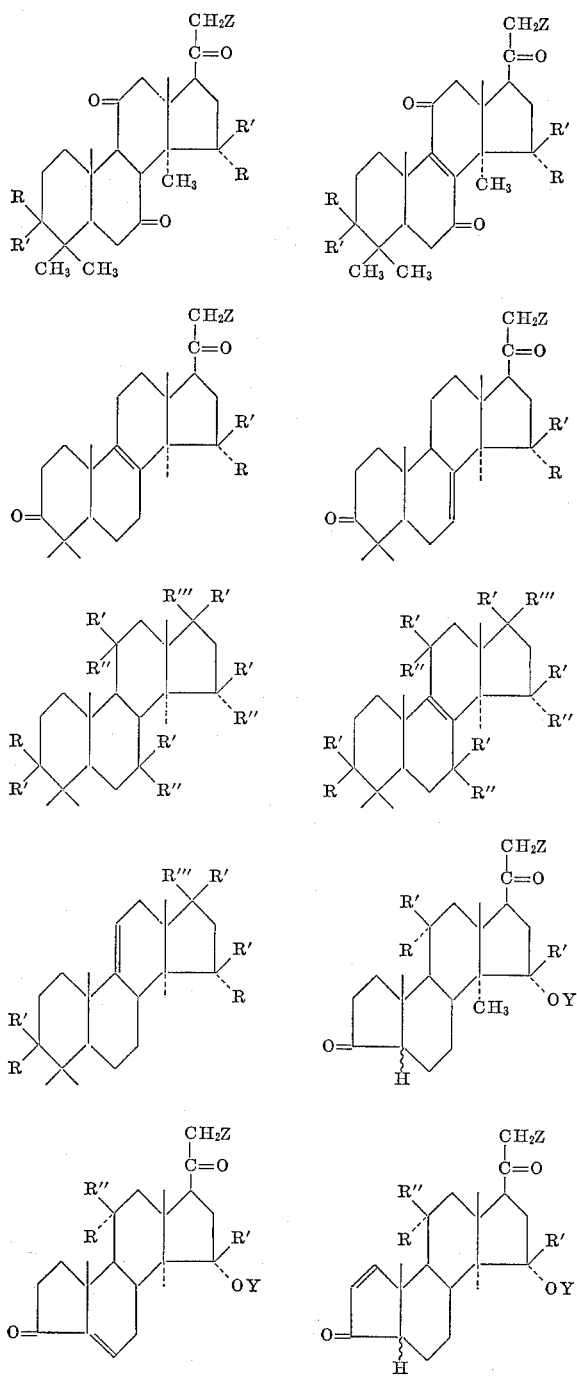

and wherein R' is hydrogen; each R is selected from the group consisting of hydroxy and acyloxy; and together R and R' is oxo(O=); Y is acyl; and together R' and OY is oxo(O=); each R'' is selected from the group consisting of hydrogen and hydroxy; and together R' and R'' is oxo(O=); R''' is selected from the group consisting of hydroxy, acyloxy and alkanoyloxy; and together R' and R''' is oxo(O=); and Z is selected from the group consisting of hydrogen, hydroxy, halogen (e.g., chloro, fluoro, bromo, iodo) and acyloxy.

The preferred acyl and acyloxy radicals are those of hydrocarbon carboxylic acids of less than twelve carbon atoms, as exemplified by the lower alkanoic acids (e.g., acetic, propionic, butyric and tert-pentanoic acid), the lower alkenoic acids, the monocyclic aryl carboxylic acids (e.g., benzoic and toluic acid), the monocyclic aryl lower alkanoic acids (e.g., phenacetic and β-phenylpropionic acid), the cycloalkane carboxylic acids and the cycloalkene carboxylic acids.

The alkanoyl groups preferably employed in the practice of this invention may be either straight or branched chain and are those having less than ten carbon atoms, for example, hexanoyl, pentanoyl, heptanoyl, lower alkyl-alkanoyl, such as methyl-hexanoyl, or di-lower alkyl alkanoyl, such as dimethyl-hexanoyl.

[In this application and in the appended claims, whenever in the formulae set forth herein line (ʃ) is employed in the linkage of atoms, it is meant to denote that the connected atom may be either in the alpha or beta position, as is determined in the respective compounds involved.]

Those final pregnane and A-nor pregnane products of this invention which are unsubstituted in the 21-position (i.e., Z is hydrogen or halogen) are physiologically active compounds which possess progestational activity and thus can be employed instead of progesterone, for example, in the treatment of habitual abortion for which purpose they can be administered in the same manner as progesterone, for example, the dosage being adjusted for the relative potency of the particular steroid. Those final products of this invention which are oxygenated in the 21-position (i.e., Z is hydroxy or acyloxy) are physiologically active compounds which possess mineralocorticoid activity and thus can be employed instead of desoxycorticosterone, for example, in the treatment of Addison's disease, for which they can be administered in the same manner as desoxycorticosterone, for example, the dosage being adjusted for the relative potency of the particular steroid.

In addition, it has been found that the A-nor compounds of this invention are physiologically active steroids which possess antiandrogenic activity, i.e., they inhibit the action of androgens, and they can be used in the treatment of such conditions as hyperandrogenic acne. The compounds may be formulated for such administration, the concentration and/or dosage being based on the activity of the particular compound and the requirements of the patient.

The androstane final products of this invention are physiologically active steroids which possess protein-anabolic activity and which may be used in place of such known protein-anabolic steroids as 17-ethyl-19-nortestosterone in the treatment of post-operative shock and other conditions where tissue degeneration has occurred. Administration of the products of this invention may be accomplished either perorally or parenterally, in the same manner as 17-ethyl-19-nortestosterone, for example, the dosage and/or concentration being adjusted for the relative potency of the particular steroid. In addition, compounds of this invention are physiologically active steroids which possess androgenic activity and may be used in place of such known androgenically active steroids as testosterone in the treatment of enuchoidism being formulated for such administration in the same manner and/or dosage as testosterone.

The final products of this invention may be prepared by the processesses of this invention beginning with the novel starting material employable in the practice thereof.

To prepare the starting material which may be employed in this invention, a new compound, hereinafter referred to as sulfurenic acid, having the structural formula A, is first prepared. This compound may be prepared by first following the procedures set forth by Gascoigne, et al., Journal of the Chemical Society, (1951), pp. 2346–2352. Generally, the procedure set forth teaches that a fungus, *Polyprous sulfureus* may be grown on a modified Williams-Saunders medium (Biochem. J., 1934, 28, 1887) with glucose (100 g. per liter) in place of sucrose and glycine (2 g. per liter) in place of asparagine. The washed mycelium is then dried, milled to a fine powder, and extracted in a Soxhlet, first with light petroleum (B.P. 40–60° C.) to remove fat and then exhaustively with ether or chloroform, preferably the latter. The chloroform extract thus obtained is then fractionated, the higher melting eburicoic acid fraction removed by crystallization and a lower melting fraction, rich in sulfurenic acid obtained. This sulfurenic acid fraction may then be purified by conversion into the mixture of methyl esters and crystallized from methanol from which methyl sulfurenate crystallizes preferentially. The latter is one of the starting materials for the products of this invention. The preparation of these derivatives may be represented by the following equations wherein R, R' and R'' may be hydrogen, alkyl, acyl or alkylene and YO may be hydroxy, acyloxy or oxo(O=):

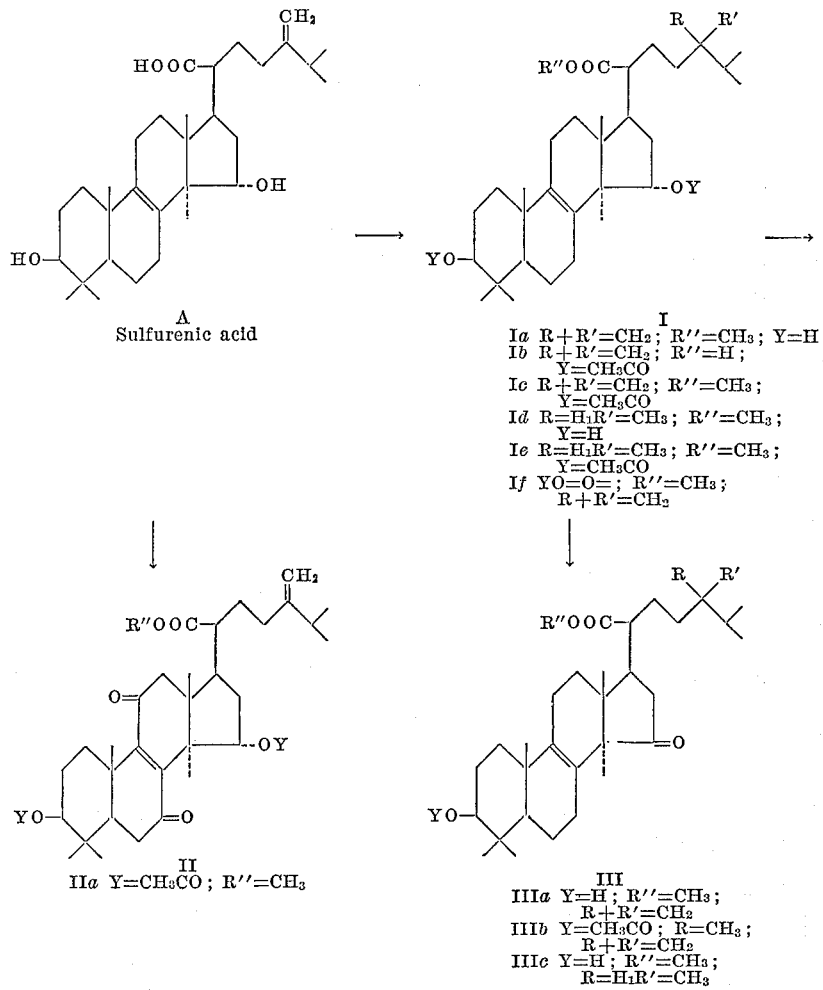

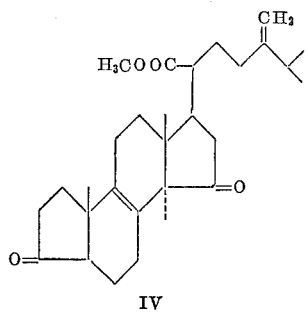

IV

Initiallly, sulfurenic acid (Compound A) derived from the aforementioned fermentation process is alkylated as by treatment with an alkylating agent (e.g., ethereal diazomethane) to yield the sulfurenic acid alkyl ester (Compound Ia). Treatment of the sulfurenic acid alkyl ester (Compound Ia), with an acylating agent, e.g., an acid anhydride or acyl halide, for example acetic anhydride or benzoyl chloride in the presence of a nitrogen base (e.g., pyridine) yields the alkyl 3,15-diacyl sulfurenate (Compounds Ic), which are new compounds of this invention.

The diacyl sulfurenate (Compounds Ic) may then be hydrolyzed to the diacyl sulfurenic acid (Compounds Ib) which are also new compounds of this invention by treatment with a nucleaphilic reagent, for example, lithium iodide in a base, such as collidine.

To obtain the 24(28) dihydro derivatives of sulfurenic acid, alkyl sulfurenate (Compound Ia) is first reduced as by treatment with palladium on charcoal, to yield the alkyl dihydrosulfurenate (Compounds Id), which are also new compounds of this invention. Compound Id may then be acylated as by treatment with an acylating agent, such as an acid anhydride or acyl halide in the presence of a base to yield the alkyl diacyl dihydrosulfurenate (Compounds e), which are also new compounds of this invention.

The 3,15-diketo derivatives of alkylsulfurenate (Compounds If) may be prepared by oxidizing the alkyl sulfurenate (Compounds Ia) by treatment with chromium trioxide in an acid medium, to yield other new starting materials of this invention.

The 15-keto derivatives of this invention (Compounds III) which are also new starting materials may be prepared by first reducing the diketo sulfurenate (Compounds If) as by treatment with potassium borohydride, to yield the 15-keto eburicoates (Compounds IIIa), which are also new compounds of this invention. Compounds IIIa may then be acylated to yield the 3-acyl derivative of 15-keto eburicoate (Compounds IIIb) which are also new compounds of this invention. Compounds IIIa may also be reduced as by treatment with palladium on barium sulfate to obtain the 24(28) dihydro derivatives of 15-keto eburicoate (Compounds IIIc) which are also new starting materials of this invention.

The 24(28)-dihydro derivatives of 15-keto eburicoate (Compounds IIIc) may then be subjected to a retropinacol rearrangement with phosphorus pentachloride to yield the 15-keto-A-nor-Δ⁸-derivatives of alkyl sulfurenate (Compounds IV) which are also new starting compounds of this invention.

Additional starting materials may be obtained by treating the alkyl diacyl dehydrosulfurenate (Compounds Ie) with an oxidizing agent, such as chromium trioxide, to yield the diacyl - 7,11 - diketodehydroeburicoate (Compounds II) which are also new compounds of this invention.

The preparation of the new starting material may be illustrated by the following examples (all temperatures being in degrees centigrade):

EXAMPLE AA

*Sulfurenic acid methyl ester (Ia).*—In fractionating the triterpene acids from *Polyporus sulfureus*, as described by Gascoigne et al. (J. Chem. Soc. [1951] 2346 et seq.) there is obtained from the chloroform extract (employing chloroform in place of the ether of Gascoigne et al.) of the mycelium after removal of the bulk of the eburicoic acid by crystallization a lower melting fraction (M.P. 255–260°) which is rich in sulfurenic acid. Ten grams of this material is suspended in methanol and an ethereal solution of diazomethane is added until methylation is complete. The solution is filtered from a small amount of insoluble residue and the solvents are evaporated in vacuo. The residual gum is taken up in methanolchloroform which results in the crystallization of 4.8 grams of practically pure sulfurenic acid methyl ester (Ia), melting at 190–192°. Recrystallization from acetone gives the pure compound without change in melting point $[\alpha]_D^{23}$ +66° (c., 0.42 in chloroform):

$\lambda_{Max.}^{KBr}$ 2.83, 3.01, 5.84, 6.08, and 11.27μ

*Analysis.*—Calc'd for $C_{32}H_{52}O_4$ (507.3): C, 76.75; H, 10.47; OMe, 6.02. Found (after drying at 140 for four hours): C, 76.61; H, 10.67; OMe, 5.73.

EXAMPLE BB

*Methyl 3,15-diacetyl sulfurenate (Ic).*—One hundred mg. of methyl sulfurenate (Ia) is acetylated with 0.5 ml. of acetic anhydride for 20 hours at room temperature. After removal of the reagents in vacuo, the crude crystalline material is recrystallized from methanol. The resulting diacetate (Ic) has the following properties: M.P. 138–140°; $[\alpha]_D^{23}$ +67° (c., 0.41 in chloroform):

$\lambda_{Max.}^{KBr}$ 5.78, 6.09, 8.05μ

*Analysis.*—Calc'd for $C_{36}H_{56}O_6$ (584.81): C, 73.93; H, 9.65. Found: C, 73.61; H, 10.00; C, 74.03; H, 9.59; C, 74.16; H, 9.61.

EXAMPLE CC

*Diacetyl sulfurenic acid (Ib).*—A solution of 250 mg. (0.5 mm.) of methyl sulfurenate (Ia) and 435 mg. of dried lithium iodide (3.3 mm.) in 10 ml. of anhydrous collidine is refluxed under helium for 18 hours. The reaction mixture is then poured onto ice and 2 N hydrochloric acid and the resulting suspension extracted with methyl isobutyl ketone. The methyl isobutyl ketone extract is evaporated to dryness in vacuo, and the residue (153 mg.) is acetylated with 4 ml. of anhydrous pyridine and 2 ml. of acetic anhydride for 18 hours at room temperature. After removal of the reagents in vacuo, the mixture is distributed between dilute sulfuric acid and chloroform and the cholorform extract washed with water, dried over sodium sulfate and evaporated to dryness in vacuo. The resulting residue (135 mg.) is taken up in hexane, a small amount of residual material removed by centrifugation and the hexane solution evaporated to dryness. The residue crystallizes readily from methanol furnishining 71 mg. of diacetylsulfurenic acid (Ib) possessing the following properties: M.P. 234–235°; $[\alpha]_D^{23}$ +58° (c., 1.00 in chloroform):

$\lambda_{Max.}^{KBr}$ 5.76, 5.87, 6.08, 8.04 and 11.28μ

*Analysis.*—Calc'd for $C_{35}H_{54}O_6$: C, 73.65; H, 9.54. Found: C, 73.76; H, 9.43.

EXAMPLE DD

*Sulfurenic acid.*—A suspension of 30 mg. of diacetyl sulfurenic acid (Ib) in 3 ml. of 0.7 N methanol-KOH is stirred at room temperature for 20 hours under a blanket of helium. The resulting methanol is acidified to pH 2 with 4 N sulfuric acid and the mixture extracted with large volumes of hot methyl isobutyl ketone. The methyl isobutyl ketone extract is washed with water and evaporated to dryness in vacuo. The resulting residue on crystallization from acetone furnishes 13 mg. of pure sulfurenic acid (A) M.P. 252–254°; $[\alpha]_D^{23}$ +42° (c., 0.51 in anhydrous pyridine).

$\lambda_{Max.}^{KBr}$ 2.95, 5.90, 6.08, 11.27μ

*Analysis.*—Calc'd for $C_{31}H_{58}O_4$ (486.71): C, 76.50; H, 10.36. Found (after drying at 135° for 2½ hours): C, 76.73; H, 10.18.

EXAMPLE EE

*Sulfurenic acid (A).*—Into a solution of 1 g. of methyl sulfurenate (Ia) in 50 ml. of freshly distilled tetrahydrofuran is passed ammonia gas with cooling until a total of 100 ml. has condensed. The methyl sulfurenate precipitates out and is present as a fine suspension. Small pieces of lithium are added with stirring and the flask removed from the cooling bath. The addition of lithium is continued until there is a persistent blue color and the ammonia is permitted to evaporate. A small amount of methanol is then added to dissolve the residual lithium. The mixture is acidified to pH 2 with dilute sulfuric acid and extracted with methyl isobutyl ketone. The resulting methyl isobutyl ketone extract is extracted with 1 N aqueous sodium hydroxide until all the acid has been removed from the methyl isobutyl ketone extract. The aqueous extracts are washed once with methyl isobutyl ketone and acidified with 2 N sulfuric acid to pH 2. The precipated acids are extracted again with hot methyl isobutyl ketone, the methyl isobutyl ketone extracts washed with water and evaporated to dryness in vacuo. The resulting residue (485 mg.) which consists essentially of the very insoluble sulfurenic acid is recrystallized from tetrahydrofuran-acetone and yields a total of 200 mg. of pure sulfurenic acid (A), identical in every respect with the acid prepared by the procedure of Example DD.

EXAMPLE FF

*Methyl dihydrosulfurenate (Id).*—To a prereduced suspension of 1.5 g. of 10% palladium on charcoal in 40 ml. of ethyl acetate is added a solution of 1.5 g. of methyl sulfurenate (Ia) in 100 ml. of ethyl acetate and the resulting mixture agitated in the presence of hydrogen until uptake is complete which requires a total of two hours and thirty minutes. Total uptake—95 ml. of hydrogen. Calc'd for 1 mole: 75 ml. The catalyst is removed by filtration and the solution evaporated to dryness in vacuo. The residue on recrystallization from methanol furnishes 1.27 g. of methyl dihydrosulfurenate (Id) possessing the following properties: M.P. 200–202°; $[\alpha]_D^{23}$ +65° (c., 0.46 in chloroform);

$\lambda_{Max.}^{KBr}$ 2.95, 5.77, 5.84μ

*Analysis.*—Calc'd for $C_{32}H_{54}O_4$ (502.75): C, 76.44; H, 10.83. Found: C, 76.32; H, 10.87.

Evaporation of the lowest mother liquor furnishes an isomer of methyl dihydrosulfurenate (112 mg.), isomeric at C–24 with the compound described above, as shown by acetylation to be described in the following examples.

EXAMPLE GG

*Methyl diacetyl dihydrosulfurenate (Ie).*—Five hundred mg. of methyl dihydrosulfurenate (Id) is acetylated with 5 ml. of pyridine and 10 ml. of acetic anhydride for a total of 24 hours. Removal of the reagents furnishes a residue which is recrystallized from methanol. Recrystallization from that same solvent furnishes pure methyl diacetyl dihydrosulfurenate (Ie) of the following properties: M.P. 140–142°; $[\alpha]_D^{23}$ +67° (c., 0.42 in chloroform);

$\lambda_{Max.}^{KBr}$ 5.78, 8.05μ

*Analysis.*—Calc'd for $C_{36}H_{58}O_6$ (586.82): C, 73.68; H, 9.96. Found (after drying at 110° for four hours): C, 74.80; H, 9.91.

The lowest mother liquor material obtained in the catalytic hydrogenation (Example FF) of methyl sulfurenate (112 mg.) is acetylated with 1 ml. of pyridine and 2 ml. of acetic anhydride for 24 hours. The reagents are removed in vacuo and the residue dissolved in benzene and filtered through a small amount of neutral alumina (activity I). Evaporation of the benzene gives 105 mg. of crude diacetate which is further purified by preparative thin layer chromatography. The pure 24-isomer of methyl diacetyldihydrosulfurenate has the following properties: 153–155ö; $[\alpha]_D^{23}$ +55° (c., 0.48 in chloroform):

$\lambda_{Max.}^{KBr}$ 5.75, 805μ

*Analysis.*—Calc'd for $C_{36}H_{58}O_6$ (586.2): C, 73.68; H, 9.96. Found: C, 73.76; H, 10.06.

EXAMPLE HH

*Methyl-$\Delta^{8,24(28)}$-eburicadiene-3,15-dione-21-oate (If).*—To a solution of 1 gram of methyl sulfurenate (Ia) in 25 ml. of acetone is added at room temperature with stirring 1.9 ml. of Jones reagent (200 mg. of chromium trioxide and 320 mg. of sulfuric acid in 1 ml. of water), dropwise at room temperature. After 25 minutes at room temperature methanol is added dropwise to reduce the excess chromium trioxide. Water is then added and the bulk of the acetone is evaporated in vacuo. The residue is extracted with chloroform, the chloroform extract washed with water, dried over sodium sulfate and evaporated to dryness in vacuo. The crude residue upon recrystallization from methanol furnishes the pure methyl-$\Delta^{8,24(28)}$-eburicadiene-3,15-dione - 21 - oate (If) (743 mg.) possessing the following properties: M.P. 141–143°; $[\alpha]_D^{23}$ +73.5° (c., 0.40 in chloroform):

$\lambda_{Max.}^{KBr}$ 5.75, 5.85, 6.08, 11.29μ

*Analysis.*—Calc'd for $C_{32}H_{48}O_4$ (496.70): C, 77.37; H, 9.74. Found: C, 77.23; H, 9.65.

EXAMPLE JJ

*Methyl 15-keto-eburicoate (IIIa).*—To a solution of 100 mg. of potassium borohydride in 30 ml. of water and 30 ml. of dioxane is added at room temperature with stirring a solution of 300 mg. of methyl-$\Delta^{8,24(28)}$-eburicadiene-3,15-dione-21-oate (If) in 30 ml. of dioxane. The reaction is allowed to proceed for 45 minutes at room temperature, after which time excess potassium borohydried is destroyed by the addition of glacial acetic acid. The mixture is taken up in chloroform, the chloroform-dioxane phase washed with water, and evaporated to dryness in vacuo. Crystallization of the residue from methanol furnishes 268 mg. of material melting at 130–132° and in addition 120 mg. melting at 118–120°. The analytically pure methyl 15-keto-eburicoate (IIIa) has the following properties: M.P. 130–132° (solvated); $[\alpha]_D^{23}$ +71° (c., 0.47 in chloroform):

$\lambda_{Max.}^{KBr}$ 2.92, 5.77, 6.10 and 11.28$\mu$

*Analysis.*—Calc'd for $C_{32}H_{50}O_4$ (498.72): C, 77.06; H, 10.11. Found: C, 76.66; H, 9.99.

EXAMPLE KK

*Methyl acetyl-15-keto-eburicoate (IIIb).*—A solution of 240 mg. of methyl 15-keto-eburicoate (IIIa) (solvated) in 3 ml. of anhydrous pyridine and 0.5 ml. of acetic anhydride is allowed to remain at room temperature overnight. After removal of the reagents in vacuo, the residue is recrystallized from methanol and furnishes 217 mg. of the pure methyl acetyl-15-keto-eburicoic (IIIb) possessing the following properties: M.P. 165–166°; $[\alpha]_D^{23}$ +67° (c., 1.95 in chloroform):

$\lambda_{Max.}^{KBr}$ 5.77, 6.10, 8.08 and 11.15$\mu$

*Analysis.*—Calc'd for $C_{33}H_{52}O_5$ (528.75): C, 74.96; H, 9.91. Found: C, 75.07; H, 9.76.

EXAMPLE LL

*Methyl 15-keto-dihydroburicoate (IIIf).*—To a prereduced suspension of 80 mg. of 5% palladium on barium sulfate in 20 ml. of ethyl acetate is added a solution of 200 mg. of methyl 15-keto-eburicoate (IIIa) in 20 ml. of ethyl acetate. The reduction is continued until hydrogen uptake is complete (11.0 ml.). Theory for 1 mole—10 ml. The catalyst is removed by filtration and the filtrate evaporated to dryness in vacuo. The residual material after recrystallization from methanol melts at 144–150° and is strongly solvated. Recrystallization from acetonitrile gives methyl 15-keto-dihydroeburicoate (IIIc) that melts at 144–148°; $[\alpha]_D^{23}$+62° (c., 1.00 in chloroform).

*Analysis.*—Calc'd for $C_{33}H_{52}O_4$ (500.73): C, 76.5; H, 10.47. Found: (after drying at 100° for four hours) C, 76.70; H, 10.41.

EXAMPLE MM

*Wolff-Kishner reduction of methylacetyl-15-keto-eburicoate (IIIb) to methyl eburicoate.*—Ten ml. of 95% hydrazine hydrate and 10 grams of sodium hydroxide pellets is refluxed for three hours and then a sufficient amount of the dried hydrazine is distilled into 10 ml. of redistilled diethylene glycol, in which 200 mg. of sodium has been dissolved and which has been preheated to 180°, to insure reflux of the mixture at 180°. The mixture is then cooled to room temperature and 100 mg. of vacuum-dried (100°) methyl acetyl-15-keto-eburicoate (IIIb) is added. The resulting solution is then refluxed for 18 hours at 180°, after which time hydrazine is distilled off to secure reflux of the solution at 210° (measured in the liquid) for 24 hours. The cooled mixture is acidified with 4 N sulfuric acid and taken up in methyl isobutyl ketone and water. The aqueous phase is extracted several times with methyl isobutyl ketone and the combined methyl isobutyl ketone extracts evaporated to dryness in vacuo. The total residue (95 mg.) is taken up in 2 ml. of methanol and remethylated with ethereal diazomethane for 20 minutes. After removal of the solvents in vacuo, the crystalline residue is recrystallized from methanol, furnishing 47 mg. of material melting at 117–125°. This material is further purified by preparative thin layer chromatography on activity V alumina using chloroform-hexane (1:1) as the liquid phase. The zone possessing an Rf of approximately 0.3 (the first zone from the origin) is eluted with ethyl acetate and furnished 13 mg. of crystalline material. This material on recrystallization from methanol gives pure methyl eburicoate, melting at 114–115°. Identity is confirmed by acetylation, which furnishes pure methyl acetyl eburicoate melting at 151–153°, and which gives no depression when mixed with an authentic sample, and whose infrared spectrum is identical with that of such a sample as obtained in copending application Serial No. 183,014, filed March 28, 1962, by Josef Fried et al.

EXAMPLE NN

*Methyl diacetyl-7,11-diketodihydroeburicoate (II).*—To a solution of 100 mg. of methyl diacetyl-dihydrosulfurenate (Ie) in 5 ml. of glacial acetic acid is added at 70° dropwise with stirring a solution of 160 mg. of chromium trioxide in a few drops of water and 4 ml. of glacial acetic acid. Addition of the oxidizing agent is complete after 40 minutes and the reaction is allowed to proceed for a total of one hour at 70–80°. The reaction mixture is then cooled and the excess oxidant reduced by the addition by a few drops of methanol. The mixture is concentrated to small volume and taken up in isobutyl ketone and water. The organic phase is washed with water, dried over sodium sulfate and evaporated to dryness in vacuo. The crude residue weighing 237 mg. is dissolved in 5 ml. of hexane and chromatographed on 4.7 grams of neutral alumina, activity I. Elution of the column with 200 ml. of hexane leaves a small amount of amorphous material. Subsequent elution with benzene-hexane (1:1) (200 ml.) followed by benzene alone (250 ml.) gives the desired methyl diacetyl-7,11-diketo dihydroeburicoate (II) which after crystallization from methanol has the following properties: M.P. 180–181°; $[\alpha]_D^{23}$+79° (c., 0.41 in chloroform):

$\lambda_{Max.}^{Alc.}$ 270 m$\mu$ ($\epsilon$=9,700)

$\lambda_{Max.}^{KBr}$ 5.78, 5.96, 8.08$\mu$

*Analysis.*—Calc'd for $C_{36}H_{54}O_8$ (614.79): C, 70.33; H, 8.55. Found: C, 70.38; H, 8.83.

EXAMPLE OO

*Methyl 14-methyl-3-isopropylidene-$\Delta^8$-A-nor-5$\alpha$-ergostene-15-one-21-oate (IV).*—Through a solution of 30 mg. of methyl 15-keto-dihydroeburicoate (IIIc) in 10 ml. of dry toluene is passed with stirring at 0° a vigorous stream of helium gas. To this mixture is added 30 mg. of phosphorus pentachloride in the dark. After a total reaction time in the dark of six minutes, saturated sodium bicarbonate is added and the mixture stirred for an additional five minutes. The layers are then separated and the toluene extract washed with water, dried over sodium sulfate and evaporated to dryness in vacuo. The residual material material is recrystallized from acetonitrile and furnishes the methyl 14-methyl-3-isopropylidene-$\Delta^8$-A-nor-5$\alpha$-ergostent-15-one-21-oate (IV) (19 mg.) possessing the following properties: M.P. 141–145°:

$\lambda_{Max.}^{KBr}$ 5.75$\mu$

These novel starting materials may then be employed according to the processes of this invention to yield the new final products of this invention. The starting materials of this invention may be processed in accordance with the teachings and disclosures set forth in copending applications Serial No. 183,014, filed March 28, 1962, in the names of Josef Fried and David Walter Rosenthal, now Pat. No. 3,153,038 which is a continuation-in-part application of Serial No. 132,310, filed August 18, 1961, and now abandoned; application Serial No. 198,425, filed May 29, 1962, in the names of Josef Fried and Gerald Krakower; now U.S. 3,169,957 and application Serial No. 212,154, filed July 24, 1962, in the name of Josef Fried now Pat. No. 3,170,919. The processes of this invention, employing the novel starting materials thereof may be represented by the following equations, wherein YO, Y, R, R' and R'' are as hereinbefore defined, and A is lower alkyl:
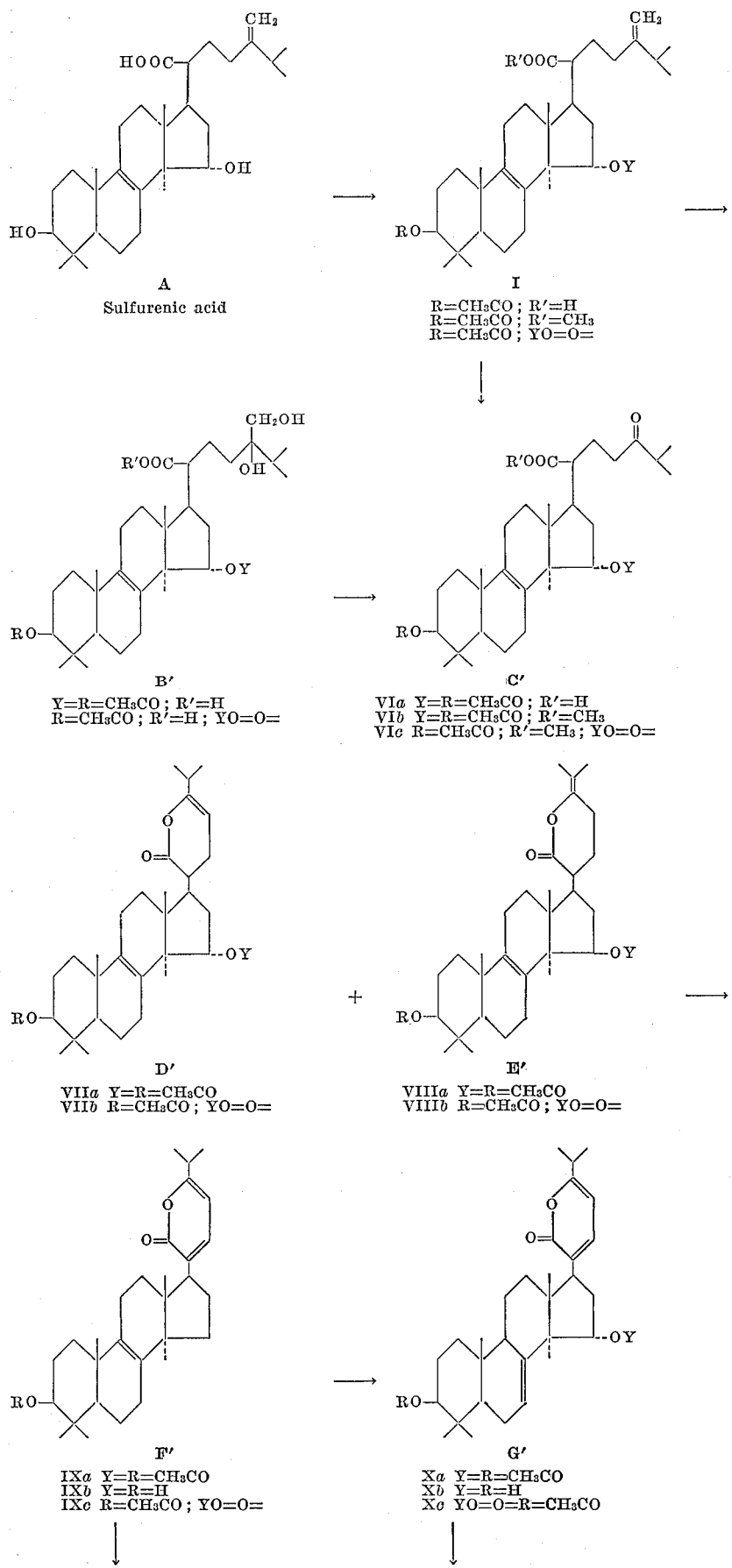

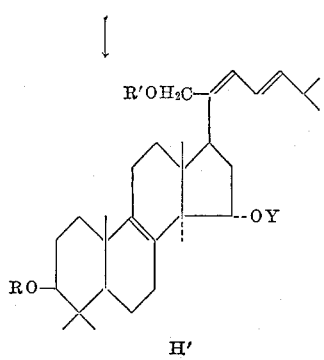

XIa R=R'=Y=H
XIb R=R'=Y=CH₃CO
XIc R'=CH₃CO; R=R'=H
XId R'=Y=H; R=CH₃CO
XIe R=CH₃CO; R'=H; YO=O=

H'

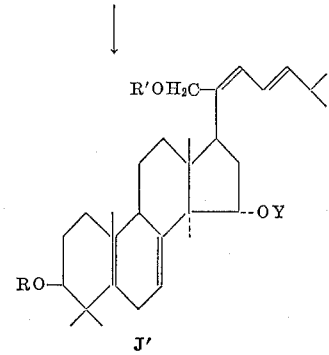

XIIa R=R'=Y=H
XIIb R=R'=Y=CH₃CO
XIIc R=CH₃CO; R'=Y=H
XIId R=Y=H; R'=CH₃CO
XIIe R=CH₃CO; R''=H; YO=O=

J'

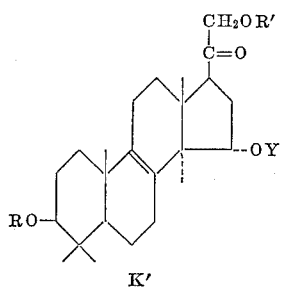

K'

XIIIa R=R'=H
XIIIb R=R'=Y=CH₃CO
XIIIc R=CH₃CO; R'=Y=H
XIIId R'=CH₃CO; R=Y=H
XIIIe R=H; R=Y=CH₃CO
XIIIf R=CH₃CO; R'=H; YO=O=

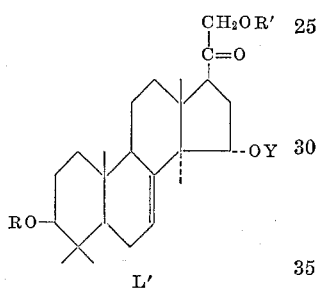

L'

XIVa R=R'=Y=H
XIVb R=R'=Y=CH₃CO
XIVc R=CH₃CO; R'=Y=H
XIVd R'=CH₃CO; R=Y=H
XIVe R=H; R=Y=CH₃CO
XIVf R=CH₃CO; R'=H; YO=O=

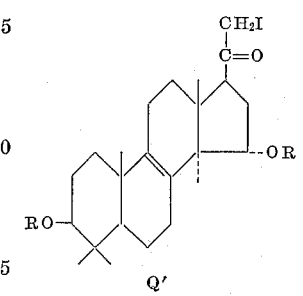

Q'

XIXa R=CH₃CO
XIXb RO=O=

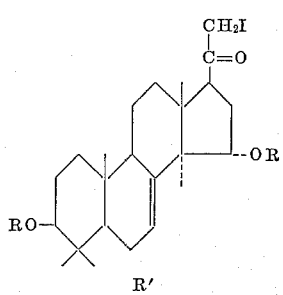

R'

XXa R=CH₃CO
XXb RO=O=

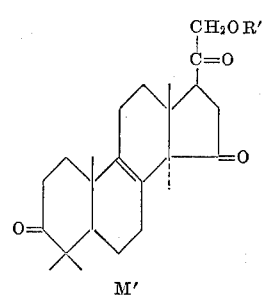

M'

XVa XOR'=H
XVb XIR'=CH₃CO

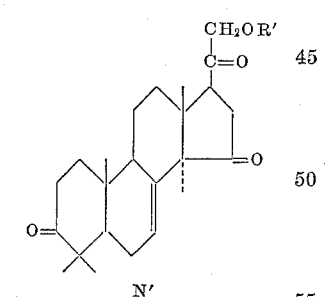

N'

XVIa R'=H
XVIb R'=CH₃CO

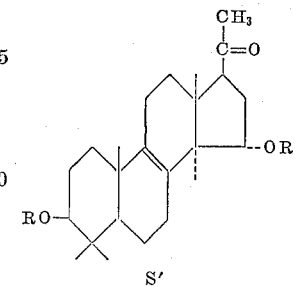

S'

XXIa R=CH₃CO
XXIb R=H
XXIc RO=O=

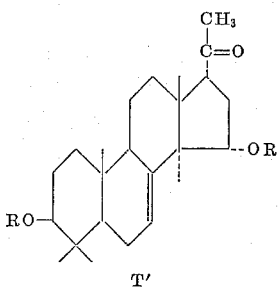

T'

XXIIa R=CH₃CO
XXIIb R=H
XXIIc RO=O=

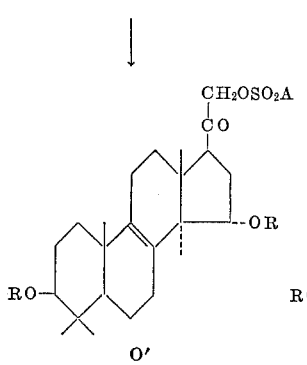

O'

XVIIa R=CH₃CO; A=CH₃
XVIIb RO=O=; A=CH₃

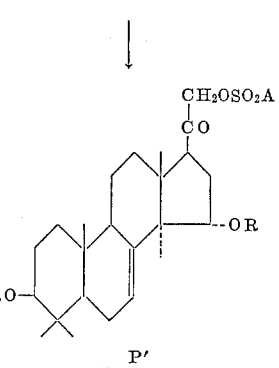

P'

XVIIIa R=CH₃CO; A=CH₃
XVIIIb RO=O=; A=CH₃

The 3,15-diester of sulfurenic acid (Compounds I) obtained as set forth hereinbefore is converted to a corresponding diester of 24-keto-Δ⁸-lanostene-21-oic acid (Compounds C). This may be done by ozonolysis of Compounds I and reducing the ozonide formed by treatment with either hydrogen in the presence of a hydrogenation catalyst, such as palladium on charcoal, or an electro-positive metal, such as zinc, in the presence of an acid, such as glacial acetic acid, whereby Compounds C' are obtained directly. Compounds C' can also be obtained in a two-step process by first treating Compounds I with an hydroxylating agent, such as osmium tetroxide, to yield the corresponding 3,15-diester of 3β,15α,24,28-tetrahydroxy-Δ⁸-eburicene-21-oic acid (Compounds B'), which are new compounds of this invention, and then cleaving the glycol, as by treatment with lead tetraacetate to yield Compounds C'.

Compounds C' are then lactonized by treatment with an acid anhydride and a salt of a strong base and a weak acid, such as sodium acetate in acetic anhydride, to yield a mixture of the α-lactone (Compounds D') and β-lactone (Compounds E') of the corresponding 3,15-diesters of 3β, 15α-dihydroxy-24-keto-$\Delta^8$-lanostene-21-oic acid. These lactones are new compounds of this invention. The reaction is preferably carried out at an elevated temperature, such as the reflux temperature of the organic solvent employed and the two lactones are separated chromatographically. However, since both the α-lactone and β-lactone give the same product in the next step of the process of this invention, such separation is not necessary and a mixture of the lactones may be used directly.

Compounds D' and E' are then dehydrogenated, as by treatment with palladium on charcoal at an elevated temperature, to yield the corresponding 3,15-diester of 3β,15α, 24-trihydroxy-$\Delta^{8,20(22)23}$-lanostadiene-21-oic acid lactone (Compounds F'), which are new compounds of this invention. If desired, the ester can then be saponified in the usual manner, as by treatment with a base such as potassium hydroxide to yield the corresponding free 3β, 15α-dihydroxy derivative, and the free 3,15-dihydroxy compound oxidized to the corresponding 3,15-diketo derivative in the usual manner, as by treatment with chromium trioxide.

Compounds F' can then be isomerized to the corresponding 3β,15α,24 - trihydroxy - $\Delta^{7,20(22),23}$ - lanostadiene-21-oic acid lactone derivative (Compounds G'), which are new compounds of this invention, by treatment with hydrogen chloride in a solvent (e.g., glacial acetic acid).

Compounds F' and G' are then converted to the final 21-oxygenated pregnene derivatives of this invention by the same series of steps. If a Compound F' is employed the final products and all intermediates contain a double-bond in the 8,9-position. If a Compound G' is employed, the final products and all intermediates contain a double-bond in the 7,8-position.

In the first step of this process, Compounds F' and G' are reduced by treatment with lithium aluminum hydride to yield the corresponding 3β,15α,21-trihydroxy-$\Delta^{8,20(22),23}$-lanostatriene (Compounds H') and 3β,15α, 21-trihydroxy-$\Delta^{7,20(22),23}$-lanostatriene (Compounds J') derivaives, respectively. These compounds can be converted to their 21-ester (or 3,15,21-triester, if a free 3,15-dihydroxy compound is initially produced) derivatives by the usual acylation procedure. The preferred acylating agents are the acyl chlorides and acid anhydrides of the hydrocarbon carboxylic acids of less than twelve carbon atoms mentioned hereinbefore. All Compounds H' and J' are new compounds of this invention.

Compounds H' and J' are then oxidized, as by treatment with ozone and reduction of the ozonide formed, to yield 3β,15α,21-trihydroxy-4,4,14α-trimethyl-$\Delta^7$-5α-pregnene-20-one (Compounds L'), respectively, or mono- di- or triester of each of these depending on the degree of esterification of the starting material. Moreover, if a triester is initially formed, it can be selectively saponified to the 3,15-diester by treatment with potassium carbonate and if a trihydroxy compound is initially formed, it can be selectively esterified to the 21-monoester by treatment with the desired acid anhydride in pyridine. Thus, all combinations of Compounds K' and L', containing two or three free hydroxyl groups, a 3-monoester group, a 21-monoester group, a 3,21-diester group, a 3,15-diester group or a 3,15,21-triester group can be obtained. Compounds K' and L' are new compounds of this invention.

Compounds K' and L', containing free 3,15-dihydroxy groups, can then be oxidized in the usual manner, as by treatment with chromium trioxide, to yield the final products of this invention, which contain either a 21-hydroxy group or a 21-acyloxy group (Compounds M' and N').

If a 21-unsubstituted compound is desired (Compounds S' and T'), a Compound K', L', M' or N', containing a free 21-hydroxy group, is acylated by treatment with an organic sulfonyl chloride, such as a lower alkanesulfonyl chloride (e.g., mesyl chloride) or tosyl chloride, to yield the corresponding 21-sulfonic acid ester (Compounds O' and P'), which are new compounds of this invention.

Compounds O' and P' are then converted to their corresponding 21-iodo derivatives (Compounds Q' and R', respectively) by treatment with an alkali metal iodide (e.g., sodium iodide), preferably at an elevated temperature. Compounds Q' and R' are new compounds of this invention.

Compounds Q' and R' are then reduced, as by treatment with sodium bisulfite, to yield the final products of this invention which are unsubstituted in the 21-position (Compounds S and T). If a 3β,15α-dihydroxy or 3β,15α-diacyloxy derivative is initially formed it may be oxidized to the corresponding 3,15-diketo derivative (after saponification of the 3- and 15-ester groups, if present) to yield the final 3,15-diketo pregnene compounds of this invention.

Other novel final products of this invention may be prepared according to the processes of this invention, employing the novel starting materials, Compounds I, thereof. These processes may be represented by the following equations, wherein Y, R, R' and R'' are the same or different and represent hydrogen, lower alkyl, acyl and together with the oxygen atom to which they are joined may represent oxo (O=):

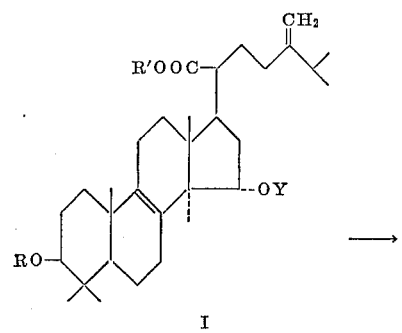

I

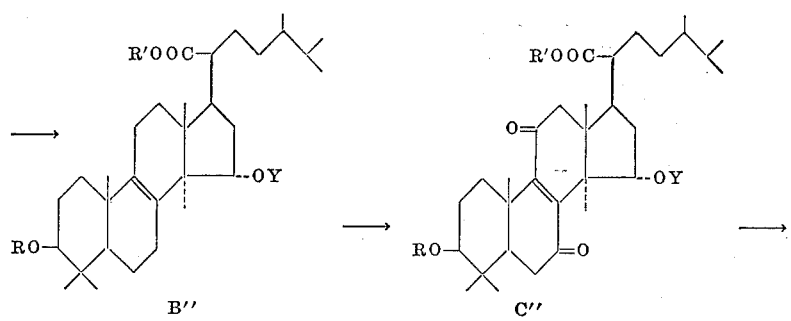

B''
XXIIIa Y=R=R'=H
XXIIIb Y=R=CH₃CO; R'=H
XXIIIc Y=R=H; R'=CH₃
XXIIId Y=R=CH₃CO; R'=CH₃
XXIIIe R=CH₃CO; YO=O=; R'=CH₃

C''
XXIVa Y=R=CH₃CO; R'=CH₃
XXIVb Y=R=CH₃CO; R'=H
XXIVc R=CH₃CO; R'=CH₃; YO=O=

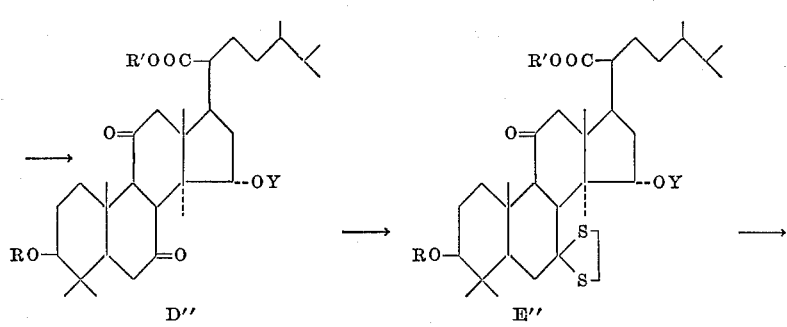

D''
XXVa Y=R=H; R'=CH₃
XXVb Y=R=CH₃CO; R'=CH₃
XXVc Y=R=CH₃CO; R'=H
XXVd YO=O=; R=CH₃CO; R'=CH₃

E''
XXVIa Y=R=CH₃CO; R'=CH₃
XXVIb YO=O=; R=CH₃CO; R'=CH₃

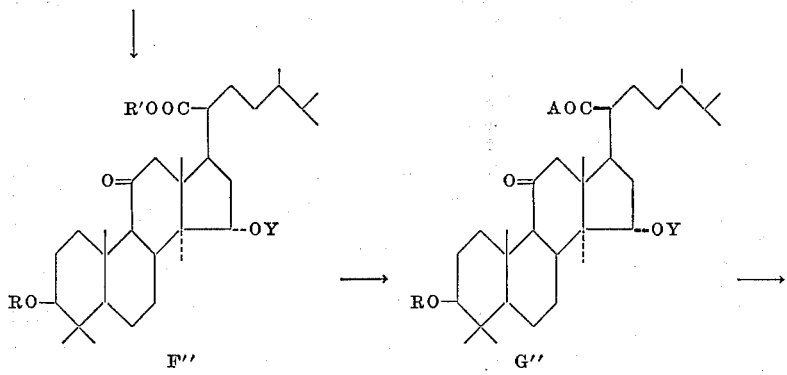

F''
XXVIIa R=CH₃CO; R'=CH₃
XXVIIb R=H; R'=CH₃
XXVIIc R=CH₃CO; R'=H
XXVIId R=R'=H
XXVIIe R=CH₃CO; R'=CH₃; YO=O=

G''
XXVIIIa R=CH₃CO; A=halide
XXVIIIb R=CH₃CO; A=halide; YO=O=

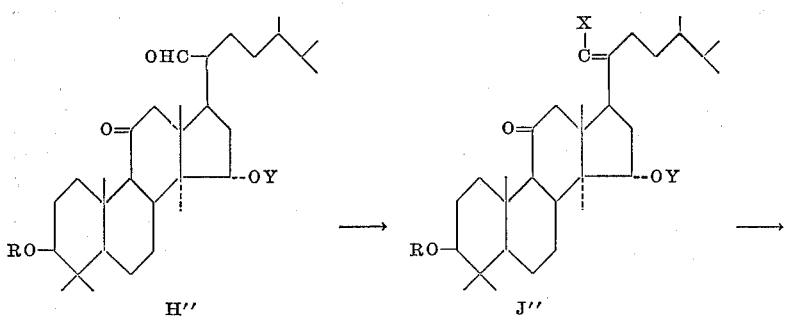

H''
XXIXa Y=R=CH₃CO
XXIXb YO=O=; R=CH₃CO

J''
XXXa Y=R=CH₃CO; X may be morpholyl, piperidyl or pyrrolidyl
XXXb R=CH₃CO; YO=O=; X is as in XXXa

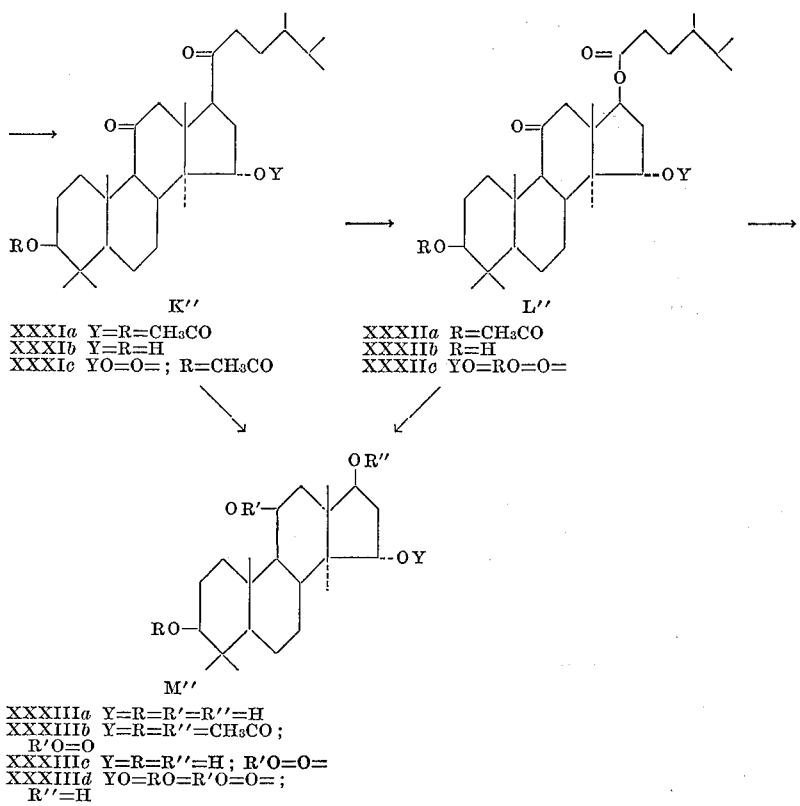

XXXIa Y=R=CH₃CO
XXXIb Y=R=H
XXXIc YO=O=; R=CH₃CO

XXXIIa R=CH₃CO
XXXIIb R=H
XXXIIc YO=RO=O=

XXXIIIa Y=R=R'=R''=H
XXXIIIb Y=R=R'=R''=CH₃CO; R'O=O
XXXIIIc Y=R=R''=H; R'O=O=
XXXIIId YO=RO=R'O=O=; R''=H

The 3,15-diester of sulfurenic acid (Compounds I) is first converted to a corresponding diester of $\Delta^8$-eburicene-21-oic acid (Compounds B"). This may be accomplished by the hydrogenation of the 3,15-diester in the presence of a hydrogenation catalyst, for example, palladium on charcoal, whereby Compounds B are obtained directly. Alternatively, Compounds B" may be produced by first methylating as by reacting with diazomethane the 3,15-diacetate esters (Compounds I) in ether to produce the methylated 3,15-diacetate ester of sulfurenic acid. The methylated diacetate ester (Compounds I) is then treated with hydrogen in the presence of a hydrogenation catalyst to produce the $\Delta^8$-eburicene-diesters (Compounds B").

Compounds B" are then oxidized as by treatment with an oxidizing agent, for example, chromic acid in an acetic acid medium to produce the $\Delta^8$-eburicene-7,11-diones (Compounds C"). To obtain the 21-oic acids of Compounds C" (wherein R' is hydrogen), Compounds C" may be demethylated as by treatment with a lithium halide in a basic medium, such as collidine, at elevated temperatures.

Compounds C" are then reduced as by treatment with zinc in glacial acetic acid preferably at elevated temperatures to produce the eburicane-7,11-diones (Compounds D"). In order to obtain the 21-oic acids of Compounds D" (wherein R' is hydrogen), Compounds D" are demethylated as by treatment with a lithium halide in a basic medium, such as collidine at elevated temperatures.

Compounds D" are then converted to the 11-keto-eburicane (Compounds F") by treatment first with an alkylene-dithiol, e.g., ethane-dithiol, in the presence of a Lewis acid, such as, borontrifluoride etherate to produce the dithioethylene ketals (Compounds E"), which are new compounds of this invention. Compounds E" may then be treated at elevated temperatures with a sponge nickel catalyst in an organic solvent (e.g., ethanol), to produce Compounds F", which are also new compounds of this invention.

Alternatively, Compounds F" may be obtained by treating Compounds D" with hydrazine and a base, such as potassium hydroxide, at elevated temperature. In addition to the reduction of the 7-keto group, there occurs hydrolysis of the ester groups at $C_3$, $C_{15}$ and $C_{21}$ and the latter are reformed by treatment first with an acylating agent (i.e., acid anhydride or acyl chloride) in the presence of a base (e.g., pyridine) followed by treatment with a methylating agent (e.g., ethereal diazomethane), to produce Compounds F" directly.

In order to obtain the 21-oic acids of Compounds F" (wherein R'=hydrogen) Compounds F" are demethylated as by treatment with a lithium halide in a basic medium, such as collidine, at elevated temperatures. The eburicane 21-oic acids Compounds F" (wherein R' is hydrogen), are then treated with an acid halide (e.g., thionyl chloride or thionyl bromide) to produce the eburicane-21-oyl chlorides (Compounds G"). These are also new compounds of this invention.

Compounds G" are then reduced as by treatment with hydrogen in the presence of a palladium catalyst at an elevated temperature to yield the eburicane-21-al-11-ones (Compounds H"), which are new compounds of this invention.

Compounds H" are then treated with a secondary amine, such as pyrrolidine, at an elevated temperature, with or without a strong acid, such as p-toluenesulfonic acid, to produce the 21-(N-substituted)-$\Delta^{20}$-eburicene-11-ones (Compounds J"), such as 21-(N-pyrrolidyl)-$\Delta^{20}$-eburicene-11-one, which are also new compounds of this invention. Similarly, additional 21-(N-substituted)-$\Delta^{20}$-eburicenes (Compounds J") may be obtained by substituting other secondary amines for the pyrrolidine employed above. Examples of such secondary amines are morpholine and piperidine, which when employed in the practice of this invention, yield respectively 21-(N-morpholyl)-$\Delta^{20}$-eburicene-11-one, and 21-(N-piperidyl)-$\Delta^{20}$-eburicene-11-one (Compounds J") which are also new compounds of this invention.

Compounds J" may then be ozonized with an excess of ozone at reduced temperatures. The ozonide formed is then reduced, as by treatment with zinc and acetic acid, to yield the 21-nor-eburicane-11,20-diones (Compounds K"), which are also new compounds of this invention.

The final products of this invention are obtained by treating Compounds K" with a peracid, such as trifluoroperacetic acid which yields the 3,15-diacetate-17(4,5-dimethylhexanoate) of 4,4,14-trimethyl androstane (Compounds L″), which are new compounds of this invention.

When in the practice of this invention, the diacyl ester compounds (Compounds L″) are obtained, the diester can be saponified in the usual manner, as by treatment with a base, such as potassium hydroxide, to yield the corresponding free dihydroxy derivative and the free dihydroxy compounds oxidized to the corresponding keto derivative in the usual manner as by treatment with chromium trioxide to yield Compounds M″, which are new final products of this invention. Additionally, subsequent reduction of the final compounds, such as by treatment with lithium borohydride, results in the production of additional new final products of this invention (Compounds M″).

It has also been found in the practice of this invention that when the starting materials thereof, i.e., Compounds I″ possess a 15-keto substituted (e.g., wherein YO is oxo [O=]), that substituent is maintained throughout the process thus yielding the 3-substituted 15-keto compounds of this invention.

In addition to the foregoing process, further steps may be employed to obtain further products of this invention. The basic starting material is the same employed in the hereinbefore disclosed process, which starting material is the source of the reactant employed in obtaining the additional products of this invention. The following equations represent the process whereby additional products are obtained, wherein Y, R, R′ and R″ are as hereinbefore defined:

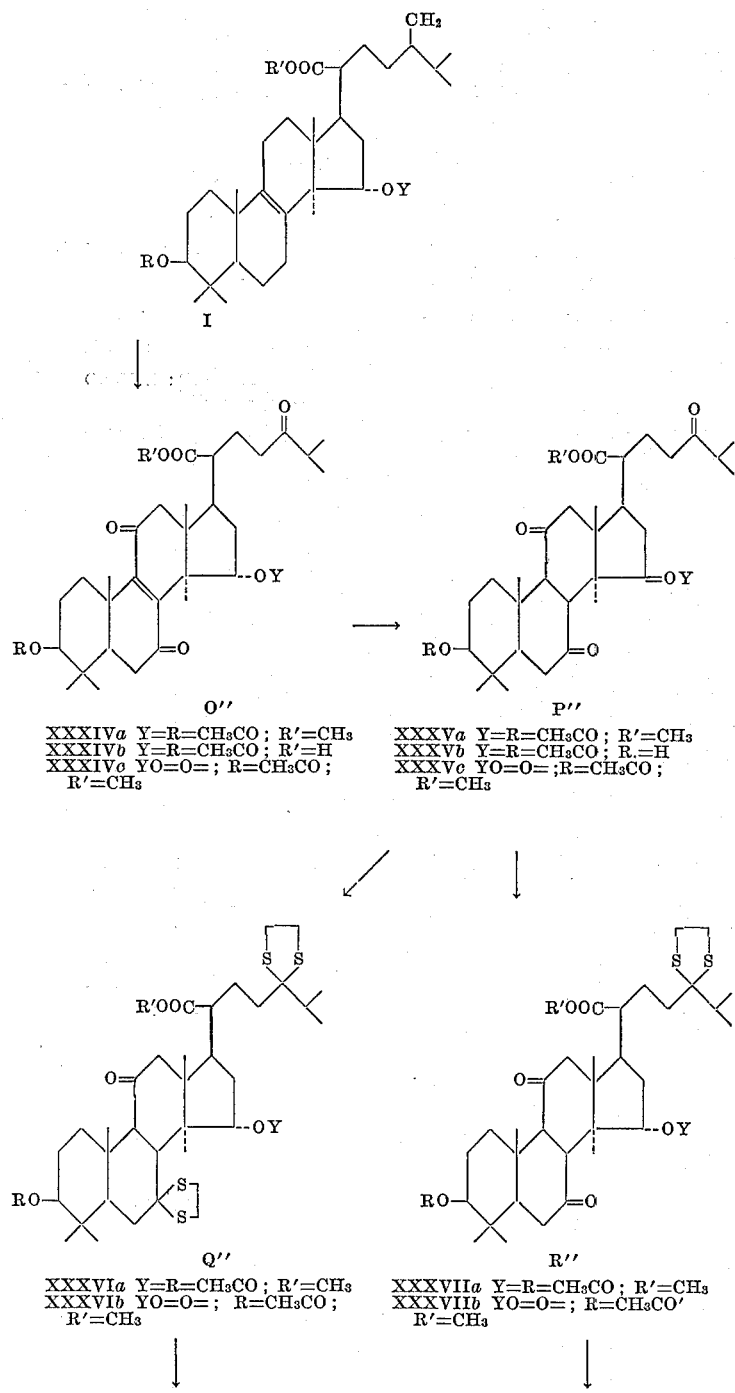

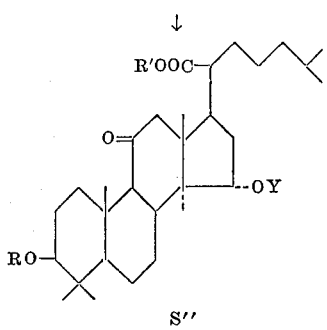 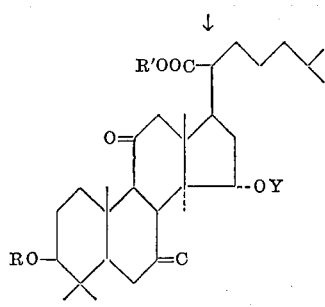

S''               T''

XXXVIIIa Y=R=CH₃CO; R'=CH₃      XXXIXa Y=R=CH₃CO; R'=CH₃
XXXVIIIb Y=R=CH₃CO; R'=H        XXXIXb Y=R=CH₃CO; R'=H
XXXVIIIc YO=O=; R=CH₃CO; R'=CH₃    XXXIXc YO=O=; R=CH₃CO; R'=CH₃

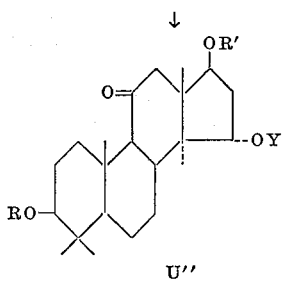 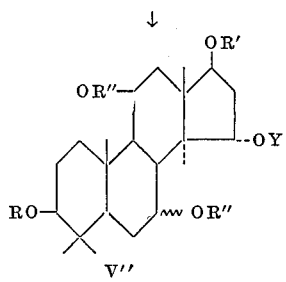

U''               V''

XLa Y=R=CH₃CO; R=(5-methyl-hexanoyl)
XLb Y=R=H; R'=(5-methylhexanoyl)
XLc YO=RO=O=; R'=(5-methyl-hexanoyl)
XLd YO=RO=O=; R'=H
XLe Y=R=R'=H
XLf Y=R=R'=CH₃CO XLIa Y=R=CH₃CO; R'=(5-methyl-hexanoyl); R''O=O=
XLIb Y=R=H; R'=(5-methyl-hexanoyl)R''O=O=
XLIc YO=R''O=RO=O=; R'=(5-methylhexanoyl)
XLId YO=RO=R''O=O=; R'=H
XLIe Y=R=R'=H; R''O=O=
XLIf Y=R=R'=CH₃CO; R''O=O
XLIg Y=R=R'=R''=H In the first step of the subsequent process, Compounds I, obtained as described hereinbefore, are oxidized, as with chromic acid in an acid medium, to yield the Δ⁸-lanostene-7,11,24-triones (Compounds O'') directly.

Compounds O'' are treated with a reducing agent, such as zinc and acetic acid, to yield the lanostane-7,11,24-triones (Compounds P''), which are new compounds of this invention.

Compounds P'' are then reacted with an alkylene dithiol, such as ethanedithiol, in the presence of a Lewis acid, such as boron trifluoride-etherate catalyst under mild conditions, to yield the dithioethylene ketals (Compounds R'') which are new compounds of this invention. Compounds R'' are then desulfurized as by heating at elevated temperatures in an organic solvent, in the presence of a nickel catalyst, thus yielding the lanostane-7,11-diones (Compounds T'') which are new compounds of this invention.

Compounds T'' may then be processed according to the steps set forth hereinbefore in the treatment of Compounds E'' through M'', in order to obtain the final derivatives of Compounds R'', which are Compounds V'' and are also new products of this invention.

Alternatively, Compounds P'' may be treated with an alkylene dithiol in the presence of a boron trifluoride-etherate over an extended period of time at room temperature to yield the bis-dithioethylene ketal (Compounds Q'') which are new compounds of this invention. Refluxing the bis-dithiolethylene ketals (Compounds Q'') in an organic solvent in the presence of a nickel catalyst yields the lanostane-11-ones (Compounds S'').

Compounds S'' may also be obtained directly by treating Compounds P'', at an elevated temperature, with a base, such as potassium hydroxide, and a hydrazine hydrate, and reacetylating the compound formed, as by treatment with acetic anhydride in a tertiary base, and then remethylating, as by treatment with ethereal diazomethane, to obtain Compounds S'' directly.

To obtain additional final products of this invention, Compounds S'' are treated according to the procedures set forth hereinbefore in the treatment of Compounds F'' through M'', thus yielding the 11-keto androstane derivatives (Compounds U'') which are also new final products of this invention.

An additional method of producing the final products of this invention involves the employment of the derivatives of Compounds B'', as starting material. The different steps of the process and the compounds obtained therefrom can be represented by the following equations, wherein Y, R, R' and R'' are as hereinbefore described.

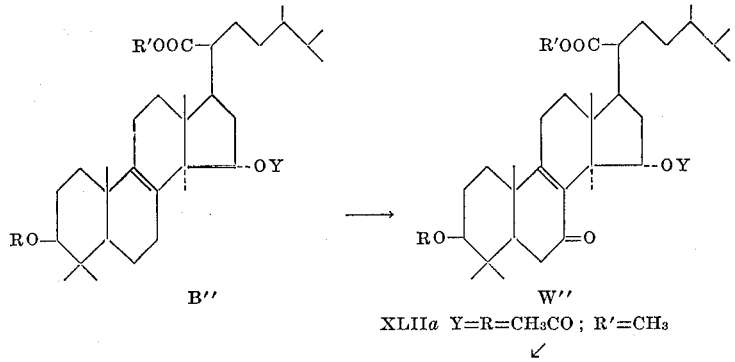

B''               W''

XLIIa Y=R=CH₃CO; R'=CH₃

Additional final products of this invention are obtained by the subsequent processing of the derivatives of Compounds B" (wherein R' is hydrogen), obtained as set forth hereinbefore. The different steps of the process and the compounds obtained therefrom may be represented by the following equations wherein Y, R and R' are as hereinbefore defined:

are the same as defined hereinbefore; and R'" may be hydrogen or lower alkyl:

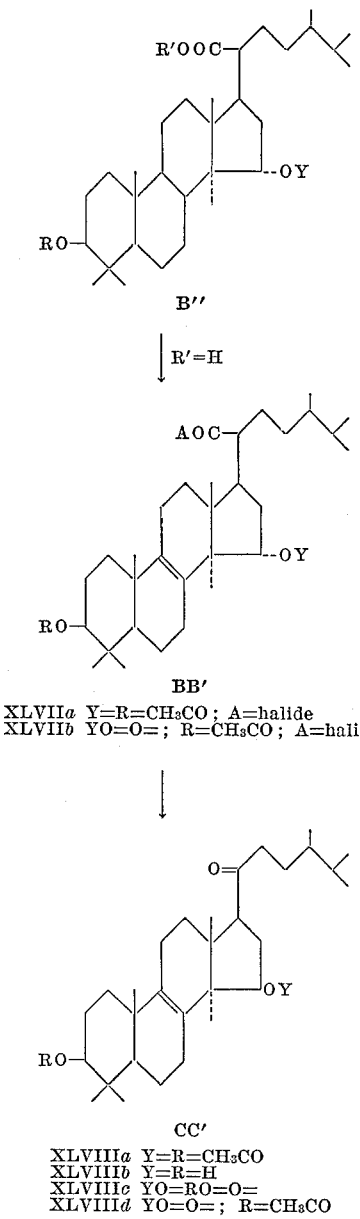

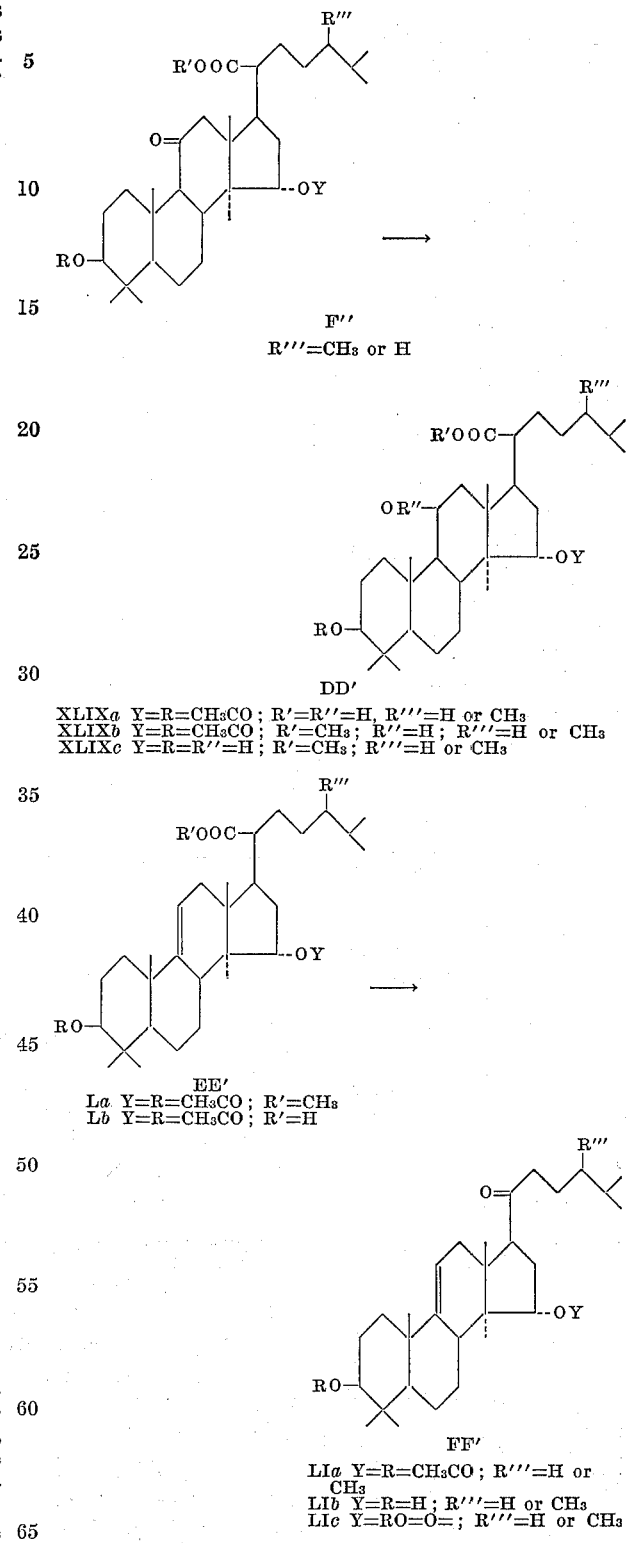

In the first step of the process yielding additional final products of this invention, Compounds B" (wherein R' is hydrogen) are treated with a halogenating agent, such as, thionyl chloride, at an elevated temperature to yield diacetyl dihydrosulfurenoyl chloride (Compounds BB').

Compound BB' is then treated in accordance with the procedures set forth hereinbefore in the processing of Compounds F" through K" to obtain the Δ⁸-21-noreburicanes (Compounds CC') which are additional new final compounds of this invention.

Still further additional final products of this invention may be obtained by the processing of the derivatives of Compounds F" or Compounds S" (wherein R' is hydrogen), obtained as set forth hereinbefore. The additional products are obtained by the process represented by the following equations wherein Y, R, R' and R"

In the first step of the process yielding these additional final products, Compounds F" or S" (wherein R' is hydrogen), obtained as set forth hereinbefore, are treated with lithium borohydride in tetrahydrofuran to produce the 11-hydroxylanostanes (Compounds DD') which are new compounds of this invention.

Compounds DD' are then treated with methanesulfonyl chloride and pyridine in dimethylformamide to yield the Δ⁹,⁽¹¹⁾-lanostenes (Compounds EE'), which are also new compounds of this invention.

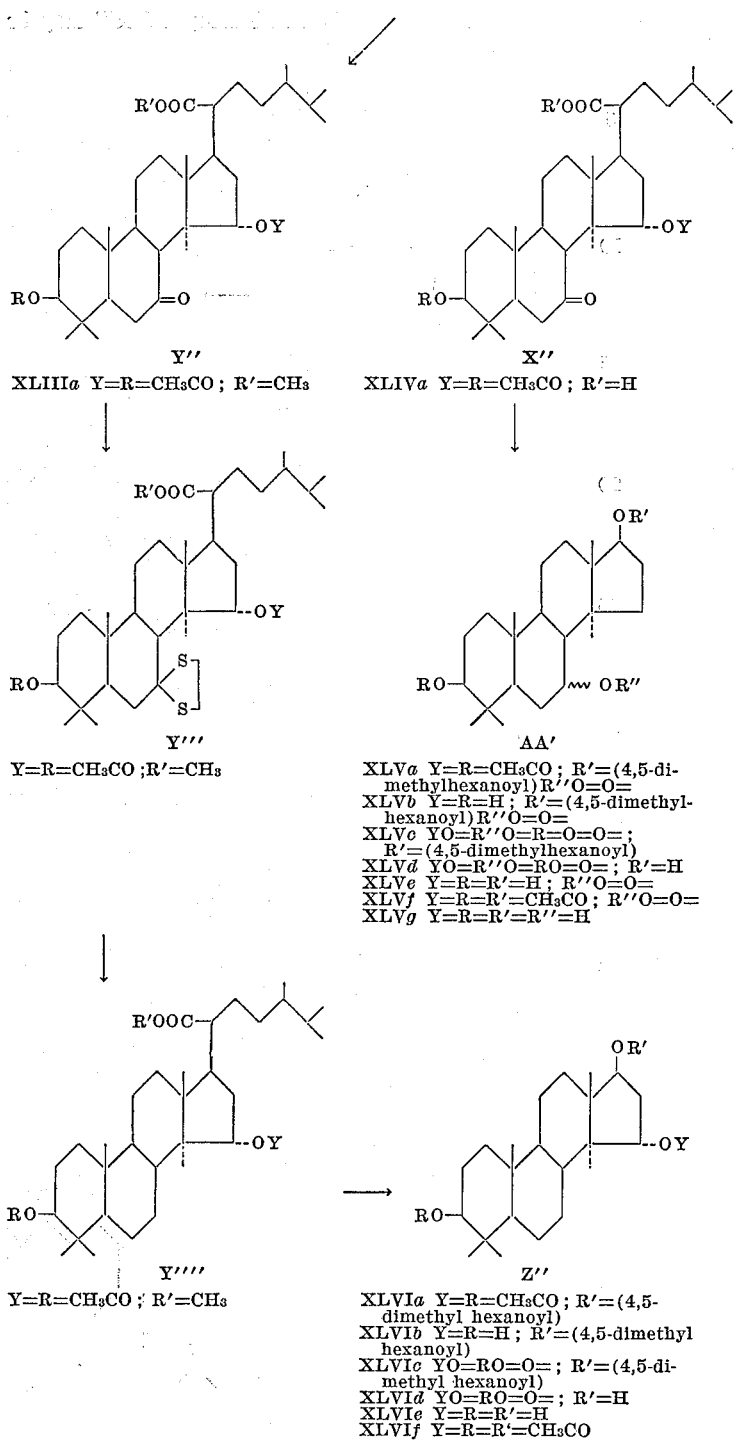

The first step in this additional processing is the treatment of Compounds B'' with an oxidizing agent, such as, chromic acid and acetic acid, to produce the Δ⁸-eburicene-7-ones (Compounds W''). Compounds W'' are then reduced as by treatment with lithium and ammonia to produce the eburicane-7-ones (Compounds Y''), which are new compounds of this invention. Compounds Y'' may then be demethylated as by treatment with a lithium halide in a basic medium, such as collidine, at elevated temperatures to produce the eburicane-7-one-21-acids (Compounds X'') which are also new compounds of this invention.

To obtain additional final products of this invention, Compounds X'' are treated in accordance with the procedures set forth hereinbefore in the processing of Compounds E'' through M''. Such treatment of Compounds X'' results in the production of the 7-keto-androstane derivatives (Compounds AA') which are new final products of this invention.

Still other final products of this invention may be obtained by treating Compounds Y'' in accordance with the procedure set forth hereinbefore for the processing of Compounds D'' through M''. Thus, Compounds Y'' are first treated with an alkylendithiol in the presence of a Lewis acid to produce the 7-dithioethylene ketals (Compounds Y''') which compounds are then desulfurized to produce the 3,15-disubstituted eburicanes (Compounds Y''''). Compounds Y'''' may then be treated in accordance with the procedures set forth hereinbefore for the treatment of Compounds F'' through M'', thus providing new final products of this invention (Compounds Z'').

Compounds EE' are then treated in accordance with the procedures set forth above for obtaining Compounds G" through K", thus yielding the $\Delta^{9(11)}$-21-nor-lanostenes (Compounds FF'), which are new additional final products of this invention.

Still more final products may be obtained from the further processing of Compounds C" and D", (wherein R' is hydrogen). Instead of further degradation of these compounds as set forth hereinbefore they are treated directly to obtain new final products of this invention by the process set forth in the following equations, wherein Y, R, R' and R" are as hereinbefore defined:

thus yielding as new additional final products of this invention the 7,11-diketo-$\Delta^8$-androstenes (Compounds GG') and the 7,11-diketo-androstanes (Compounds HH').

It is to be noted that when any of the starting materials or intermediates described herein, possess a 15-keto substituent (i.e., YO=O=), and these compounds are then treated in accordance with the procedure set forth hereinabove, the final products and the intermediates produced thereby will also possess this 15-keto substituent (i.e. YO=O).

Additional final products of this invention may be prepared in accordance with the procedures represented by

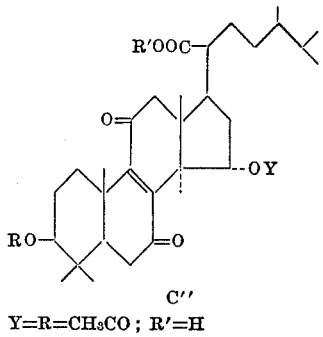
C"
Y=R=CH₃CO; R'=H

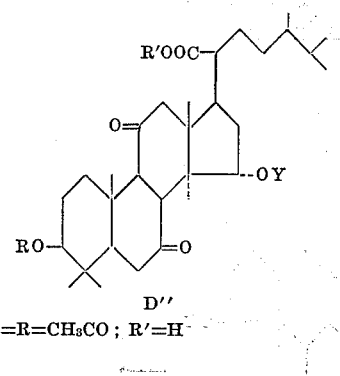
D"
Y=R=CH₃CO; R'=H

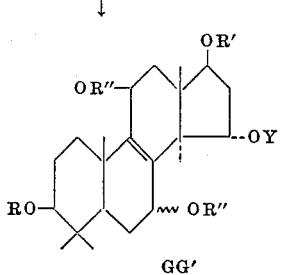
GG'

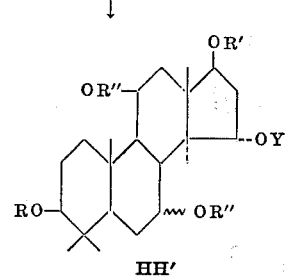
HH'

LIIa Y=R=CH₃CO; R'=4,5-dimethyl hexanoyl; R"O=O=
LIIb Y=R=H; R'=4,5-dimethyl hexanoyl; R"O=O=
LIIc YO=RO=O=; R'=4,5-dimethyl hexanoyl; R"O=O=
LIId YO=R"O=RO=O=; R'=H
LIIe R"O=O=R=R'=H
LIIf Y=R=R'=CH₃CO; R"O=O
LIIg Y=R=R'=R"=H LIIIa Y=R=CH₃CO; R'=4,5-dimethyl hexanoyl; R"O=O
LIIIb Y=R=H; R'=4,5-dimethyl hexanoyl; R"O=O=
LIIIc YO=RO=O=; R'=4,5-dimethyl hexanoyl; R"O=O=
LIIId YO=R"O=RO=O; R'=H
LIIIe Y=R=R'=H; R"O=O
LIIIf Y=R=R'=R"=H
LIIIg Y=R=R'=CH₃CO; R"O=O Compounds C" and D" (wherein R' is hydrogen) are processed according to the procedures set forth hereinbefore in the production of Compounds G" through M", the following equations, wherein Y, R, R' and R" are as hereinbefore defined, and Z represents hydrogen, hydroxy, acyl or halogen.

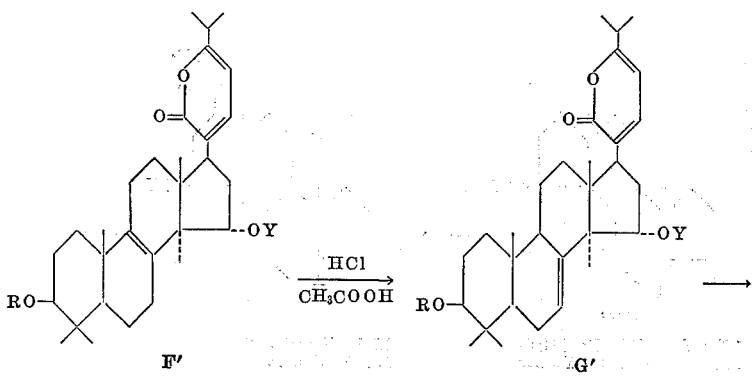
F'        G'

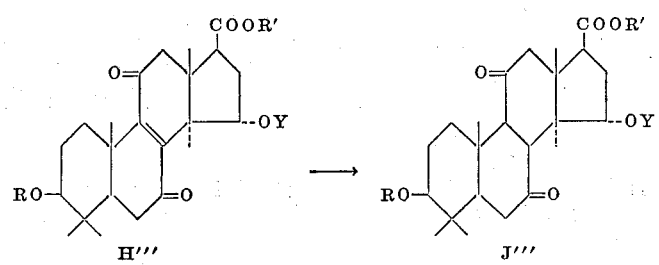

H'''
LIVa Y=R=CH₃CO; R'=H
LIVb Y—R=CH₃CO; R'=CH₃
LIVc Y=R=R'=H
LIVd Y=R=H; R'=CH₃

J'''
LVa Y=R=CH₃CO; R'=CH₃
LVb Y=R=R'=H
LVc Y=R=H; R'=CH₃

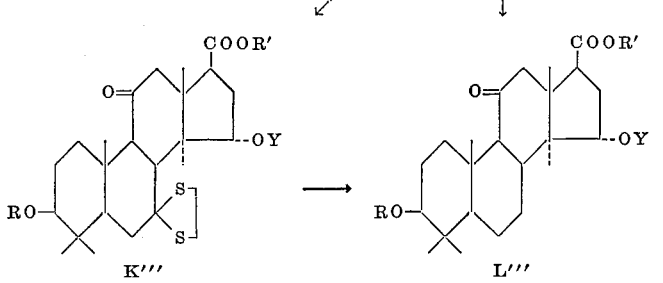

K'''
LVIa Y=R=CH₃CO; R'=CH₃

L'''
LVIIa Y=R=CH₃CO; R'=CH₃
LVIIb Y=R=R'=H
LVIIc Y=R=H; R'=CH₃
LVIId Y=CH₃CO; R=H; R'=CH₃
LVIIe OY=O=; R=H; R'=CH₃

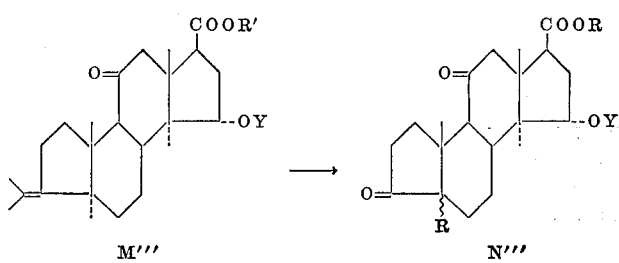

M'''
LVIIIa R'=CH₃; Y=H or CH₃CO or YO=O=
LVIIIb R'=H; Y=H or CH₃CO or YO=O=
LVIIIc R'=Na

N'''
LIXa R'=5αH; R=CH₃; Y=CH₃CO
LIXb R'=5βH; R=CH₃; Y=CH₃CO
LIXc R'=5βH; R=H; Y=CH₃CO
LIXd R'=5αH; R=CH₃; OY=O=

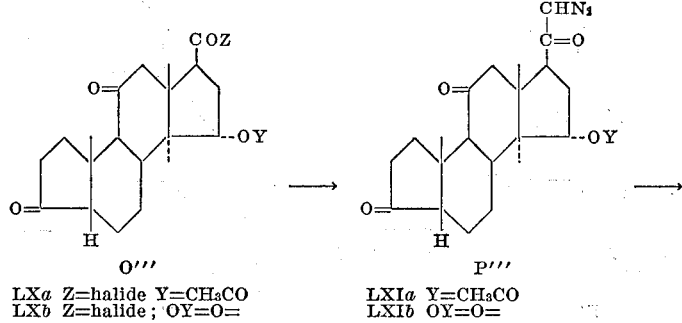

O'''
LXa Z=halide Y=CH₃CO
LXb Z=halide; OY=O=

P'''
LXIa Y=CH₃CO
LXIb OY=O=

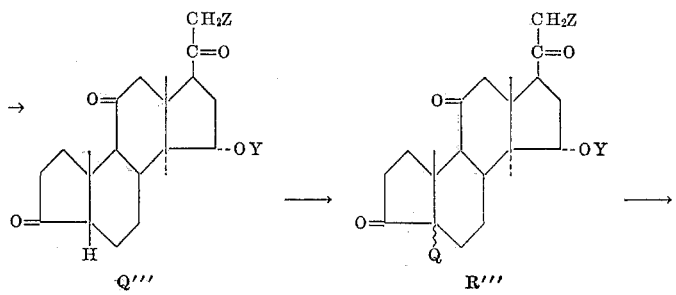

LXIIa Y=CH₃CO; Z=halide(Cl,Br,F,I)
LXIIb OY=Z—CH₃COO
LXIIc X=OH; Y=CH₃CO
LXIId Z=H; Y=CH₃CO
LXIIe Z=halide; OY=O=
LXIIf Z=CH₃COO; OY=O=
LXIIg Z=OH; OY=O=
LXIIh Z=H; OY=O=

LXIIIa Q=α-Br; Z=halide(Cl,F,Br,I) Y=CH₃CO
LXIIIb Q=β-Br; Z=halide(Cl,F,Br,I) YO=O=
LXIIIc Q=α-Br; Z=CH₃COO; Y=CH₃CO
LXIIId Q=β-br; Z=CH₃COO; OY=O=
LXIIIe Q=β-Br; Z=OH; Y=CH₃CO
LXIIIf Q=α-Br; Z=H; OY=O=
LXIIIg Q=β-Br; Z=H; OY=CH₃CO

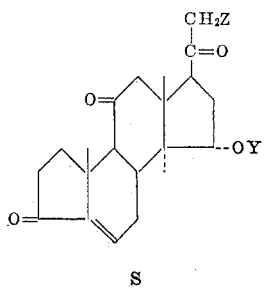

S

LXIVa Z=halide(Cl,Br,F or I) Y=CH₃CO
LXIVb Z=CH₃COO; Y=CH₃CO
LXIVc Z=OH; Y=CH₃CO
LXIVd Z=H; Y=CH₃CO
LXIVe Z=halide; OY=O=
LXIVf Z=CH₃COO; OY=O=
LXIVg Z=OH; OY=O=
LXIVh Z=H; OY=O=

Compounds F' obtained as hereinbefore described can first be isomerized to the corresponding 3,15-diacetoxy-24-hydroxy-Δ⁷,²⁰⁽²²⁾,²³-lanostatriene-21-oic acid lactone derivative (Compounds G), by treatment with hydrogen chloride in a solvent (e.g. glacial acetic acid).

The lanostatriene-21-oic acid lactones (Compounds F' and G') may then be oxidized by treatment with potassium permanganate, and the manganese dioxide formed, reduced as by treatment with sulfur dioxide, to form the Δ⁸-5α-androstene-7,11-dione-17β-carboxylates (Compounds H'''), which are new compounds of this invention.

Compounds H''' are then reduced as by treatment with zinc in glacial acetic acid, preferably at elevated temperatures to yield the 5α-androstane-7,11-dione-17β-carboxylates (Compounds J'''), which are also new compounds of this invention.

Compounds J''' are then converted to the 11-keto-5α-androstanes (Compounds L''') by treatment first with an alkylenedithiol, such as ethanedithiol, in the presence of a Lewis acid, such as borontrifluoride etherate, to produce the dithioethylene ketals (Compounds K'''). Compounds K''' may then be treated at elevated temperatures with a sponge nickel catalyst in an organic solvent (e.g. ethanol) to produce Compounds L''', which are new compounds of this invention.

Alternatively, compounds L''' may be obtained by treating Compounds J''' with hydrazine and a base, such as potassium hydroxide, at elevated temperatures. In addition to the reduction of the 7-keto group, there occurs hydrolysis of the ester groups at C₃, C₁₅ and C₂₁ and the latter are reformed by treatment first with an acylating agent such as acid anhydride or acyl chloride, in with a methylating agent (e.g., ethereal diazomethane), to produce Compounds L''' directly.

The 11-keto-5α-androstanes (Compounds L''') may then be dehydrated and rearranged as by treatment with phosphorus pentachloride at reduced temperature in the absence of light, to yield the 3-alkylene-11-keto-15-substituted-A-nor-5α-androstanes (Compounds M'''), which are also new compounds of this invention.

Compounds M''' are then treated with ozone and the ozonide formed is reduced, as by treatment with zinc and glacial acetic acid to yield the 3,11-diketo-15-substituted-A-nor-5α-androstanes (Compounds N''') (wherein R' is 5αH and R is CH₃), which are also new compounds of this invention.

These Compounds N''' (wherein R' is 5αH and R is CH₃) may then be hydrolyzed, as by treatment with alkali such as potassium hydroxide at elevated temperatures, to form the free acid compounds with simultaneous epimerization at the C₅ position, thus yielding Compounds N''' (wherein R' is 5βH and R is H), directly. Alternatively, these free acid compounds may be obtained in a stepwise process which entails first, treatment of Compounds N''' (wherein R' is 5αH and R is CH₃) with cold alkali to produce Compounds N''' (wherein R is 5βH and R' is CH₃), followed by treatment with hot alkali to yield Compounds N''' (wherein R' is 5βH and R is H).

Compounds N''' may then be treated with an acid halide, for example, oxalyl chloride, to obtain the A-nor-5β-androstane-17β-carboxylic acid halides (Compounds O'''), which are also new compounds of the instant invention.

Compounds O''' are then treated with a methylating agent, for example, ethereal diazomethane to produce 21-diazo-20-keto-A-nor-pregnanes (Compounds P''') which are new compounds of this invention.

In order to obtain the final products of this invention which are oxygenated in the 21-position (i.e. Z is acyloxy or hydroxy), Compounds P''' are treated at elevated temperature with a fatty acid, such as acetic, propionic or butyric acid, to yield the 21-esters of 3,11,20-triketo-15-substituted-A-nor-5β-pregnane (Compounds Q''') which are also new compounds of this invention. Alternatively, Compounds Q''' (wherein Z is acyloxy) may be obtained by first treating Compounds P''' with a hydrohalide, such as hydrochloric acid, to yield the 21-halogenated A-norpregnanes (Compounds Q'''), which are also new compounds of this invention, and then acylating the 21-halide A-norpregnanes as by treatment with potassium acetate and potassium iodide to yield the 21-acyloxy-A-norpregnanes (Compounds Q'''). To obtain the 21-hydroxy A-norpregnanes, the 21-acyloxy compounds are treated with a base, such as potassium carbonate. The 21-hydroxy A-norpregnanes are also new compounds of this invention.

Compounds Q''' are then brominated as by treatment with bromine in an acid medium to yield the 21-oxygenated 5-bromo-A-nor-pregnanes (Compounds R'''), which are also new compounds of this invention. The 21-oxygenated 5-bromo-A-norpregnanes are then converted to the 21-oxygenated-A-nor-Δ⁵-pregnenes (Compounds S''') by treatment with a base, such as collidine or lithium halide, e.g., lithium chloride or lithium bromide in dimethylformamide. Compounds S''' are new final products of this invention.

To obtain the final compounds of this invention, which are not oxygenated in the 21-position (i.e., wherein Z is halide or hydrogen), Compounds P''' are first treated with a reducing agent, such as hydriodic acid, to yield the 21-unsubstituted A-norpregnanes (Compounds Q'''), which are new compounds of this invention. The 21-unsubstituted pregnanes are then brominated, as by treatment with bromine in an acid medium, to yield the 21-unsubstituted 5-bromo-A-norpregnanes (Compounds R'''), which are then converted to the 21-unsubstituted A-nor-Δ⁵-pregnenes (Compounds S''') by treatment with a base, such as collidine or a lithium halide, such as lithium chloride, in dimethylformamide. These are also new compounds of the instant invention.

The final products of this invention which are halogenated in the 21-position (i.e., wherein Z may be chlorobromo-fluoro or iodo) are obtained by first treating, at reduced temperatures, the 21-diazoketone (Compounds P''') with a hydrogen halide such as hydrogen chloride, to yield the corresponding 21-halo substituted A-norpregnanes (Compounds Q'''), which are also new compounds of this invention. The 21-halo substituted compounds are then brominated as by treatment with bromine in an acid medium, and the resultant 5-bromo-21-halo-A-norpregnanes (Compounds R''') are dehydrobrominated as by treatment with lithium halide in dimethylformamide to yield the 21-halo-A-nor-Δ⁵-pregnenes (Compounds S'''), which are new final products of the instant invention.

The new final products of this invention may also be obtained by alternate procedures which may be represented by the following equations, wherein Y, R, R' and Z are as hereinbefore defined:

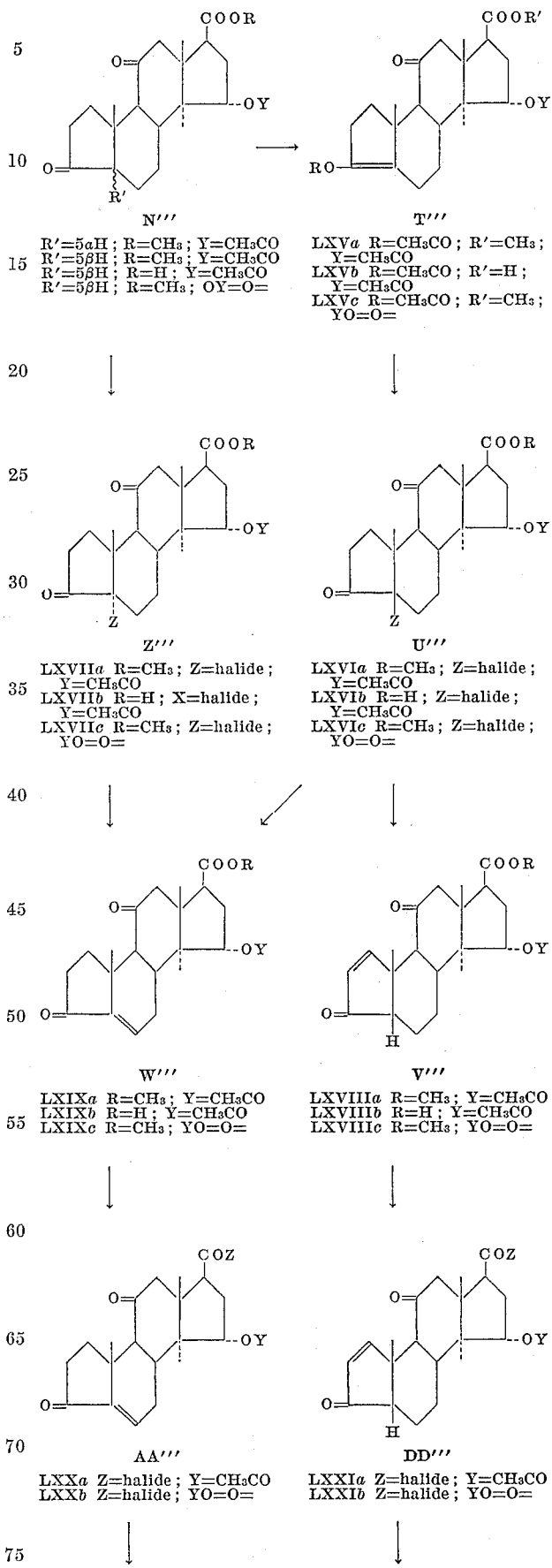

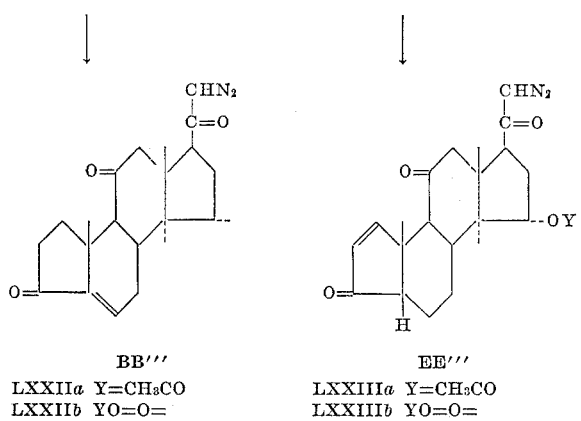

BB'''
LXXIIa Y=CH₃CO
LXXIIb YO=O=

EE'''
LXXIIIa Y=CH₃CO
LXXIIIb YO=O=

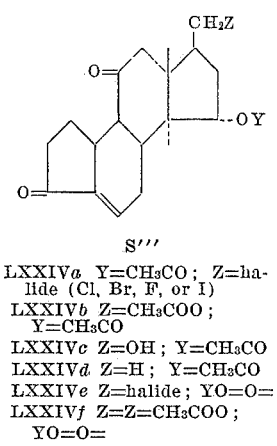

S'''
LXXIVa Y=CH₃CO; Z=halide (Cl, Br, F, or I)
LXXIVb Z=CH₃COO; Y=CH₃CO
LXXIVc Z=OH; Y=CH₃CO
LXXIVd Z=H; Y=CH₃CO
LXXIVe Z=halide; YO=O=
LXXIVf Z=Z=CH₃COO; YO=O=
LXXIVg Z=OH; YO=O=
LXXIVh Z=H; YO=O=

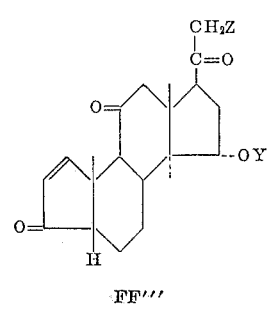

FF'''
LXXVa Z=halide (Cl, Br, F, or I); Y=CH₃CO
LXXVb Z=CH₃COO; Y=CH₃CO
LXXVc Z=OH; Y=CH₃CO
LXXVd Z=H; Y=CH₃CO
LXXVe Z=halide; YO=O=
LXXVf Z=CH₃COO; YO=O=
LXXVg Z=OH; YO=O=
LXXVh Z=H; YO=O=

In the first step of the alternate procedure which may be employed to obtain the final products of this invention, the 3,11-diketo-15-substituted-A-norandrostanes (Compounds N''') are treated with an enol ester of a carbocylic acid of less than 10 carbon atoms of an aliphatic ketone, such as isopropenyl acetate in the presence of a strong acid, e.g. p-toluenesulfonic acid, to produce the 11-keto-15-substituted-A-nor-$\Delta^{3(5)}$-androstenes, (Compounds T'''), which are also new compounds of this invention. Compounds T''' may then be halogenated, as by treatment with a halogenating agent, such as N-bromoacetamide, N-bromosuccinimide, dibromodimethylhydantoin, bromine, N-chlorosuccinimide or N-iodoacetamide, to yield the 5-halo-3,11-diketo-15-substituted-A-nor-5β-androstanes (Compounds U'''), which are also new compounds of this invention.

Dehydrohalogenation of Compounds U''', as by treatment with lithium bromide in dimethylformamide or collidine, yields a mixture of the unsaturated steroids, A-nor-$\Delta^5$-androstenes (Compounds W''') and A-nor-$\Delta^1$-androstenes (Compounds V''') both of which are new compounds of this invention. The mixture of these compounds may be separated into the individual components (Compounds V''' and Compounds W''') by fractional crystallization, in order to further process the individual compounds to obtain the additional products of this invention. In addition to the foregoing, an alternate method may be employed to obtain Compounds W''', which first entails treating Compounds N''' with bromine in an acid medium, such as glacial acetic acid, to obtain the 5α-halo-A-nor-5α-androstanes (Compounds Z''') which are new compounds of this invention. Compounds Z''' may then be dehydrohalogenated as by treatment with lithium bromide in dimethylformamide or collidine to yield the A-nor-$\Delta^5$-androstenes (Compounds W''').

Compounds W''' and V''' may then be converted to the final A-nor-pregnene derivatives of this invention by an identical series of steps. If a compound W''' is employed, the final product and all the intermediates thereof contain a double bond in the 5,6-position. If a compound V''' is employed, the final products and all intermediates contain a double bond in the 1,2-position.

In the first of this series of steps, Compounds W''' and V''' (R=H) are treated with an acid halide, for example, oxalyl chloride, to obtain the corresponding A-nor-$\Delta^5$-androstene-17β-carboxylic acid halides (Compounds AA''') and the A-nor-$\Delta^1$-androstene-17β-carboxylic acid halides (Compounds DD'''), respectively. These are also new compounds of this invention. These compounds are then converted to their respective diazoketone-A-nor-$\Delta^5$-pregnenes (Compounds BB''') and diazoketone-A-nor-$\Delta^1$-pregnenes (Compounds EE''') derivatives as by treatment with an ethereal solution of diazomethane.

Compounds BB''' and Compoupnds EE''' are then converted to the 21-substituted final products of this invention as set forth hereinbefore in the treatment of Compounds P''' to produce Compounds S''' and Compounds FF''', which are new final products of this invention. Thus, treatment of Compounds EE''' with a fatty acid, such as acetic, propionic or butyric acid yields the 21-esters of the A-nor-$\Delta^1$-pregnenes (Compounds FF'''), which are new final products of this invention. Treating Compounds EE''' with a hydrohalide, such as hydrogen chloride, yields final products of this invention which are 21-halo substituted and are also new final products of this invention. The 21-unsubstituted derivatives are obtained by treating Compounds BB''' and EE''' with hydroiodic acid, thus yielding the A-nor-$\Delta^5$-pregnenes (Compounds S''') and the A-nor-$\Delta^1$-pregnenes (Compounds FF'''), which are new compounds of the instant invention.

In addition, the 21-unsubstituted (i.e., Z is H), saturated final products of this invention may be obtained by an alternate procedure, which may be represented by the following equations, wherein Y, R, R' and Z are as hereinbefore defined:

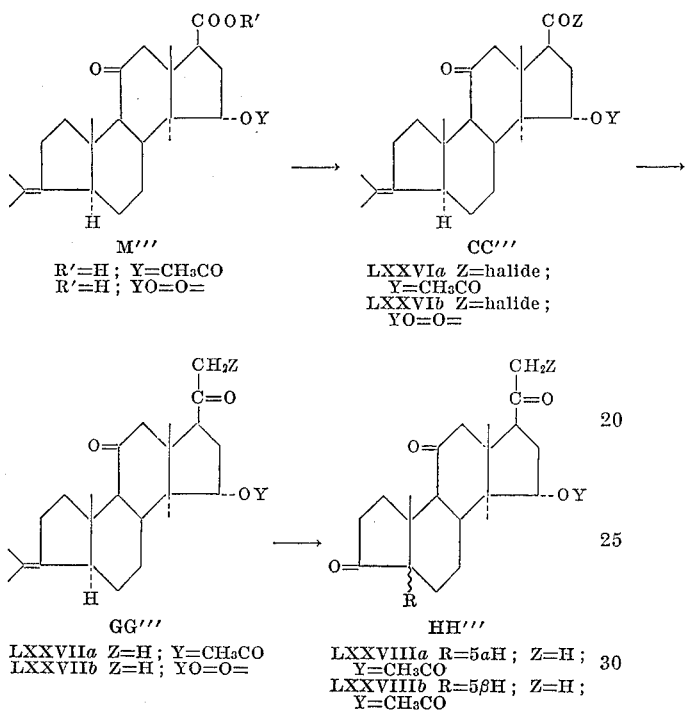

M'''
R'=H; Y=CH₃CO
R'=H; YO=O=

CC'''
LXXVIa Z=halide;
 Y=CH₃CO
LXXVIb Z=halide;
 YO=O=

GG'''
LXXVIIa Z=H; Y=CH₃CO
LXXVIIb Z=H; YO=O=

HH'''
LXXVIIIa R=5αH; Z=H;
 Y=CH₃CO
LXXVIIIb R=5βH; Z=H;
 Y=CH₃CO

In the first step of this alternate process, Compounds M''' (wherein R' is H) are treated with an acid halide, for example, oxalyl chloride, to produce the 3-alkylene-15-acyloxy-A-nor-5α-androstane-17β-carboxylic acid halides (Compounds CC'''), which are also new compounds of this invention. Compounds CC''' are then treated with an ethereal solution of dimethyl cadmium to yield the 3-alkylene-15-acyloxy-A-nor-5α-pregnane-11,20 - diketones (Compounds GG''') which are also new compounds of this invention. Compounds GG''' are then ozonized to yield the A-nor-5α-pregnane-15-acyloxy-3,11,20-triketones (Compounds HH'''), which are also new compounds of this invention. Compounds HH''' may then be treated with a base, such as sodium hydroxide to yield the A-nor-5β-pregnane - 15 - substituted - 3,11,20 - triketones (Compounds Q''') (wherein Z is H), which are new compounds of this invention.

Additionally, further new products of this invention may be obtained by alternate procedures, employing the same or derivative starting material therefor. The starting material employed in obtaining the further products of this invention is derived from the acid starting material disclosed hereinbefore. The derivative employed in this alternate process is reacted according to the equations set forth below.

The following equations represent additional alternative processes which may be employed in the practice of the invention to yield further new products, wherein Y, R, R' and Z are as hereinbefore defined:

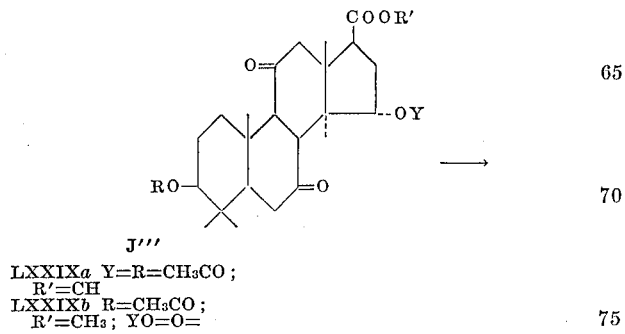

J'''
LXXIXa Y=R=CH₃CO;
 R'=CH
LXXIXb R=CH₃CO;
 R'=CH₃; YO=O=

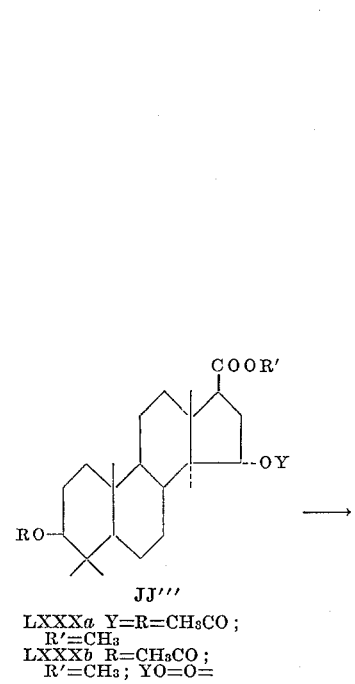

JJ'''
LXXXa Y=R=CH₃CO;
 R'=CH₃
LXXXb R=CH₃CO;
 R'=CH₃; YO=O=

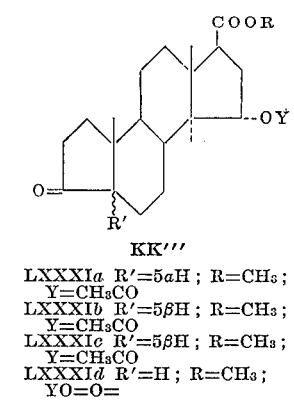

KK'''
LXXXIa R'=5αH; R=CH₃;
 Y=CH₃CO
LXXXIb R'=5βH; R=CH₃;
 Y=CH₃CO
LXXXIc R'=5βH; R=CH₃;
 Y=CH₃CO
LXXXId R'=H; R=CH₃;
 YO=O=

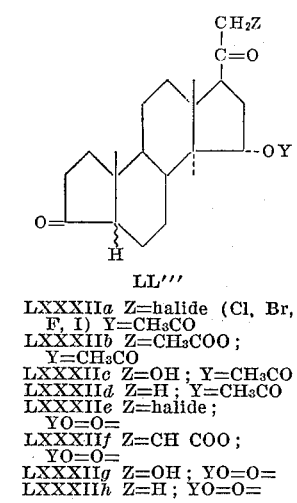

LL'''
LXXXIIa Z=halide (Cl, Br, F, I) Y=CH₃CO
LXXXIIb Z=CH₃COO;
 Y=CH₃CO
LXXXIIc Z=OH; Y=CH₃CO
LXXXIId Z=H; Y=CH₃CO
LXXXIIe Z=halide;
 YO=O=
LXXXIIf Z=CH COO;
 YO=O=
LXXXIIg Z=OH; YO=O=
LXXXIIh Z=H; YO=O=

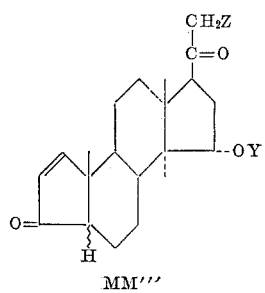

MM'''

LXXXIIIa Y=CH₃CO Z
  halide (Cl, Br, F, I)
LXXXIIIb YO=Z=CH₃COO
LXXXIIIc Z=OH ;
  Y=CA₃CO
LXXXIIId Z H ; Y=CH₃CO
LXXXIIIe Z=halide ;
  (YO=O=
LXXXIIIf Z=CH₃COO ;
  YO=O=
LXXXIIIg Z=OH ;
  YO=O=
LXXXIIIh Z=H ; YO=O=

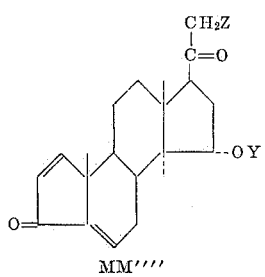

MM''''

LXXXIVa Y=CH₃CO
  Z=halide
LXXXIVb YO=Z=CH₃COO
LXXXIVc Z=OH ;
  Y=CH₃CO
LXXXIVd Z=H ;
  Y=CH₃CO
LXXXIVe Z=halide ;
  YO=O=
LXXXIVf Z=CH₃COO ;
  YO=O=
LXXXIVg Z=OH ; YO=O=
LXXXIVh Z=H ; YO=O=

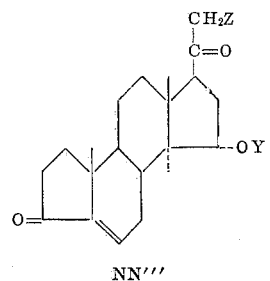

NN'''

LXXXIVa Z=halide ;
  Y=CH₃CO
LXXXIVb Z=CH₃COO ;
  Y=CH₃CO
LXXXIVc Z=OH ;
  Y=CH₃CO
LXXXIVd Z=H ;
  Y=CH₃CO
LXXXIVe Z=halide ;
  YO=O=
LXXXIVf Z=CH₃COO ;
  YO=O=
LXXXIVg Z=OH ; YO=O=
LXXXIVh Z=H ; YO=O=

In the first step of this alternate procedure, Compounds J (wherein R=CH₃CO and R'=CH₃) are reduced as by the Wolff-Kishner reduction process, employing hydrazine and potassium hydroxide at elevated temperatures of yield the 3,15-diacetoxy-5α-androstane-17β-carboxylate (Compounds JJ''') which are new compounds of this invention.

Compounds JJ''' are then treated in accordance with the procedures set forth hereinabove in the treatment of Compounds L''' and M''' to yield the corresponding 3-keto-A-norandrostanes (Compounds KK) which are also new compounds of this invention.

In order to obtain the saturated final products of this alternate procedure (Compounds LL''') Compounds KK''' are treated in exactly the same manner as set forth hereinbefore in the treatment of Compounds N''' through P''' to obtain Compounds Q'''. Thus, Compounds KK''' (R=H) are treated with an acid halide, converted into the diazoketones as with ethereal diazomethane and then reduced to yield the 3,20-diketo,15α-acetoxy-A-nor-pregnanes (Compounds LL''') which are new compounds of this invention.

Compounds KK''' may also be treated in accordance with the procedures set forth hereinabove in the treatment of Compounds N''' through BB''' and EE''' to yield the saturated A-nor-Δ¹-pregnene-15α-acetoxy-3,20-diones (Compounds MM''') and the A-nor-Δ⁵-pregnene-15α-acetoxy-3,20-diones (Compounds NN'''), both of which are new final products of this invention.

Still more new final products of this invention may be obtained by the further processing of some of the derivative material obtained in the treatment of the original sulfurenic acid starting material. The additional processing required to obtain these new final products is set forth in the following equations wherein Y, R, R' and Z are as hereinbefore defined:

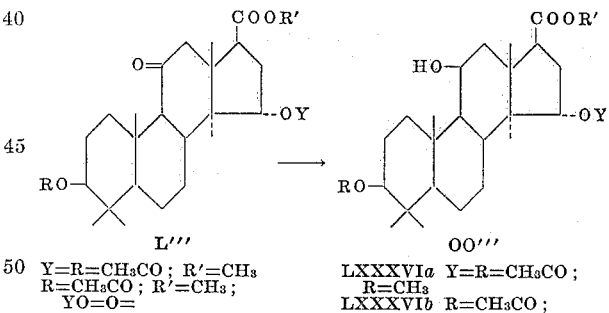

L'''
Y=R=CH₃CO ; R'=CH₃
R=CH₃CO ; R'=CH₃ ;
  YO=O=

OO'''
LXXXVIa Y=R=CH₃CO ;
  R=CH₃
LXXXVIb R=CH₃CO ;
  R'=CH₃ ; YO=O=

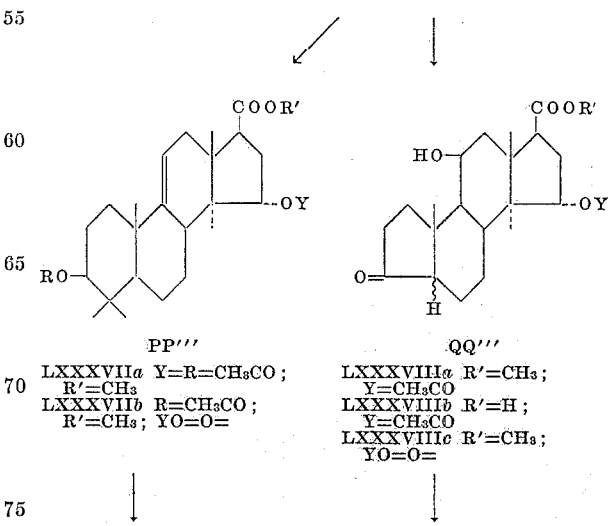

PP'''
LXXXVIIa Y=R=CH₃CO ;
  R'=CH₃
LXXXVIIb R=CH₃CO ;
  R'=CH₃ ; YO=O=

QQ'''
LXXXVIIIa R'=CH₃ ;
  Y=CH₃CO
LXXXVIIIb R'=H ;
  Y=CH₃CO
LXXXVIIIc R'=CH₃ ;
  YO=O=

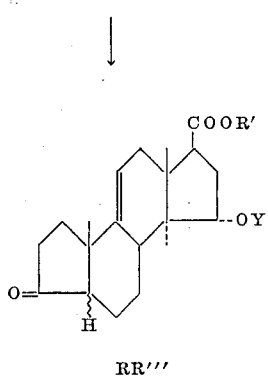

RR'''

LXXXIXa R'=CH₃; Y=CH₃CO
LXXXIXb R'=H; Y=CH₃CO
LXXXIXc R'=CH₃; YO=O=

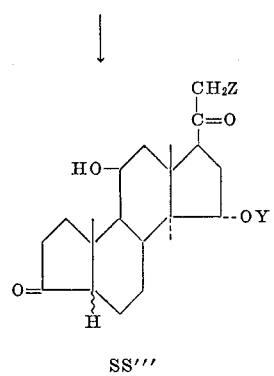

SS'''

XCa Z=halide; Y=CH₃CO
XCb Z=CH₃COO; Y=CH₃CO
XCc Z=OH; Y=CH₃CO
XCd Z=H; Y=CH₃CO
XCe Z=halide; YO=O=
XCf Z=CH₃COO; YO=O=
XCg Z=OH; YO=O=
XCh Z=H; YO=O=

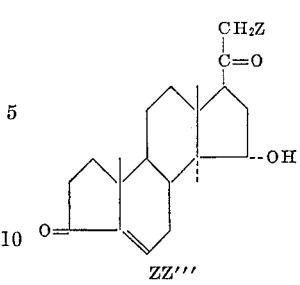

ZZ'''

XCVIa Z=halide; Y=CH₃CO
XCVIb Z=CH₃COO; Y=CH₃
XCVIc Z=OH; Y=CH₃CO
XCVId Z=H; Y=CH₃CO
XCVIe Z=halide; YO=O=
XCVIf Z=CH₃COO; YO=O=
XCVIg Z=OH; YO=O=
XCVIh Z=H; YO=O

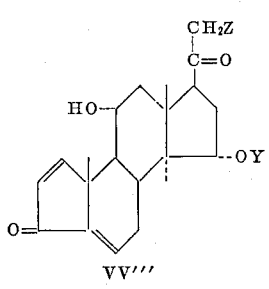

VV'''

XCIVa Z=halide; Y=CH₃CO
XCIVb Z=CH₃COO; Y=CH₃CO
XCIVc Z=OH; Y=CH₃CO
XCIVd Z=H; Y=CH₃CO
XCIVe Z=halide; YO=O=
XCIVf Z=CH₃COO; YO=O=
XCIVg Z=OH; YO=O=
XCIVh Z=H; YO=O=

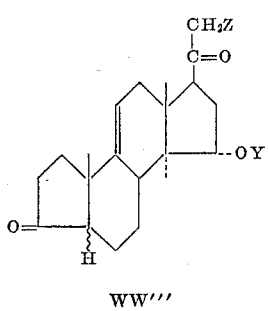

WW'''

XCIIIa Z=halide (Cl, Br, F, I) Y=CH₃CO
XCIIIb Z=CH₃COO; Y=CH₃CO
XCIIIc Z=OH; Y=CH₃CO
XCIIId Z=H; Y=CH₃CO
XCIIIe Z=halide; YO=O=
XCIIIf Z=CH₃COO; YO=O=
XCIIIh Z=H; YO=O=

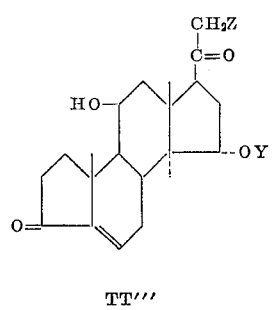

TT'''

XCIa Z=halide (Cl, Br, F, I) Y=CH₃CO
XCIb Z=CH₃COO; Y=CH₃CO
XCIc Z=OH; Y=CH₃CO
XCId Z=H; Y=CH₃CO
XCIe Z=halide; YO=O=
XCIf Z=CH₃COO; YO=O=
XCIg Z=OH; YO=O=
XCIh Z=H; YO=O=

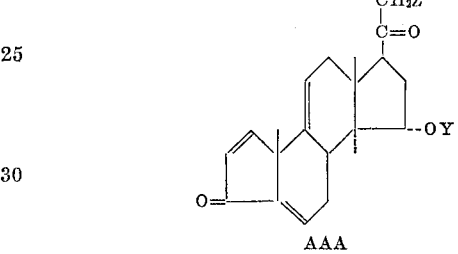

AAA

XCVIIa Z=halide; Y=CH₃CO
XCVIIb Z=CH₃COO; Y=CH₃CO
XCVIIc Z=OH; Y=CH₃CO
XCVIId Z=H; Y=CH₃CO
XCVIIe Z=halide; YO=O=
XCVIIf Z=CH₃COO; YO=O=
XCVIIg Z=OH; YO=O=
XCVIIh Z=H; YO=O=

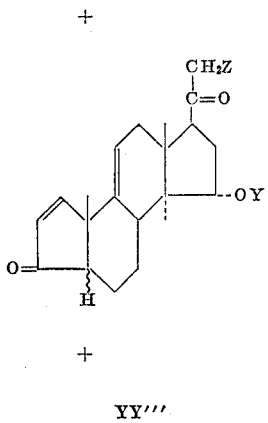

YY'''

XCVa Y=CH₃CO; Z=halide (Cl Br, F, I)
XCVb Z=CH₃COO; Y=CH₃CO
XCVc Z=OH; Y=CH₃CO
XCVd Z=H; Y=CH₃CO
XCVe Z=halide; YO=O=
XCVf Z=CH₃COO; YO=O=
XCVg Z=OH; YO=O=
XCVh Z=H; YO=O=

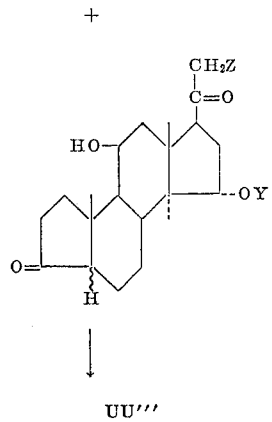

UU'''

XCIIa Z=halide (Cl, Br, F, I) Y=CH₃CO
XCIIb Z=CH₃COO; Y=CH₃CO
XCIIc Z=OH; Y=CH₃CO
XCIId Z=H; Y=CH₃CO
XCIIe Z=halide; YO=O=
XCIIf Z=CH₃COO; YO=O=
XCIIg Z=OH; YO=O=
XCIIh Z=H; YO=O=

In the first step of this alternate process, Compounds L''' (wherein R is CH₃CO and R' is CH₃) are reduced as by treatment with lithium borohydride to yield the 3,15-diacetoxy-11-hydroxy androstanes (Compounds OO'''), which are new products of this invention. Compounds OO''' may then be further treated with a base, such as pyridine, and methanesulfonyl chloride in dimethylformamide to yield the Δ$^{9(11)}$-androstene-17β-carboxylates (Compounds PP'''), which are also new compounds of this invention.

Compounds OO''' and PP''' may then be treated in accordance with the procedures set forth hereinabove in the production of Compounds N''' from Compounds L''' and M''' to yield the corresponding A-nor-Δ$^{9(11)}$-androstenes (Compounds RR''') and 11β-hydroxy-A-norandrostanes (Compounds QQ''') which are also new compounds of this invention.

Compounds RR''' and QQ''' are then treated in the same manner as set forth hereinabove to yield Compounds Q''', S''' and FF''' thus producing respectively, the A-nor-Δ$^{9(11)}$-pregnenes (Compounds WW'''), the A-nor-Δ$^{1,9(11)}$-pregnadienes (Compounds YY'''), the A-nor-Δ$^{5,9(11)}$-pregnatrienes (Compounds AAA) from Compounds RR'''; and the 11β-hydroxy-A-nor-pregnanes (Compounds SS'''), the 11β-hydroxy-A-nor-Δ⁵-pregnenes (Compounds TT'''), the 11β-hydroxy-A-nor-Δ¹-pregnenes (Compounds UU''') and the 11β-hydroxy-A-nor-Δ$^{1,5}$-pregnadienes (Compounds VV''') from Compounds QQ'''. All these compounds are new final products of the instant invention.

In addition to the foregoing, new compounds of this invention may be produced by an alternate procedure. The starting material employed in this alternate process is derived from the treatment of the original sulfurenic acid starting material as described hereinbefore. This alternate process may be represented by the following equations wherein, Y, R, R' and Z are as hereinbefore defined:

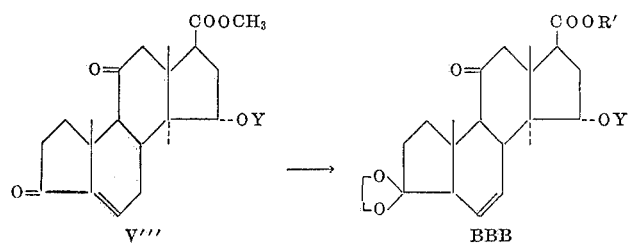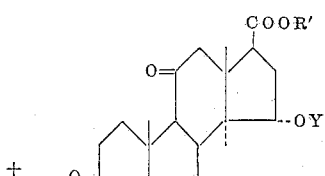

V'''

BBB
XCVIIa R'=CH₃; Y=CH₃CO
XCVIIb R'=H; Y=CH₃CO
XCVIIc R'=CH₃; YO=O=

CCC
XCIXa R'=CH₃; Y=CH₃CO
XCIXb R'=H; Y=CH₃CO
XCIXc R'=CH₃; YO=O=

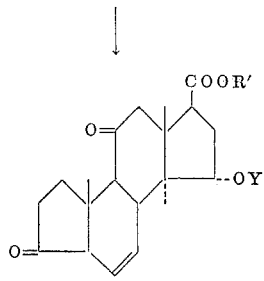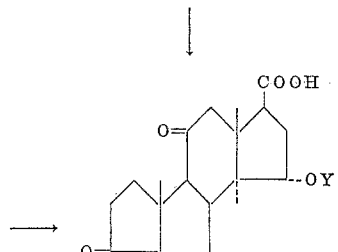

DDD
Ca R'=H; Y=CH₃CO
Cb R'=CH₃; Y=CH₃CO
Cc R'=CH₃; YO=O=

W'''
Cd Y=CH₃CO
Ce YO=O=

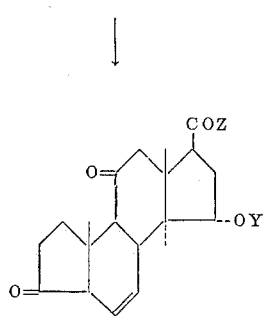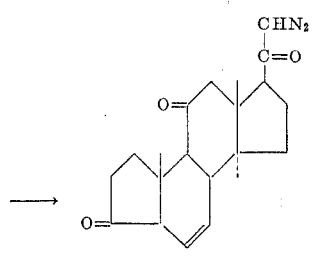

EEE
CIa Z=halide; Y=CH₃CO
CIb Z=halide; YO=O=

FFF
CIc Y=CH₃CO
CId YO=O=

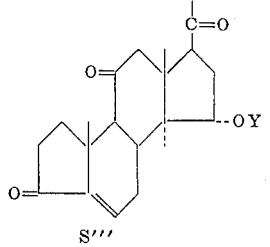

S'''

Z=halide; Y=CH₃CO
Z=CH₃COO; Y=CH₃CO
Z=OH; Y=CH₃CO
Z=H; Y=CH₃CO
Z=halide; YO=O=
Z=CH₃COO; YO=O=
Z=OH; YO=O=
Z=H; YO=O=

In the first step of this alternate process the A-nor-Δ⁵-androstene-17β-carboxylates (Compounds V''') are ketalized as by treatment with ethylene glycol in an acid medium at elevated temperatures to yield a mixture of the 3-alkylenedioxy - A - nor-Δ⁶-androstenes-17β-carboxylates (Compounds BBB) and the 3-alkylenedioxy-A - nor - Δ⁵ - androstene - 17β - carboxylates (Compounds CCC) which are new compounds of this invention.

The mixture thus obtained may be seperated into the individual compounds as by fractional crystallization or chromatographic separation. The 17β-carboxylates (Compounds BBB and CCC) may be converted into the corresponding free acid compounds (wherein R' is H) by treating the 17β-carboxylates with a base, such as potassium hydroxide, in an alcohol medium thus producing the corresponding A-nor-Δ⁶-androstene-17β-carboxylic acids (Compounds BBB) and the A-nor-Δ⁵-androstene-17β-carboxylic acids (Compounds CCC).

Compounds CCC may then be hydrolyzed by treatment with a mineral acid to yield the free acid of Compounds V'''. Compounds BBB may be treated with an organic acid, for example acetic acid at room temperature to yield the A-nor-$\Delta^6$-androstene-15-substituted-3,11-diones (Compounds DDD) which are new compounds of this invention. Compounds DDD may then be treated in accordance with the procedures described in the treatment of compounds N''', O''' and P''', in order to yield the final products of this invention, Compounds S'''. Thus, Compounds DDD are treated with an acid halide to yield Compounds EEE, which are then methylated as with ethereal diazomethane to form Compounds FFF which are then reacted with the appropriate acid to yield the final products of this invention, Compounds S'''.

Still further processing of some of the derivaties of this invention is possible within the scope thereof. This additional processing may be represented by the following equations, wherein R, R' and Z are as hereinbefore defined:

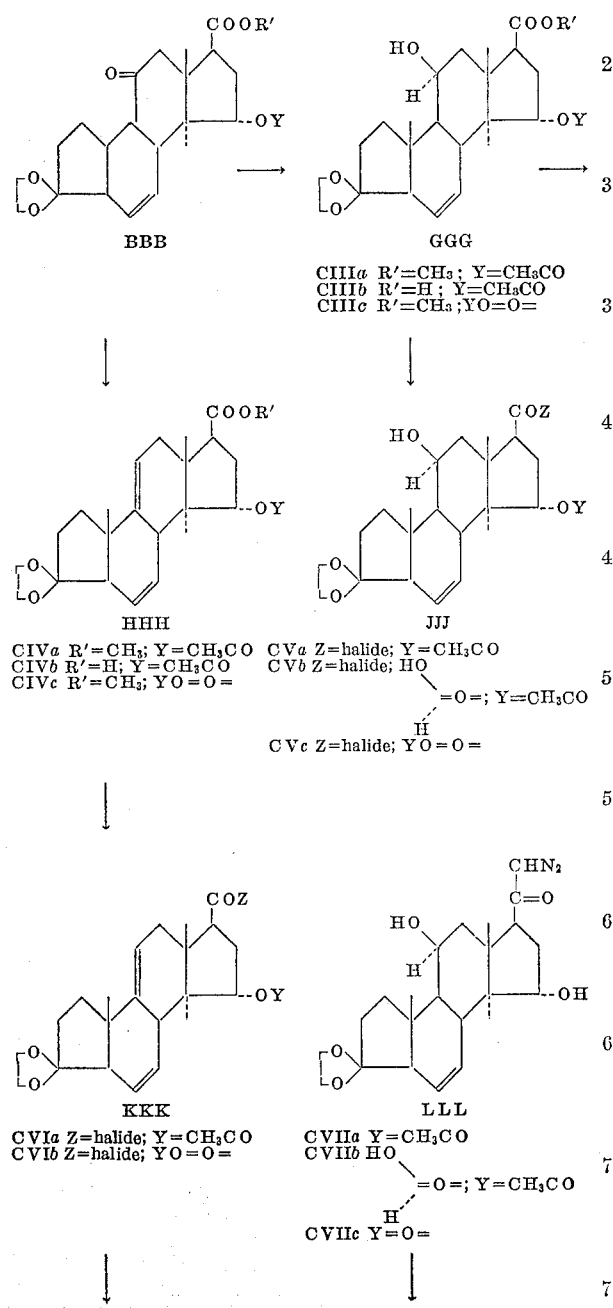

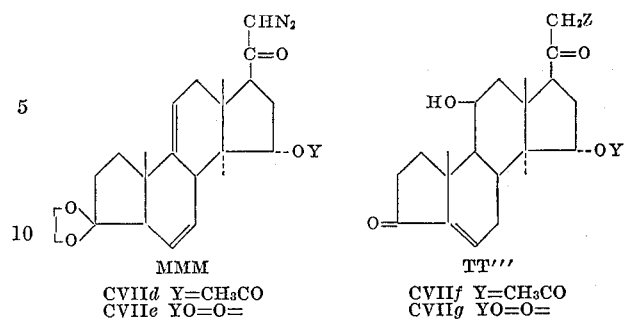

In the first step of this additional processing Compounds BBB are reduced as by treatment with lithium borohydride to yield the 3-alkylenedioxy-A-nor-$\Delta^6$-androstene-11$\beta$-ols (Compounds GGG), which are new compounds of this invention. Compounds GGG may then be treated with a base, such as pyridine, and methanesulfonyl chloride in dimethylformamide to yield the A-nor-$\Delta^{6,9(11)}$-androstadienes (Compounds HHH), which are also new compounds of this invention.

Compounds GGG and HHH may then be processed in the same manner to yield the final products of this invention, Compounds TT''' and Compounds ZZ''', respectively. Thus, treatment with an acid halide, e.g., oxalyl chloride yields the corresponding acid chlorides, Compounds JJJ and Compounds KKK; reaction thereof with a methylating agent, e.g., ethereal diazomethane, yields Compounds LLL and MMM, and the reaction of these compounds as set forth hereinabove in the treatment of Compounds BB''', yields the final products of this invention, Compounds TT''' and ZZ''', respectively.

Alternatively, Compounds GGG and HHH may be hydrolyzed with a fatty acid, such as acetic acid, to yield the $\Delta^6$-3-keto-15-substituted A-nor-androstenes (Compounds NNN) and the $\Delta^{6,9(11)}$-3-keto-A-nor-androstadienes (Compounds OOO). Compounds NNN and Compounds OOO may then be treated with a mineral acid to yield respectively the $\Delta^5$-3-keto-15-substituted-A-nor-androstenes (Compounds PPP) and the $\Delta^{5,9(11)}$-3-keto-15-substituted A-nor-androstadienes (Compounds QQQ), all of which are new compounds of this invention. Compounds PPP and QQQ may then be treated in accordance with the procedure hereinbefore described for the treatment of Compounds N''', O''' and P''', in order to yield the final products of this invention, Compounds TT'''' and Compounds ZZ''', respectively.

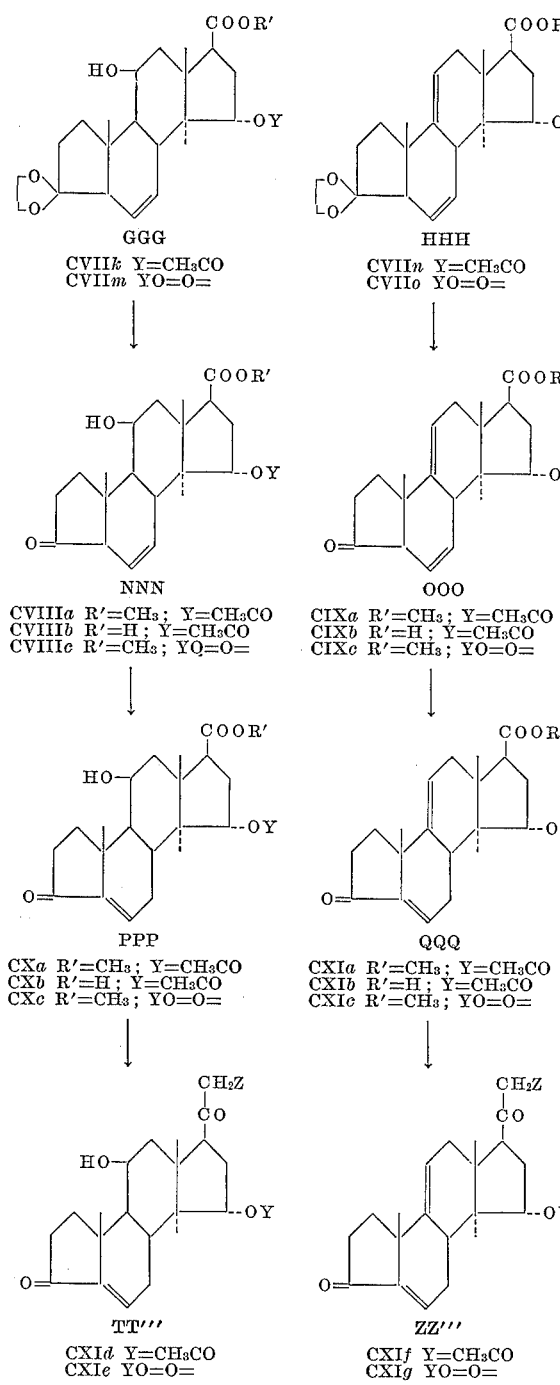
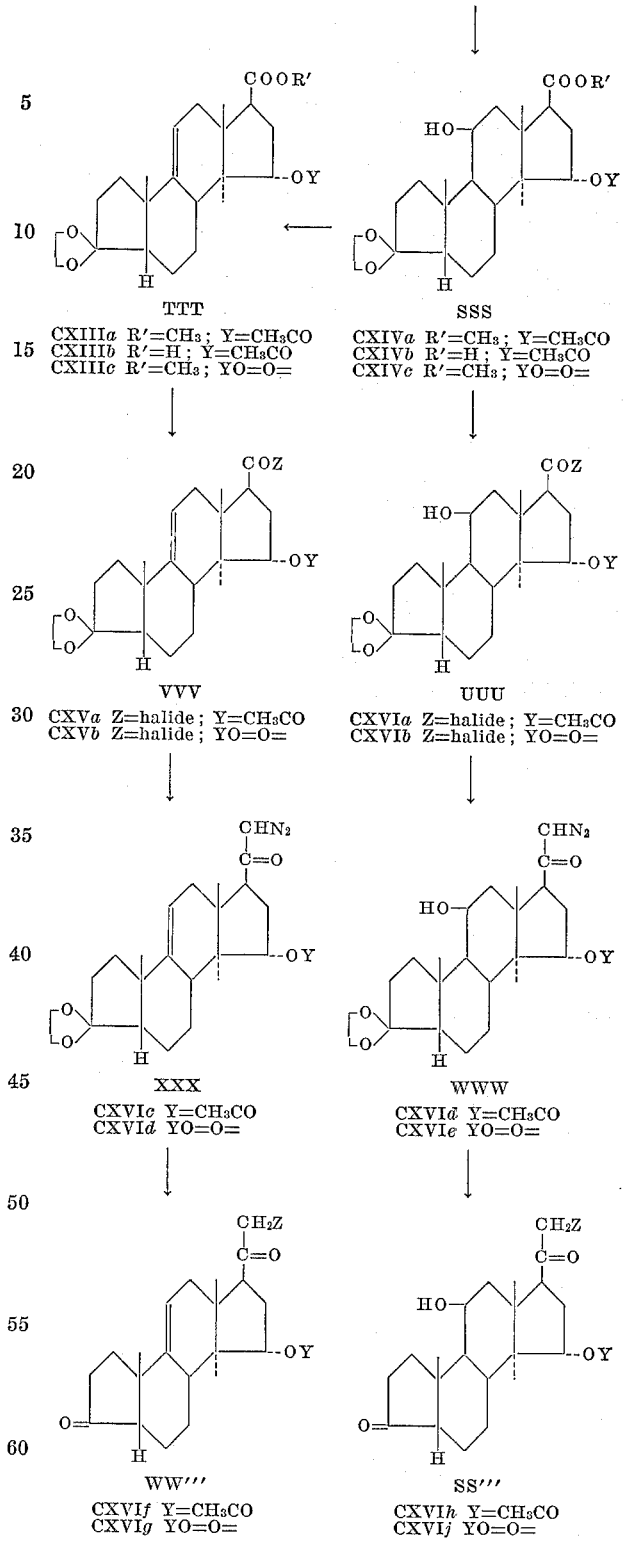

Still more alternate processing of the derivatives of this invention is possible in obtaining the final products thereof. This additional procedure is represented by the following equations wherein Y, R, R' and Z are as hereinbefore defined:

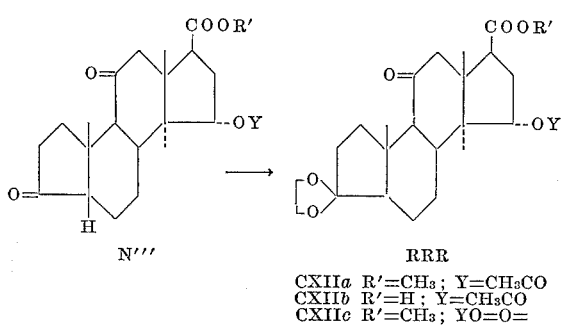

The first step of this alternate process involves ketalizing Compounds N''' by treatment with ethylene glycol in an acid medium at elevated temperatures to yield the 3-alkylene-dioxy-A-norandrostanes (Compounds RRR) which are new compounds of this invention. Compounds RRR are then reduced as by treatment with lithium borohydride to yield the 3-alkylene-dioxy-11β-hydroxy-A-norandrostanes (Compounds SSS), which are also new compounds of this invention. Compounds SSS may then be treated with a base, such as pyridine, and methanesulfonyl chloride, in dimethylformamide to yield the A-nor-$\Delta^{9(11)}$-androstenes (Compounds TTT), which are also new compounds of this invention. Compounds TTT and SSS may then be treated in the same manner to yield the final products of this invention Compounds WW''' and SS''', respectively. Thus, treatment of the compounds with an acid halide, e.g., oxalyl chloride yields the corresponding acid chlorides, Compounds VVV and UUU; reaction thereof with a methylating agent, e.g., ethereal diazomethane, yields Compounds XXX and WWW; and the treatment of these compounds as set forth hereinabove in the treatment of Compounds BB''', yields the final products of this invention, Compounds WW''' and SS''', respectively.

In all the alternate processes of this invention wherein the intermediate compounds employed in the production of the final products, possess a double bond in the six position it has been found that the final products will always possess a double bond in the bond in the five position. This shift in the bond position occurs whenever a mineral acid is employed in the process. To date it has not been found possible in the practice of this invention to obtain the final products of the invention possessing a double bond in the six position.

In addition to the foregoing, further novel products of this invention may be obtained by the employment of alternate processes of this invention. These alternate processes employing Compounds H' as starting material may be represented by the following equations wherein Y, R, R', A and Z are as hereinbefore defined:

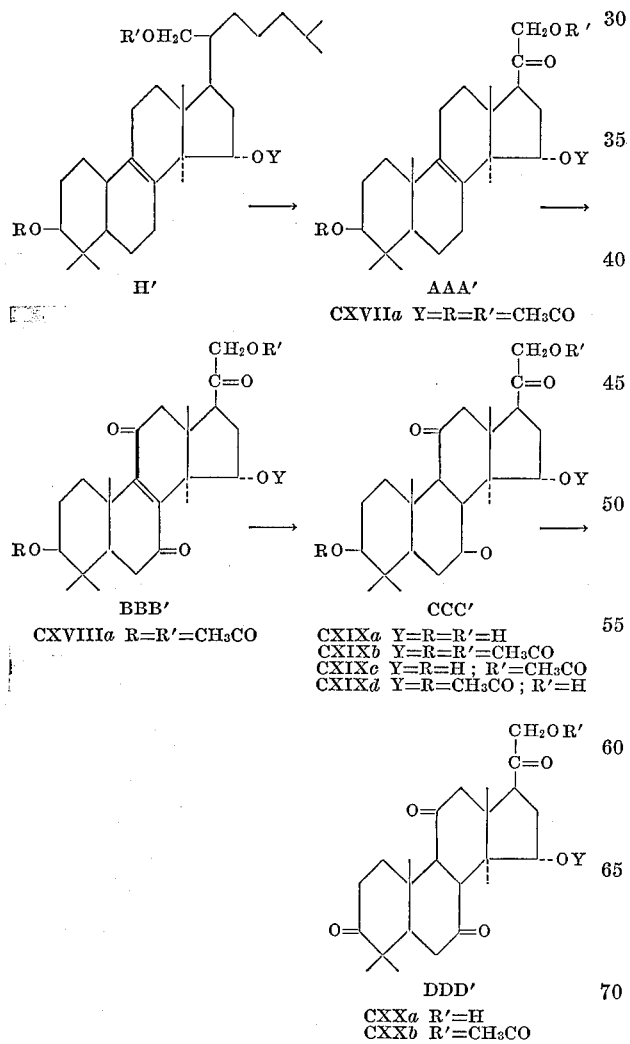

The final products of this invention, wherein Z is hydrogen, are prepared by a process of this invention which entails a number of steps beginning with corresponding 21-hydroxy steroid derivatives as starting materials. These steps are shown by the following equations, wherein Y is hydroxy, acyloxy or oxo (O=), and A is lower alkyl or tolyl:

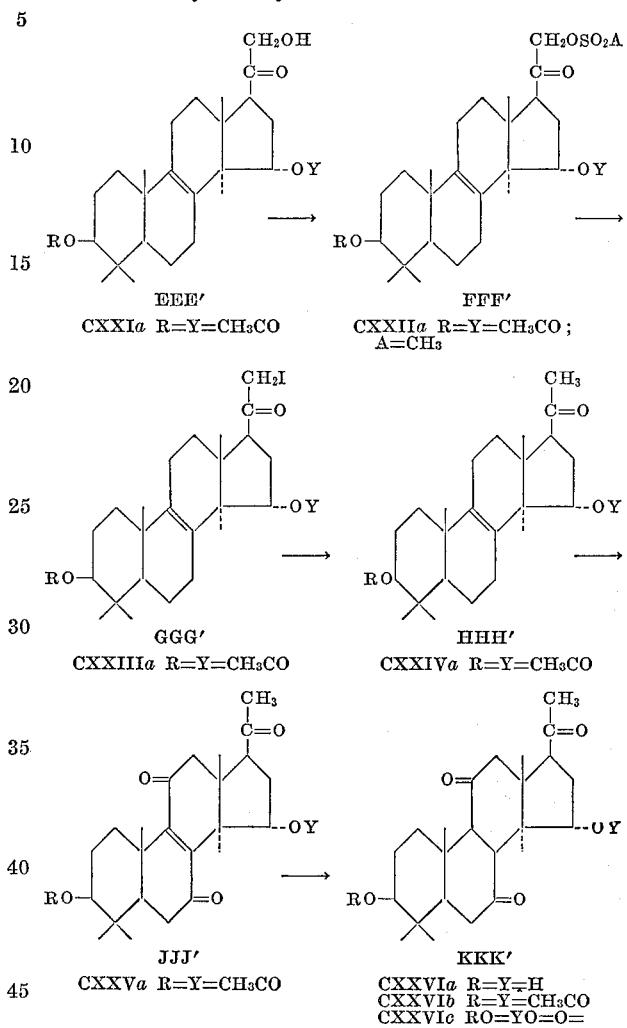

Compounds H' are first oxidized as by treatment with ozone and reduction of the ozonide formed, to yield $3\beta,15,21$-trihydroxy-4,4,14$\alpha$-trimethyl - $\Delta^8$ - 5$\alpha$-pregnene-20-one (Compounds AAA').

Compounds AAA' are then oxidized as by treatment with chromium trioxide in glacial acetic acid to produce the 7,11,20-triketone (Compounds BBB'), which are new compounds of this invention.

Compounds BBB' of this invention are then treated with zinc and acetic acid to produce the pregnane-7,11,20-triketones (Compounds CCC'), which are substituted in the 21-position, and which are also new compounds of this invention.

When a 3,15-diester compound is formed, it may be saponified in the usual manner, as by treatment with a base such as potassium hydroxide to yield the corresponding free $3\beta,15\alpha$-dihydroxy derivative, and the free, 3,15-dihydroxy compound oxidized to the corresponding 3,15-diketo derivative in the usual manner, as by treatment with chromium trioxide (Compounds DDD').

If a 21-unsubstituted compound is desired, a compound containing a free 21-hydroxy group (Compounds EEE') is acylated by treatment with an organic sulfonyl chloride, such as a lower alkanesulfonyl chloride (e.g., mesyl chloride) or tosyl chloride, to yield the corresponding 21-sulfonic acid ester (Compounds EEE').

The 21-sulfonic acid esters are then converted to their corresponding 21-iodo derivatives (Compounds FFF')

by treatment with an alkali metal iodide (e.g. sodium iodide) preferably at an elevated temperature.

The 21-iodo derivatives are then reduced, as by treatment with sodium bisulfite to produce 21-unsubstituted compounds (Compounds GGG'). These compounds are then oxidized as by treatment with chromium trioxide in glacial acetic acid to produce the 7,11,20-triketone which are new compounds of this invention (Compounds JJJ').

The triketones are then treated with zinc and acetic acid to produce the pregnane-7,11,20-triones, which are new compounds of this invention. When a 3,15-dihydroxy or 3,15-diacyloxy derivative is formed, it may be oxidized to the corresponding 3,15-diketo derivative (after saponification of the 3,15-diester groups, if present) to yield the final 3,15-diketo compounds of this invention (Compounds KKK').

Like results as obtained above, may be obtained when the starting materials contain a 15-keto substituent (i.e., YO=O=). This starting material may be obtained by the processing of Compounds I (wherein YO=O=) or Compounds III, in accordance with the procedures set forth hereinbefore for the production of Compounds H'. Thus if Compounds IIIc are treated in accordance with the procedures set forth in the production of Compounds B', C', D', E', F', G' and H', there is obtained those compounds wherein a keto group is present in the 15 position (i.e., YO=O=).

The invention may be further illustrated by the following examples (all temperatures being in degrees centigrade unless otherwise noted).

*Example 1.—3β,15α-diacetoxy-24-keto-Δ⁸-lanostene-21-oic acid*

Through a solution of 15 g. of diacetyl sulfurenic acid (Ib) in a mixture of 150 ml. of chloroform and 150 ml. of ethyl acetate, cooled in a Dry Ice-acetone bath, is passed 29 l. of ozone (1 mole of ozone contained in .89 l. of oxygen). The resulting solution is allowed to warm to room temperature and then added to a suspension of 975 mg. of pre-reduced 5% palladium on charcoal catalyst in 50 ml. of ethyl acetate. 550 ml. of hydrogen is taken up rapidly, following which the solution is filtered and the filtrate evaporated to dryness in vacuo.

Alternately the ozonide can be decomposed with zinc in acetic acid as follows: The ozonolysis mixture obtained from diacetyl sulfurenic acid in chloroform and ethyl acetate, is allowed to warm up to −10° when it is diluted with glacial acetic acid. Powdered zinc is then added in portions with stirring and the temperature allowed to rise to +15°. After 2½ hours the reaction mixture is filtered and the zinc and zinc salts washed thoroughly with ethyl acetate. The ethyl acetate-chloroform filtrate is washed thoroughly with water, dried over sodium sulfate and evaporated to dryness in vacuo. The crude keto acid is obtained. The acid is obtained in pure form by chromatography on neutral alumina.

*Example 2.—3β,15α-diacetoxy-24,28-dihydroxy-Δ⁸-eburicene-21-oic acid*

To a solution of diacetyl sulfurenic acid (Ib) in benzene and pyridine is added dropwise a solution of osmium tetroxide in benzene. Addition is complete in 1 hour and the reaction mixture is allowed to remain at room temperature for an additional 4 hours. The resulting dark solution is diluted with 76 ml. of dioxane and saturated with hydrogen sulfide for 15 minutes. The resulting suspension is filtered with the aid of Celite and the filtrate evaporated to dryness. The resulting residue is triturated with acetone leaving the dihydroxy acid. Recrystallization of this material from 95% ethanol furnishes the pure dihydroxy acid.

*Example 3.—3β,15α - diacetoxy - 24 - hydroxy-Δ⁸,²³-lanostadiene-21-oic acid lactone (α-lactone) and 3β,15α-diacetoxy-24-hydroxy-Δ⁸,²⁴-lanostadiene-21-oic acid lactone (β-lactone)*

To a solution of 3β,15α-diacetoxy-24-keto-Δ⁸-lanostene-21-oic acid in acetic anhydride is added anhydrous sodium acetate and the resulting suspension is heated under reflux for 10 hours. Upon cooling, the acetic anhydride solution is decanted from the sodium acetate and the latter washed thoroughly with benzene. The combined acetic anhydride-benzene solutions are evaporated to dryness in vacuo, the residue redissolved in benzene and filtered from the precipitated sodium acetate. The clear benzene solution is evaporated to dryness leaving a mixture of the α- and β-enol lactones. Separation may be achieved by chromatography on neutral alumina.

*Example 4.—3β,15α-diacetoxy-24-hydroxy-Δ⁸,²⁰⁽²²⁾,²³-lanostatriene-21-oic acid lactone (α-pyrone)*

A suspension of 180 mg. of 10% palladium on charcoal in 25 ml. of p-cymene is distilled until approximately 3 ml. of solvent have been removed. The final temperature of the vapors is over 170°. 250 mg. of the thoroughly dried α-enol lactone of Example 3 is then added and the resulting suspension heated under reflux with stirring for 2 hours under a blanket of nitrogen. The mixture is cooled, filtered and the solvent removed in vacuo. The residual crystalline material on recrystallization from absolute ethanol furnishes the pure α-pyrone in about 75% yield.

When the β-enol lactone is substituted for the α-lactone in Example 4 and the reaction time is prolonged to 6 hours, the pyrone is obtained in about 60% yield. Moreover, when a mixture of α- and β-enol lactones is dehydrogenated with 10% palladium on charcoal in p-cymene for 6 hours, the pure α-pyrone is obtained.

*Example 5.—3β,15α,24-trihydroxy-Δ⁸,²⁰⁽²²⁾,²³-lanostatriene-21-oic acid lactone*

To a solution of 510 mg. of potassium hydroxide in 10 ml. of ethylene glycol is added the finely ground α-pyrone diacetate of Example 3. The suspension is stirred and immersed in an oil bath held at a temperature of 150°. After 5 minutes there results a clear pale yellow solution which is heated for an additional 4 minutes and then cooled. 25 ml. of water is added and the mixture extracted with ether. The ether extract is washed with saturated sodium chloride solution, dried over sodium sulfate and evaporated to dryness in vacuo. A crystalline residue is obtained which on recrystallization from acetone furnishes long needles of the α-pyrone 3,15-diol.

*Example 6.—24-hydroxy-3,15-diketo-Δ⁸,²⁰⁽²²⁾,²³-lanostatriene-21-oic acid lactone*

To a solution of 3β,15α,24-trihydroxy-Δ⁸,²⁰⁽²²⁾,²³-lanostatriene-21-oic acid 3β,15α,24-trihydroxy lactone in acetone is added a 90% aqueous acetone solution of chromium trioxide and concentrated sulfuric acid. After 10 minutes methanol is added to reduce excess chromium trioxide and the solution is diluted with water and extracted with chloroform. The chloroform extract is dried over sodium sulfate and evaporated to dryness in vacuo. The crystalline residue on recrystallization from acetonitrile produces the analytically pure 3,15-diketone.

*Example 7.—3β,15α-diacetoxy-24-hydroxy-Δ⁷,²⁰⁽²²⁾,²³-lanostatriene-21-oic acid lactone*

A solution of 3β,15α-diacetoxy-24-hydroxy-Δ⁸,²⁰⁽²²⁾,²³-lanostatriene-21-oic acid lactone in glacial acetic acid is saturated with dry hydrogen chloride gas first at 10° and finally as more HCl dissolves at 0°. This requires a total of 30 minutes. The solution is maintained for an additional hour at 0° and then evaporated to dryness in vacuo. The resulting crystalline residue on recrystallization from 95% ethanol and chloroform furnishes about 75% of a mixture consisting largely of the Δ⁷- and some of the Δ⁸-isomer. A sample of this product is chromatographed on acid-washed alumina using a 100:1 ratio of alumina to sample. After elution of the Δ⁸-isomer with chloroform-benzene (1:8) the main fraction is eluted with pure chloroform to give the pure Δ⁷-isomer.

*Example 8.—3β,15α,21-trihydroxy-$\Delta^{8,20(22),23}$-lanostatriene*

A solution of the α-pyrone of Example 4 in freshly distilled tetrahydrofuran is added over a 15 minute period to a refluxing solution of lithium hydride in tetrahydrofuran with stirring under a blanket of nitrogen. Reflux is continued for an additional 2 hours and the solution is cooled to room temperature. Saturated sodium sulfate solution is then added carefully until all the lithium aluminum hydride is decomposed, after which the reaction mixture is shaken with several 200 ml. portions of benzene and the resulting extracts decanted from the inorganic salts until all the organic material is extracted. The benzene-tetrahydrofuran solution is dried over sodium sulfate and evaporated to dryness in vacuo. The resulting residue is dissolved in 100 ml. of benzene and the solution chromatographed on 100 g. of neutral alumina washing the column with 800 ml. of benzene to remove some impurities. The desired trienetriol is obtained by elution with 2800 ml. of 10% chloroform in benzene. The combined eluates are evaporated to dryness and recrystallized from ether, which results in the pure trienetriol.

*Example 9.—3β,15α,21-triacetoxy-$\Delta^{8,20(22),23}$-lanostatriene*

A solution of the trienetriol in anhydrous pyridine and acetic anhydride is allowed to stand at room temperature overnight. Removal of the reagents in vacuo leaves a residue which on crystallization from methanol furnishes the pure triacetate.

Similarly, if other acylating agents, such as propionic anhydride, butyric anhydride and benzoyl chloride, are substituted for the acetic anhydride in the procedure of Example 9, the corresponding triesters are formed.

*Example 10.—3β,15α,21-trihydroxy-$\Delta^{8,20(22)}$-lanostadiene*

The trienetriol is hydrogenated in absolute ethanol with 10 mg. of 5% palladium on charcoal. Within 6 minutes a sharp break corresponding to the uptake of 1 mole equivalent of hydrogen occurs, at which time the reaction is interrupted. The catalyst is filtered off and the solvent evaporated in vacuo. The dihydro derivative crystallizes from methanol containing a trace of water.

*Example 11.—3β,15α-diacetoxy-21-hydroxy-$\Delta^{8,20(22),23}$-lanostatriene*

To a solution of 3β,15α,21-triacetoxy-$\Delta^{8,20(22),23}$-lanostatriene in methanol is added with stirring under nitrogen, 10% oxygen-free potassium carbonate. After two hours at room temperature glacial acetic acid is added and after the addition of water the methanol is removed in vacuo. The mixture is extracted with chloroform, the chloroform extract washed with water, dried over sodium sulfate and evaporated to dryness in vacuo. The resulting residue of 3β,15α-diacetoxy-21-hydroxy compound is recrystallized from acetone-hexane.

*Example 12.—3β,15α,21-trihydroxy-4,4,14α-trimethyl-$\Delta^8$-5α-pregnene-20-one*

A solution of the trienediol in 40 ml. of ethyl acetate is ozonized at −20° with ozone. The resulting ozonide is decomposed at room temperature by the addition of glacial acetic acid and zinc dust (in portions). The mixture is stirred for 2½ hours when it no longer gives a positive test with potassium iodide starch reagent. The solution is filtered and washed with sodium chloride solution, dried over sodium sulfate and the solvent removed in vacuo. A crystalline residue remains, which on recrystallization from methanol furnishes 3β,15α,21-trihydroxy-4,4,14α-trimethyl-$\Delta^8$-5α-pregnene-20-one.

*Example 13.—3β,15α,21-triacetoxy-4,4,14α-trimethyl-$\Delta^8$-5α-pregnene-20-one*

The trienediol triacetate is dissolved in ethyl acetate and ozonized at −25° with 3 mole equivalents of ozone. To the resulting solution are added at room temperature a few drops of acetic acid and then portionwise a total of 1 g. of zinc dust until a negative starch iodide test is observed, which requires about 3 hours. The mixture is then filtered, washed with a saturated salt solution, dried over sodium sulfate and evaporated to dryness in vacuo. A crystalline residue is obtained, which on recrystallization from methanol yields crude material. Further crystallization from methanol furnishes analytical sample of 3β,15α,21 - triacetoxy - 4,4,14α-trimethyl-$\Delta^8$-5α-pregnene-20-one.

*Example 14.—3β,15α-dihydroxy-21-acetoxy-4,4,14α-trimethyl-$\Delta^8$-5α-pregnene-20-one*

The triol is monoacetylated with a solution of acetic anhydride in pyridine containing 1.1 moles equivalent of acetic anhydride at room temperature for 18 hours. The reagents are evaporated in vacuo and the crystalline residue is recrystallized from methanol. After two crystallizations the 21-monoacetate is obtained.

*Example 15.—3β,15α,-diacetoxy-21-hydroxy-4,4,14α-trimethyl-$\Delta^8$-5α-pregnene-20-one*

To a solution of the triacetate of Example 13 in 20 ml. of methanol is added with stirring under nitrogen 10% oxygen-free potassium carbonate. After 2 hours at room temperature, glacial acetic acid is added and after the addition of water, the methanol is removed in vacuo. The mixture is extracted with chloroform, the chloroform extract washed with water, dried over sodium sulfate and evaporated to dyness in vacuo. The resulting crystalline residue after recrystallization from methanol furnishes the pure 3,15-diacetate.

*Example 16.—21-acetoxy-4,4,14α-trimethyl-$\Delta^8$-5α-pregnene-3,15,20-trione*

A solution of the 21-acetate of Example 14 in acetone is oxidized with a solution containing 20 mg. of chromium trioxide and 32 mg. of concentrated sulfuric acid per millimeter of 90% aqueous acetone. The reaction is allowed to proceed for 15 minutes when excess chromium trioxide is decomposed by the addition of methanol. Water and chloroform are added and the chloroform extract washed with water, dried over sodium sulfate and evaporated to dryness. The triketone crystallizes readily from methanol.

*Example 17.—21-hydroxy-4,4,14α-trimethyl-$\Delta^8$-5α-pregnene-3,15,20-trione*

To a solution of the acetate of Example 16 in methanol is added with stirring under nitrogen 10% oxygen-free potassium carbonate. After two hours at room temperature, glacial acetic acid is added and after the addition of water the methanol is removed in vacuo. The mixture is then extracted with chloroform, the chloroform extracted washed with water, dried over sodium sulfate and evaporated to dryness in vacuo to yield a residue of the 21-alcohol.

*Example 18.—3β,15α-diacetoxy-21-mesyloxy-4,4,14α-trimethyl-$\Delta^8$-5α-pregnene-20-one*

To a solution of the 3β,15α-diacetate of Example 15 in anhydrous pyridine is added at 0° methanesulfonyl chloride in chloroform. The reaction is allowed to remain at 0° for 2¾ hours, after which it is stopped by the addition of a small amount of ice. Chloroform and water are added and after separation of the phases the chloroform solution is washed with dilute sulfuric acid, water and then with dilute sodium bicarbonate keeping the extract cool at all times. The chloroform extract is dried over sodium sulfate, filtered and evaporated to dryness in vacuo leaving the 21-mesylate as a crystalline residue.

*Example 19.—21-mesyloxy-4,4,14α-trimethyl-Δ⁸-5α-pregnene-3,15-20-trione*

Following the procedure of Example 18 but substituting the 3,14-diketone for the 3,15α-diacetate, 21-mesyloxy-4,4,14α-trimethyl-Δ⁸ - 5α - pregnene - 3,15,20 - trione is obtained.

*Example 20.—3β-acetoxy-21-iodo-4,4,14α-trimethyl-Δ⁸-5α-pregnene-20-one*

A solution of the 21-mesylate of Example 18 and 120 mg. of sodium iodide in 1.5 ml. of acetone is refluxed for 10 minutes on the steam bath. Water is added and the mixture is extracted with chloroform. The chloroform extract is washed with water, dried over sodium sulfate and the solvent removed in vacuo. The dry residue represents the 21-iodo compound.

*Example 21.—21-iodo-4,4,14α-trimethyl-Δ⁸-5α-pregnene-3,15,20-trione*

Following the procedure of Example 20 but substituting the 21-mesylate of Example 19 for the 21-mesylate of Example 18, 21-iodo - 4,4,14α - trimethyl - Δ⁸ - 5α-pregnene-3,15,20-trione is obtained.

*Example 22.—3β-15α-diacetoxy-4,4,14α-trimethyl-Δ⁸-pregnene-20-one*

To a solution of the iodo compound of Example 20 in dioxane is added a 5% sodium bisulfite solution and the resulting mixture refluxed for 1 hour on the steam cone. Water and chloroform are added and after separation of the layers, the chloroform phase is washed with water, dried over sodium sulfate and evaporated to dryness in vacuo. The residual crystalline material on recrystallization from methanol furnishes the pure pregnene derivative.

*Example 23.—3β-15α-dihydroxy-4,4,14α-trimethyl-Δ⁸-5α-pregnene-20-one*

To a solution of the pregnene 3,15-diacetate of Example 22 in 1 N ethanolic KOH is allowed to stand at room temperature for 19 hours. At the end of this period crystals appear in the solution. The mixture is neutralized with 1 N sulfuric acid, diluted with water, the ethanol removed in vacuo and the aqueous suspension extracted with chloroform. The chloroform extract is dried over sodium sulfate and evaporated to dryness in vacuo. There remains a crystalline residue which after recrystallization from acetone furnishes analytically pure 3β,15α-dihydroxy-4,4,14α-trimethyl-Δ⁸-5α-pregnene-20-one.

*Example 24.—4,4,14α-trimethyl-Δ⁸-5α-pregnene-3,15,20-trione*

To a solution of the pregnene 3-ol of Example 23 in reagent grade acetone is added with stirring a solution containing chromium trioxide and sulfuric acid 90% aqueous acetone. The reaction is allowed to proceed for 15 minutes after which time it is stopped by the addition of a few drops of 95% ethanol. Water is added and the steroid extracted with chloroform. The chloroform extract is dried over sodium sulfate and evaporated to dryness in vacuo. There remains a crystalline residue, which after recrystallization from acetone produces the pure 3,15,20-triketone.

*Example 25.—3,15-diacetyl-Δ⁸-eburicene-3β,15α-diol-21-oate*

A solution of methyl 3-acetyl sulfurenate in ethyl acetate absorbs 1 equivalent of hydrogen when shaken in an atmosphere of hydrogen at room temperature and pressure in the presence of Adams catalyst. The catalyst is removed by filtration, the solvent evaporated and the residue is recrystallized from methanol-chloroform to give methyl - 3,15 - diacetyl-Δ⁸-eburicene-3β,15α-diol-12-oate.

*Example 26.—Methyl Δ⁸-eburicene-3β,15-diol-21-oate*

A solution of methyl-3,15-diacetyl-Δ⁸-eburicene 3β-ol-21-oate in 1 N ethanolic potassium hydroxide is allowed to stand at room temperature for 16 hours. The solution is then neutralized with 20% sulfuric acid and the solids filtered. The filtrate is diluted with water and the ethanol evaporated. The resulting solids are combined with the previously collected material and partitioned between ether and water. The ether layer is washed with water and evaporated to give methyl-Δ⁸-eburicene-3β,15α-diol-21-oate which is then recrystallized from methanol to yield crystalline material.

*Example 27.—3,15-diacetyl-Δ⁸-eburicene-3β,15α-diol-21-oic acid*

Methyl-3,15-diacetyl-Δ⁸-eburicene-3β,15α-diol 21-oate is dissolved in collidine (distilled from potassium hydroxide) containing lithium iodide and the mixture is heated at reflux under nitrogen for 15 hours. After cooling, the dark brown mixture is poured into 500 ml. of iced 2 N hydrochloric acid and extracted with ether-methylene chloride solvent (2 parts ether:1 part methylene chloride). The organic layer is washed with 5% hydrochloric acid and water, dried over sodium sulfate and evaporated to give 3,15-diacetyl-Δ⁸-eburicene-3β, 15α-diol-21-oic acid.

*Example 28.—3,15-diacetyl-Δ⁸-eburicene-3β,15α-diol-21-oic acid*

Diacetyl sulfurenic acid in absolute ethanol absorbs 1 equivalent of hydrogen when shaken in an atomsphere of hydrogen in the presence of Adams catalyst. Filtration of the catalyst, evaporation of the solvent and recrystallization from methanol-chloroform yields 3,15-diacetyl-Δ⁸-eburicene-3β,15α-diol-21-oic acid.

*Example 29.—Methyl 3,15α-diacetyl-Δ⁸-eburicene-3β,15α-diol-7,11-dione 21-oate*

A solution of chromic acid in glacial acetic acid and water is added to methyl 3,15-diacetyl-Δ⁸-eburicene-3β, 15α-diol-21-oate in glacial acetic acid, over a period of one hour, during which the temperature of the mixture is maintained at 75°. The temperature of the mixture is maintained at 75° for an additional hour, at which time the excess chromic acid is decomposed by the addition of methanol. The reaction mixture is concentrated on the rotary evaporator to approximately 200 ml. and after dilution with 400 ml. of water is extracted with chloroform. The chloroform solution is washed with saturated aqueous sodium chloride, 5% potassium bicarbonate and saturated aqueous sodium chloride and evaporated to dryness. The resultant crude semi-crystalline product is dissolved in 100 ml. of hexane and 500 ml. of methanol and the solution is concentrated until discernible crystallization commences. Impure material is collected and redissolved in 200 ml. of benzene. 54 g. neutral alumina is added to the benzene solution and after swirling for 5 minutes is removed by filtration. The alumina is washed with 500 ml. of benzene and the combined filtrates evaporated to yield 26.50 g. of a yellow crystalline material. Recrystallization from methanol gave methyl 3,15-diacetyl-Δ⁸-eburicene-3β,15α-diol-7,11-dione-21-oate.

*Example 30.—3,15-diacetyl-Δ⁸-eburicene-3β,15α-diol-7,11-dione-21-oic acid*

Following the procedures set forth in Example 29 but substituting 3,15 - diacetyl-Δ⁸-eburicene-3β,15α-diol-21-oic acid for methyl-3,15-diacetyl-Δ⁸-eburicene-3β-ol-21-oate yields 3,15 - diacetyl-Δ⁸-eburicene-3β,15α-diol-7,11-dione-21-oic acid.

*Example 31.—Methyl 3,15-diacetyl-eburicane-3β,15α-diol-7,11-dione-21-oate (XI)*

A solution of methyl-3,15-diacetyl-Δ⁸-eburicene-3β,15α-diol-7,11-dione-21-oate in glacial acetic acid is heated to reflux and granulated zinc (30 mesh) is added over a period of 15 minutes. After an additional 30 minutes, 75 g. of zinc dust is added. Heating of the mixture is continued until the total of reflux time from the start of the first addition equals 60 minutes. The solution is cooled and filtered and the acetic acid is evaporated in vacuo. Recrystallization from methanol-chloroform gives methyl-3,15-diacetyl-eburicane-3β,15α-diol-7,11-dione-21-oate.

*Example 32.—3,15-diacetyl-eburicane-3β,15α-diol-7,11-dione-oic acid*

Following the procedures of Example 31 but substituting 3,15 - diacetyl-Δ⁸-eburicene-3β,15α-diol-7,11-dione-21-oic acid for methyl-3,15-diacetyl-Δ⁸-eburicene-3β,15α-diol-7,11-dione-21-oate, yields 3,15-diacetyl-eburicane-3β,15α-diol-7,11-dione-21-oic acid.

*Example 33.—Methyl-eburicane-3β,15α-diol-ol-7,11-dione-21-oate*

A solution of 1 N ethanolic potassium hydroxide containing methyl 3,15-diacetyl-eburicane-3β,15α-diol-7,11-dione-21-oate is held at room temperature for 14 hours. After neutralization with 20% sulfuric acid, dilution with water and evaporation of the ethanol, the residue is extracted with chloroform and the chloroform solution is washed with water and evaporated. Recrystallization of the crude product from methanol-chloroform yields methyl-eburicane-3β,15α-diol-7,11-dione-21-oate.

*Example 34.—Methyl-3,15α-diacetyl-7-ethylenedithio-eburicane-3β,15α-diol-11-one-21-oate*

Freshly distilled boron trifluoride-etherate is added to a solution of methyl-3,15-diacetyl eburicane-3β,15α-diol-7,11-dione-21-oate and the mixture is held at room temperature for 72 hours. The completely solid mixture is stirred with cold methanol, filtered and washed with cold 50% aqueous methanol. The dithioethylene ketal thus obtained is then dissolved in chloroform, washed with 5% sodium hydroxide and water, dried over magnesium sulfate and the chloroform is evaporated. Recrystallization from methanol-chloroform yields methyl-3,15-diacetyl-7-ethylenedithio-eburicane-3β,15α-diol-11-one-21-oate.

*Example 35.—Methyl 3,15-diacetyl eburicane-3β,15α-diol-11-one-21-oate*

A solution of methyl 3,15-diacetyl-eburicane-3β,15α-diol-7,11-dione-21-oate in diethylene glycol containing 85% hydrazine hydrate is heated at reflux for 2 hours. After cooling, potassium hydroxide in diethylene glycol is added and the temperature of the solution is raised to 195° by distilling off water and hydrazine. The temperature of the solution is maintained at 195° for 4 hours, after which it was cooled. The cooled reaction mixture is poured into 100 ml. of 3 N hydrochloric acid and extracted with ether and chloroform. The combined organic layer is washed with water, dried over sodium sulfate and evaporated. The crude product is reacetylated with acetic anhydride in pyridine at room temperature, remethylated by treatment with etheral diazomethane and then chromatographed on 4 g. of neutral alumina. The benzene-chloroform eluates are recrystallized from methanol to give methyl-3,15-diacetyl-eburicane-3β,15α-diol-11-one-21-oate.

*Example 36.—Methyl-3,15-diacetyl-eburicane-3β,15α-diol-11-one-21-oate*

Sponge nickel catalyst is washed with absolute ethanol and added to a solution of methyl-3,15-diacetyl-7-ethylene-dithio-eburicane-3β,15α-diol-11-one-21-oate in absolute ethanol and the mixture is heated at reflux for 16 hours. The catalyst is filtered and washed with alcohol and acetone. The combined filtrates are evaporated, the residue dissolved in chloroform and the chloroform solution filtered. Concentration of the chloroform and addition of methanol gives methyl-3,15-diacetyl-eburicane-3β,15α-diol-11-one-21-oate.

*Example 37.—Methyl eburicane-3β,15α-diol-11-one-21-oate*

A solution of methyl-3,15-diacetyl-eburicane-3β,15α-diol-ol-11-one,21-oate in 1 N ethanolic potassium hydroxide is allowed to stand at room temperature for 18 hours. The solution is then neutralized with 20% sulfuric acid, diluted with water and the ethanol evaporated. The aqueous suspension is then extracted with ether and the ether solution washed with water, dried over magnesium sulfate and evaporated. Recrystallization from methanol yields methyl eburicane-3β,15α-diol-11-one-21-oate.

*Example 38.—3,15-diacetyl-eburicane-3β,15α-diol-11-one-21-oic acid*

Methyl - 3,15 - diacetyl - eburicane - 3β,15α-diol-11-one-21-oate is demethylated by refluxing in collidine distilled over potassium hydroxide, containing lithium iodide under nitrogen for 15 hours. The cooled dark brown reaction mixture is poured into 500 ml. of iced 2 N-hydrochloric acid and extracted with ether-methylene chloride. The organic layer is washed with 2 N hydrochloric acid and water, dried over magnesium sulfate and evaporated to dryness. The product is reacetylated by treatment with pyridine-acetic anhydride at room temperature and is allowed to stand overnight. Recrystallization of the reacetylated material from methanol-chloroform yields 3,15-diacetyl-eburicane-3β,15α-diol-11-one-21-oic acid.

*Example 39.—Eburicane-3β,15α-diol-11-one-21-oic acid*

A solution of 3,15-diacetyl-eburicane-3β,15α-diol-11-one-21-oic acid in 1 N ethanolic potassium hydroxide is left overnight at room temperature. The solution is neutralized with 20% sulfuric acid, diluted with water and the ethanol evaporated. The aqueous suspension is extracted with chloroform and the chloroform solution washed with water, dried over magnesium sulfate and evaporated. Recrystallization from methanol-chloroform gives eburicane-3β,15α-diol-11-one-21-oic acid.

*Example 40.—3,15-diacetyl-Δ⁸-lanostene-3β,15α-diol-24-one-21-oic acid*

Through a solution of diacetyl sulfurenic acid in a mixture of chloroform and ethyl acetate, cooled in a Dry Ice-acetone path, is passed ozone. The resulting solution is allowed to warm to room temperature and then added to a suspension of pre-reduced 5% palladium on charcoal catalyst in ethyl acetate. Hydrogen is taken up rapidly, following which the solution is filtered and the filtrate evaporated to dryness in vacuo to yield 3,15-diacetyl-Δ⁸-lanostene-3β,15α-diol-24-one-21-oic acid.

*Example 41.—Methyl-3,15-diacetyl-Δ⁸-lanostene-3β,15α-diol-24-one-21-oate*

A solution of 3,15-diacetyl-Δ⁸-lanostene-3β,15α-diol-24-one-21-oic acid in ether, is methylated by treatment with diazomethane in ether. Two recrystallizations from methanol-chlorofrom yields pure methyl-3,15-diacetyl-Δ⁸-lanostene - 3β,15α - diol-24-one-21-oate M.P. 142–144°; $(-\alpha)_B + 62°$ (c., 0.99):

$$\lambda_{max}^{KBr}\ 5.75,\ 8.05\mu$$

*Anal.*—Calc'd for $C_{35}H_{54}O_7$ (586.78): C, 71.64; H, 9.28. Found: C, 71.51; H, 9.25.

*Example 42.—Methyl-3,15α-diacetyl-Δ⁸-lanostene-3β,15α-diol-7,11,24-trione-21-oate*

A solution of methyl diacetyl sulfurenate in glacial acetic acid is ozonized at room temperature. The reaction mixture is diluted with water and the precipitate solids are collected and dried in vacuo. The ozonolysis product is dissolved in glacial actic acid, warmed to 70° and oxidized by the dropwise addition of chromic acid in 90% acetic acid over a period of 40 minutes. The solution is stirred magnetically and the temperature maintained at 70° for an additional hour and is then left to stand overnight at room temperature. Excess chromic acid is destroyed by the addition of methanol, and the resultant solution is poured into 5 liters of water. Extraction with ether and washing of the ether solution with 5% sodium bicarbonate and water, drying the resultant solution over sodium sulfate and evaporation of the solvent yields semi-crystalline material. Chromatography on 150 g. of acid washed alumina gives in benzene-ether eluates, crystalline methyl-3,15-diacetyl-$\Delta^8$-lanostene-3β,-15α-diol-7,11-24-trione-21-oate.

*Example 43.—Methyl-3,15-diacetyl-$\Delta^8$-lanostene-3β,15α-diol-7,11,24-trione-21-oate*

To a solution of methyl-3,15-diacetyl-$\Delta^8$-lanostene-3β, 15α-diol-24-one-21-oate in glacial acetic acid at 70° is added chromic acid in 90% acetic acid. The solution is held at 70° for an additional hour an is left to stand overnight at room temperature after which methanol is added to decompose the excess chromic acid. Water is added to the reaction mixture which is concentrated to 10 ml. in the rotary evaporator, diluted to 25 ml. with water and extracted with ethyl acetate. The ethyl acetate solution is washed with 5% potassium carbonate and water, dried over sodium sulfate and evaporated to oily material. Chromatography on 7 g. of neutral alumina gives crystalline material in the benzene-chloroform fractions. Recrystallizations from methanol yields methyl-3,15 - diacetyl - $\Delta$-$^8$-lanostene-3β,15α-diol-7,11,24-trione-21-oate.

*Example 44.—Methyl-3,15-diacetyl-lanostane-3β,15α-diol-7,11,24-trione-21-oate*

To a refluxing solution of methyl-3,15-diacetyl-$\Delta^8$-lanostene-3β,15α-diol-7,11,24-trione-21-oate in glacial acetic acid is added zinc dust over a period of 5 minutes. The yellow color of the solution is discharged after 10 minutes and heating is continued for an additional 30 minutes. The reaction mixture is cooled, filtered from zinc and zinc acetate, evaporated to dryness in vacuo, and the resulting residue dissolved in ethyl acetate. The solution is then washed with water, dried over sodium sulfate and evaporated to yield crystalline material. Recrystallization from methanol-methylene chloride yields methyl-3,15-diacetyl-lanostane-3β,15α-diol-7,11,24-trione-21-oate.

*Example 45.—3,15-diacetyl-$\Delta^8$-lanostene-3β,15α-diol-7,11,24-trione-21-oic acid*

Following the procedure set forth in Example 43 but substituting 3,15-diacetyl-$\Delta^8$-lanostene-3β,15α-diol-24-one-oic acid for methyl-3,15-diacetyl-$\Delta^8$-lanostene-3β,15α-diol-24 - one-21-oate, 3,15-diacetyl-$\Delta^8$-lanostene-3β,15α-diol-7,11,24-trione-21-oic acid is obtained.

*Example 46.—3,15-diacetyl-lanostane-3β,15α-di-ol-7,11,24-trione-21-oic acid*

Following the procedure of Example 44, but substituting 3,15 - diacetyl-$\Delta^8$-lanostene-3β,15α-diol-7,11,24-trione-21-oic acid for methyl-3,15-diacetyl-$\Delta^8$-lanostene-3β,15α-diol - 7,11,24 - trione-21-oate, 3,15-diacetyl-lanostene-3β-15α-diol-7,11,24-trione-21-oic acid is obtained.

*Example 47.—Methyl-3,15-diacetyl-24-ethylenedithio-lanostane-3β,15α-di-ol-7,11-dione-21-oate*

To a solution of methyl-3,15-diacetyl-lanostane-3β,15α-di - ol - 7,11,24-trione-21-oate in ethanedithiol is added freshly distilled boron-trifluoride-etherate. After being allowed to stand for 30 minutes at room temperature, the reaction mixture is poured into ice-water. The organic layer is separated and the aqueous layer is extracted with ether. The combined organic layers are evaporated and dried under high vacuum. The solid residue is recrystallized from methanol-methylene chloride to give sulfur containing material. Repeated recrystallization of the impure product from methanol-methylene chloride yields the methyl - 3,15-diacetyl-24-ethylenedithio-lanostane-3β,15α-diol-7,11-dione-21-oate.

*Example 48.—Methyl-3,15-diacetyl-lanostane-3β,15α-diol-7,11-dione-21-oate*

Methyl - 3,15 - diacetyl-24-ethylenedithio-lanostane-3β, 15α-diol-7,11-dione-21-oate in acetone with Raney nickel is heated under reflux for 12 hours. The nickel is removed by filtration and the solvent evaporated to yield crystalline material. Two successive recrystallizations from methanol yields methyl-3,15-diacetyl-lanostane-3β, 15α-diol-7,11-dione-21-oate.

*Example 49.—Methyl-3,15-diacetyl-7,24-bis-ethylenedithio-lanostane-3β,15α-diol-11-one*

A solution of methyl-3,15-diacetyl-lanostane-3β,15α-diol-7,11,24-trione-21-oate in ethanedithiol and freshly distilled boron trifluoride-etherate is held at room temperature. After 20 hours, solid material appears in the mixture. After 4 days the now solid mass of crystals is triturated with methanol, filtered and the collected solids washed with aqueous methanol and air dried. An ethereal solution of the solid is washed with 5% sodium hydroxide and water, dried over sodium sulfate and evaporated to yield crude bis-thioethylene ketal. Recrystallization of this material yields analytically pure methyl-3,15-diacetyl - 7,24 - bis-ethylenedithio-lanostane-3β,15α-diol-11-one-21-oate.

*Example 50.—Methyl-3,15-diacetyl-lanostane-3β,15α-diol-11-one-21-oate*

A solution of the bis-thioketal in 50 ml. of absolute ethanol is refluxed overnight with Raney nickel. The Raney nickel is then removed by filtration and the solvent is evaporated. The residue, on recrystallization from methanol gives methyl - 3,15 - diacetyl-lanostane-3β,15α-diol-11-one-21-oate.

*Example 51.—Methyl-3,15-diacetyl-lanostane-3β,15α-diol-11-one-21-oate*

A solution of methyl-3,15-diacetyl-lanostane-3β,15α-diol-7,11,24-trione-21-oate in diethylene glycol containing potassium hydroxide and 85% hydrazine hydrate is heated at reflux for 30 minutes. The temperature of the mixture is then raised to 195° by the distillation of water and hydrazine, and held at 195° for two hours. The solution after cooling, is poured into 3% hydrochloric acid and is extracted with chloroform. Evaporation of the chloroform leaves a residue which when reacetylated by treatment with pyridine and acetic anhydride and then remethylated by treatment with ethereal diazomethane, yields crude methyl - 3,15-diacetyl-lanostane-3β,15α-diol-11-one-21-oate.

*Example 52.—Methyl-3,15-diacetyl-eburicane-3β,11β,15α-triol-ol-21-oate*

A solution of 100 mg. of methyl-3,15,-diacetyl-eburicane-3β,15α-diol-11-one-21-oate in dry tetrahydrofuran is added to lithium borohydride in tetrahydrofuran and is left at room temperature for 2 hours. The excess lithium borohydride is decomposed by the addition of 10 mo. of 10% aqueous acetic acid. The tetrahydrofuran is evaporated, the residue extracted with ether and the ether solution washed with water and evaporated. Three recrystallizations from methanol yield analytically pure methyl-3,15-diacetyl-eburicane-3β,11β,15α-triol-21-oate.

*Example 53.—Methyl-eburicane-3β,11β,15α-triol-21-oate*

A solution of methyl-eburicane-3β,15-diol-11-one-21-oate in tetrahydrofuran is added dropwise to lithium borohydride in tetrahydrofuran and held at room temperature for two hours. The excess lithium borohydride is decomposed by the addition of 10% aqueous acetic acid. The tetrahydrofuran is evaporated, the residue extracted with chloroform and the chloroform solution washed with water and evaporated. The crude product is then recrystallized from methanol three times to yield crude product. One further recrystallization from methanol yields methyl-eburicane-3β,11β,15α-triol-21-oate.

*Example 54.—Methyl-3,15-diacetyl-Δ9(11)-eburicene-3β,15α-diol-21-oate*

To a solution of methyl-3,15α-diacetyl-eburicane-3β,11β,15α-triol-21-oate (LXXVII), in dimethylformamide is added pyridine and methanesulfonyl chloride and the mixture is held at room temperature for 18 hours. Water is added and the reaction mixture is extracted with chloroform. The chloroform layer is washed with water, dried over magnesium sulfate and evaporated. Recrystallization of the crude product from methanol yields analytically pure methyl-3,15-diacetyl-Δ9(11)-eburicene-3β,15α-diol-21-oate.

*Example 55.—Methyl-3,15-diacetyl-Δ8-eburicene-3β,15α-diol-7-one-21-oate*

A solution of chromic acid in glacial acetic acid is added to methyl-3,15-diacetyl-Δ8-eburicene-3β,15α-diol-21-oate in glacial acetic acid and held for five days at room temperature. The excess chromic acid is decomposed with methanol and the solution evaporated on the rotary evaporator. The residue is partitioned between ethyl acetate and water. The organic layer is washed with 5% potassium carbonate and water, dried over sodium sulfate and evaporated. The residue is chromatographed on 15 g. of neutral alumina and eluted with benzene and benzene-chloroform to yield a white crystalline material which on recrystallization from methanol gives methyl-3,15-diacetyl-Δ8-eburicene-3β,15α-diol-7-one-21-oate, M.P. 161-162.5°.

*Example 56.—Methyl-3,15-diacetyl-eburicane-3β,15α-diol-7-one-21-oate*

A solution of 3,15-diacetyl-Δ8-eburicene-3β,15α-diol-7-one-21-oate in absolute ether is added to liquid ammonia over a 5-minute period. At the same time, lithium wire, cut into small pieces, is added so as to maintain the blue color of the solution. After 15 minutes, ether-tert.-butyl alcohol is added and the ammonia is permitted to evaporate. The solution is then diluted with an additional 10 ml. of ether and washed with water. Evaporation of the ether yields the crude product. Chromatography on 4 g. of neutral alumina and elution with benzene-chloroform yields methyl - 3,15-diacetyl-eburicane-3β,15α-diol-7-one-21-oate after recrystallization from methanol.

*Example 57.—3,15-diacetyl-eburicane-3β,15α-diol-11-one-21-oyl chloride*

A solution of 3,15-diacetyl-eburicane-3β,15α-diol-11-one-21-oic acid and 1 ml. of thionyl chloride in 15 ml. of benzene is heated at reflux for 4 hours. After evaporation of the solvent and thionyl chloride under reduced pressure, the residue is dried over potassium hydroxide under high vacuum. Recrystallization from acetone yields 3,15 - diacetyl-eburicane-3β,15α-diol-11-one-21-oyl chloride.

Similarly, substituting thionyl bromide in the treatment of 3,15-diacetyl-eburicane-3β,15α-diol-11-one-21-oic acid for the thionyl chloride employed in the procedure of Example 57, yields 3,15-diacetyl-eburicane-3β,15α-diol-11-one-21-oyl bromide.

*Example 58.—3,15-diacetyl-Δ8-eburicene-3β,15α-diol-21-oyl chloride*

A solution of 3,15-diacetyl-Δ8-eburicene-3β,15α-diol-21-oic acid and thionyl chloride in 200 ml. of benzene is heated at reflux for 4½ hours. The solvent and excess thionyl chloride is removed by distillation under reduced pressure, and the residue is dried under high vacuum over potassium hydroxide for 18 hours. Recrystallization from acetone yields 3,15-diacetyl-Δ8-eburicene-3β,15-diol-21-oyl chloride.

*Example 59.—3,15-diacetyl-eburicane-3β,15α-diol-11-one-21-oyl-chloride*

A solution of 3,15 - diacetyl-eburicane-3β,15α-diol-11-one-21-oic acid in thionyl chloride is held at 5° for 16½ hours. After evaporation of the thionyl chloride under reduced pressure at room temperature and drying the residue under high vacuum, crude 3,15-diacetyl-eburicane-3β,15α-diol-11-one-21-oyl-chloride is obtained.

*Example 60.—3,15-diacetyl-eburicane-3β,15α-diol-21-al-11-one*

A solution of 3,15-diacetyl-eburicane-3β,15α-diol-11-one-21-oyl chloride in toluene (dried over sodium) containing 10% palladium-on-charcoal is heated while a rapid stream of hydrogen is bubbled through the solution. The exiting gas is passed through water kept alkaline by the addition of sodium hydroxide. Hydrogen chloride evolves when reflux temperature is reached, and heating is continued for 1 hour at which time the evolution of hydrogen chloride slows considerably. The reaction mixture is then cooled under nitrogen, filtered through sand and evaporated to yield the crude product. Recrystallization from methanol yields 3,15-diacetyl-eburicane-3β,15α-diol-21-al-11-one.

*Example 61.—diacetyl-21-(N-pyrrolidyl)-Δ20-eburicene-3β,15α-diol-11-one*

A solution of 3,15-diacetyl-eburicane-3β-ol-21-al-11-one and p-toluenesulfonic acid in benzene in a round bottom flask connected to a Dean-Stark water separator arranged so that all condensate drips through a thimble containing calcium carbide, is heated to boiling in order to azeotropically remove any water in the apparatus. Upon cooling, pyrrolidine is added and the mixture is heated at reflux in a nitrogen atmosphere for 46 hours. Evaporation of the solvent yields amorphous 3,15-diacetyl-21(N-pyrrolidyl)-Δ20-eburicene-3β,15α-diol-11-one.

Similarly, following the procedure set forth in Example 61, but substituting morpholine, or piperidine for the pyrrolidine yields 3,15 - diacetyl - 21(N-morpholyl)-Δ20-eburicene 3β,15α-diol-11-one, and 3,15 - diacetyl - 21(N-piperidyl)-Δ20-eburicene-3β,15α-diol-11-one-respectively.

*Example 62.—3,15-diacetyl-21-nor-eburicane-3β,15α-diol-11,20-dione*

A solution of the 3,15-diacetyl-21-(N-pyrrolidyl)-Δ20-eburicene-3β,15α-diol-11-one in ether is cooled to −35° and ozonized with an excess of ozone. After 15 minutes, the reaction mixture is treated with zinc dust and acetic acid and allowed to remain at room temperature for one hour. The mixture is then filtered, washed with water, dried and evaporated to give a residue. Chromatography on 30 g. of neutral alumina and elution with hexane-benzene, benzene and benzene-chloroform yields crude product which on recrystallization from methanol yields 3,15-diacetyl-21-nor-eburicane-3β,15α-diol-11,20-dione.

*Example 63.—4,4,14-trimethyl-5α-androstane-3β,15α,17β-triol-11-one-3,15-diacetate-17-(4,5-dimethylhexanoate)*

A solution of 50 mg. of 3,15-diacetyl-21-nor-eburicane-3β,15α-diol-11,20-dione, methylene chloride containing sodium phosphate is treated with freshly prepared trifluoroperacetic acid in methylene chloride (1 mmole/ml.) and held at room temperature for 40 hours. The solution is then diluted with 10 ml. of chloroform and washed with 5% sodium carbonate and water, dried and evaporated to yield 4,4,14-trimethyl-5α-androstane-3β,15α,17β, triol-11-one-3,15-diacetate-17-(4,5-dimethylhexanoate).

Example 64.—4,4,14-trimethyl-5α-androstane-3β,15α,17β,triol-11-one

A solution of 50 mg. of 3,15-diacetyl-21-nor-eburicane-3β,15α-diol-11,20-dione in methylene chloride containing dibasic sodium phosphate is treated with freshly prepared trifluoroperacetic acid in methylene chloride and held at room temperature for 40 hours. The solution is then diluted with 10 ml. of chloroform and is washed with 5% sodium carbonate, water, dried and evaporated to give a crude mixture. The mixture is then dissolved in 1 N ethanolic potassium hydroxide and left at room temperature for 20 hours. Neutralization with 20% sulfuric acid is followed by isolation in the usual manner, to yield a mixture of crude compounds. Thin layer chromatography on morinimpregnated alumina gives 4,4,14-trimethyl-5α-androstane-3β,15α,17β,triol-11-one.

Example 65.—4,4,14-trimethyl-15α-androstane-3β,15α,17β-triol-11-one-3,15,17-triacetate A solution of 3,15 - diacetyl - 21-noreburicane-3β,15α-diol-11,20-dione in methylene chloride containing dibasic sodium phosphate is treated with freshly prepared trifluoroperacetic acid in methylene chloride and held at room temperature for 40 hours. The solution is then diluted with 10 ml. of chloroform and is washed with 5% sodium carbonate, water, dried and evaporated to give a crude mixture. The mixture is then dissolved in 25 ml. of 1 N ethanolic potassium hydroxide and held at room temperature for 20 hours. Neutralization with 20% sulfuric acid is followed by isolation in the usual manner. 7 mg. of the isolated crude product is then acetylated by treatment with acetic anhydride in pyridine at room temperature to yield non-crystalline material. Thin layer chromatography of this material on morin-impregnated alumina (Activity V) in hexane-chloroform, gives 4,4,14 - trimethyl - 5α-androstane-3β,15α,17β,triol-11-one-3,15,17-triacetate.

Example 66.—21-nor-eburicane-3β,15-diol-11,20-dione

A solution of 3,15-diacetyl-21-nor-eburicane-3β,15α-diol-11,20-dione in 1 N ethanolic potassium hydroxide is held at room temperature for 16 hours. The solution is neutralized with 20% sulfuric acid and is diluted with water, after which the ethanol is evaporated and the residue extracted with ether. The ether solution is washed with water and dried over magnesium sulfate. Evaporation of the ether yields crude product which upon recrystallization from methanol yields 21-nor-eburicane-3β,15α-diol-11,20-dione.

Example 67.—4,4,14-trimethyl-5α-androstane-3β,15α,17β,triol-11-one-17-(4,5-dimethylhexanoate)

A solution of 21-nor-eburicane-3β,15α-diol-11,20-dione in methylene chloride containing disodium phosphate is treated with freshly prepared trifluoroperacetic acid and held at room temperature for 48 hours. The solution is diluted with 10 ml. of chloroform and washed with 5% sodium carbonate and water, and is then dried over magnesium sulfate and evaporated to yield crude product. The crude product is purified by thin layer chromatography on morin-impregnated alumina (Activity V) with chloroform as the solvent, to yield 4,4,14-trimethyl-5α-androstane-3β,15α,17β-triol-11-one-17-(4,5 - dimethylhexanoate).

Example 68.—4,4,14-trimethyl-5α-androstane-17β,ol-3,15,11-trione-17-(4,5-dimethylhexanoate)

A solution of 4,4,14-trimethyl-5α-androstane-3β,15α,17β-triol-11-one-17-(4,5-dimethylhexanoate) in acetone is oxidized by dropwise addition of chromic acid-sulfuric acid-acetone, until an orange color persists. A few drops of methanol are added, the mixture diluted with 10 ml. of water and extracted with ether. The ether solution is washed with water, dried over magnesium sulfate and evaporated to give 4,4,14-trimethyl-5α-androstane-17β-ol-3,15,11-trione-17-(4,5-dimethylhexanoate) upon recrystallization from methanol.

Example 69.—4,4,14-trimethyl-5α-androstane-17β-ol-3,15,11-trione

A solution of 10 mg. of 4,4,14-trimethyl-5α-androstane-17β-ol-3,15,11-trione-17-(4,5-dimethylhexanoate) in 1 N ethanolic potassium hydroxide is held at room temperature for 15 hours. After neutralization with 20% sulfuric acid and evaporation of the solvent, the residue is taken up in ether, washed with water, dried over magnesium sulfate and the ether evaporated. Recrystallization from methanol yields 4,4,14 - trimethyl - 5α-androstane-17β-ol-3,15,11-trione.

Example 70.—4,4,14-trimethyl-5α-androstane-3β,11β,15α,17β,tetraol-ol-3,15,17-triacetate A solution of 100 mg. of 4,4,14-trimethyl-5α-androstane - 3β,15α,17β - triol - 11 - one-3,15α,17-triacetate in tetrahydrofuran is added to a suspension of lithium borohydride in tetrahydrofuran and is held at room temperature for 3 hours. The excess lithium borohydride is decomposed by the addition of 10% aqueous acetic acid, the tetrahydrofuran evaporates and the residue extracted with ether. The ether extract is washed with water, dried over magnesium sulfate and evaporated. The crude product obtained upon recrystallization from methanol yields 4,4,14 - trimethyl - 5α-androstane-3β,11β,15α,17β-tetraol-3,15,17-triacetate.

Example 71.—3β,15α-diacetoxy-4,4,14-trimethyl-Δ⁸-5α-androstene-7,11-dione-17β-carboxylic acid To a solution of 3β,15α-diacetoxy-24-hydroxy-Δ⁸,²⁰(²²),²³-lanostatriene-21-oic acid 21,24-lactone in acetone maintained at a temperature of 33–37° is added with stirring finely pulverized potassium permanganate. The potassium permanganate is added in portions, first more rapidly, later on at greater intervals so as to maintain the proper temperature and making sure that the permanganate color is discharged prior to new additions. The total time of addition is about 1 hour and 20 minutes and the reaction is allowed to proceed until all the permanganate color is discharged (approximately an additional 1 to 1½ hours). Upon completion of the oxidation 60 ml. of water is added, the mixture cooled to 0° in an ice-bath and sulfur dioxide is passed through the solution until all the manganese dioxide has been transformed into colorless manganous sulfate. The suspension is filtered and the filter cake washed thoroughly with hot acetone. The yellow acetone solution is concentrated in vacuo to to 800 ml. and the 3β,15α-diacetoxy-4,4,14 - trimethyl - Δ⁸-5α-androstene-7,11-dione-17β-carboxylic acid precipitated by the addition with stirring of 2 l. of ice and water. The precipitated acid is filtered off, washed with water and dried in vacuo to 40°. The dried material is dissolved in 200 ml. of hot absolute alcohol and allowed to crystallize. Some of the lactone starting material separates and the resulting mother liquor is taken to dryness. The residue is then dissolved in 75 ml. of acetonitrile and the acid allowed to crystallize, yielding 3β,15α - diacetoxy - 4,4,14-trimethyl-Δ⁸-5α-androstene-7,11-dione-17β-carboxylic acid.

Example 72.—Methyl 3β,15α-diacetoxy-4,4,14-trimethyl-Δ⁸-5α-androstene-7,11-dione-17β-carboxylate To a suspension of 3β,15α-diacetoxy-4,4,14α-trimethyl-Δ⁸ - 5α - androstene-7,11-dione-17β-carboxylic acid in methanol is added at 0° a solution of diazomethane in ether until all the acid dissolves and there is no longer an evolution of nitrogen. Upon completion of the reaction the ether is removed in vacuo and the solution concentrated to a total volume of about 75 ml. The methyl 3β,-15α - diacetoxy - 4,4,14 - trimethyl-Δ⁸-5α-androstene-7,11-dione-17β-carboxylate readily crystallizes.

*Example 73.—Methyl 3β,15α-diacetoxy-4,4,14-trimethyl-5α-androstane-7,11-dione-17β-carboxylate*

To a refluxing solution of methyl 3β,15α-diacetoxy-4,4,14α - trimethyl - $\Delta^8$ - 5α-androstene-7,11-dione-17β-carboxylate in glacial acetic acid is added, over a 20 minute period, 20 mesh granular zinc. The yellow color lightens and complete decolorization is achieved by the portionwise addition of a total of 3 g. of zinc dust. Total reaction time is 2 hours. The solution is cooled and filtered, the zinc washed with chloroform and the solvents concentrated to small volume in vacuo. The residue is distributed between water and chloroform, the chloroform solution washed with dilute sodium bicarbonate, dried over sodium sulfate and concentrated to a small volume. Upon addition of methanol the very insoluble methyl 3β,15α - diacetoxy-4,4,14-trimethyl-5α-androstane-7,11-dione-17β-carboxylate crystallizes rapidly.

*Example 74.—Methyl 3β,15α-diacetoxy-7-ethylenedithio-4,4,14-trimethyl-5α-androstane-11-one-17β-carboxylate*

To a mixture of ethanedithiol and twice distilled boron trifluoride etherate is added methyl 3β,15α-diacetoxy-4,4,14 - trimethyl-5α-androstane-7,11-dione-17β-carboxylate. All the material dissolves within 1.5 hours and after a total reaction time of 23 hours at room temperature, cold methanol is added. The mixture is chilled in an ice-bath for 1 hour and filtered. The crystals are washed thoroughly with cold methanol and dried in a vacuum oven at 40°. Methyl 3β,15α-diacetoxy-7-ethylenedithio - 4,4,14 - trimethyl-5α-androstane-11-one-17β-carboxylate is obtained.

*Example 75.—Methyl 3β,15α-diacetoxy-4,4,14-trimethyl-5α-androstane-11-one-17β-carboxylate*

To a solution of methyl 3β,15α-diacetoxy-7-ethylenedithio - 4,4,14 - trimethyl-5α-androstane-11-one-17β-carboxylate in absolute ethanol is added commercial Raney nickel, from which all water had been removed by repeated washing with absolute ethanol. The resulting suspension is refluxed for 18 hours, the reaction mixture filtered while hot and the Raney nickel cake washed with large volumes of hot ethanol taking care to keep the pyrophoric catalyst covered with solvent at all times. The filtrate and washings are concentrated until crystals appear.

*Example 76.—4,4,14-trimethyl-5α-androstane-3β,15α-diol-11-one-17β-carboxylic acid*

A solution of methyl 3β,15α - diacetoxy - 4,4,14-trimethyl - 5α - androstane-11-one-17β-carboxylate in 5% methanolic KOH (.73 N) and water is refluxed under nitrogen for 7½ hours. The solution is acidified with glacial acetic acid and the resulting solution concentrated in vacuo. Water is added and after cooling the resulting crystals removed by filtration.

*Example 77.—Methyl 4,4,14-trimethyl-5α-androstane-3β,15α-diol-11-one-17β-carboxylate*

To a suspension of 4,4,14 - trimethyl-5α-androstane-3β,15α-diol-11-one-17β-carboxylic acid in methanol is added, at 0°, an excess of diazomethane in ether. After 20 minutes the excess diazomethane is removed by the addition of glacial acetic acid and the ether-methanol solution concentrated in vacuo. From the concentrated methanolic solution methyl - 4,4,14-trimethyl-5α-androstane-3β,15α-diol-11-one-17β-carboxylate is readily crystallized.

*Example 78.—Methyl 4,4,14-trimethyl-5α-androstane-3,11,15-trione-17β-carboxylate*

To a solution of methyl 4,4,14-trimethyl-5α-androstane-3β,15α-diol-11-one in acetone is added chromic acid and sulfuric acid in 90% aqueous acetone. After 15 minutes at room temperature excess chromic acid is reduced with methanol and the mixture is diluted with water, concentrated in vacuo and extracted with chloroform. The chloroform extract is dried, evaporated to dryness and the residual triketone crystallized from methanol.

*Example 79.—Methyl 4,4,14-trimethyl-5α-androstane-3β-ol-11,15-dione-17β-carboxylate*

To a solution of methyl 4,4,14-trimethyl-5α-androstane-3,11,15-trione-17β-carboxylate in dioxane-water is added potassium borohydride. After 45 minutes the solution is neutralized with acetic acid and extracted with chloroform. The chloroform-dioxane phase is dried and evaporated in vacuo. The residue is crystallized from methanol.

*Example 80.—Methyl 4,4,14-trimethyl-3β,15α-diacetoxy-5α-androstane-11β-ol-17β-carboxylate*

A solution of methyl 4,4,14-trimethyl-3β,15α-diacetoxy-5α-androstane-11β-ol-17β-carboxylate and lithium borohydride in freshly distilled tetrahydrofuran is stirred at room temperature for 2 hours. Excess lithium borohydride is then destroyed with 10% aqueous acetic acid, the mixture diluted with water and chloroform and the chloroform extract washed with water, dilute bicarbonate and again with water. After drying over sodium sulfate the solvents are removed in vacuo and the resulting residue recrystallized from methanol.

*Example 81.—Methyl 4,4,14-trimethyl-3β,15α-diacetoxy-$\Delta^{9(11)}$-5α-androstene-17β-carboxylate*

A solution of methyl 4,4,14-trimethyl-3β,15α-diacetoxy-5α-androstane-11β-ol-17β-carboxylate in dimethylformamide, anhydrous pyridine and methanesulfonyl chloride is allowed to remain at room temperature for 17 hours. Water is added to the mixture and, after cooling, the crystals are removed by filtration.

*Example 82.—Methyl 4,4,14-trimethyl-3β,15α-diacetoxy-5α-androstane-17β-carboxylate*

A solution of methyl-4,4,14-trimethyl-3β,15α-diacetoxy-5α-androstane-7,11-dione-17β-carboxylate hydrazine hydrate and potassium hydroxide in ethylene glycol is refluxed for 24 hours. The mixture is then cooled, diluted with water, acidified to pH 2 and the steroids extracted with chloroform. The chloroform solution is washed with water, dried over sodium sulfate and the solvent removed in vacuo. The resulting material is reacetylated with ½ cc. of acetic anhydride and ½ cc. of pyridine for 18 hours at room temperature and the resulting material remethylated with diazomethane. Removal of the solvent leaves the methyl-4,4,14-trimethyl-3β,15α-diacetoxy-5α-androstane-17β-carboxylate as a crystalline solid.

*Example 83.—Methyl 3-isopropylidene-14-methyl-A-nor-5α-androstane-15α-ol-11-one-17β-carboxylate*

To a solution of methyl 4,4,14-trimethyl-5α-androstane-3β,15α-diol-ol-11-one-17β-carboxylate in dry toluene maintained at 0° and protected from light, is added phosphorus pentachloride. Immediately after the addition of the latter a rapid stream of helium gas is passed through the suspension with stirring. After 20 minutes saturated sodium bicarbonate is added and the two layers mixed thoroughly until all the phosphorus oxychloride is hydrolyzed. The toluene solution is washed with water, dried over sodium sulfate and evaporated to dryness in vacuo. The residue upon crystallization from methanol yields methyl 3-isopropylidene-14-methyl-A-nor-5α-androstane-15α-ol-11-one-17β-carboxylate.

*Example 84.—3-isopropylidene-14-methyl-A-nor-5α-androstane-15α-ol-11-one-17β-carboxylic acid*

A solution of methyl 3-isopropylidene-14-methyl-A-nor-5α-androstane-15α-ol-11-one-17β-carboxylate in 30 ml. of 5% methanolic KOH and 2 ml. of water is refluxed under nitrogen for 7½ hours. The mixture is then cooled to room temperature, acidified with glacial acetic acid and diluted with water. Crystallization furnishes 3-isopropylidene - 14 - methyl - A - nor-5α-androstane-15α-ol-11-one-17β-carboxylic acid.

*Example 85.—3-isopropylidene-14-methyl-A-nor-5α-androstane-11,15-dione-17β-carboxylic acid*

Following the procedure set forth in Example 84 but substituting methyl 3-isopropylidene-14-methyl-A-nor-5α-androstane-11,15-dione-17β-carboxylate for methyl 3-isopropylidene - 14 - methyl-A-nor-5α-androstane-15α-ol-11-one-17β-carboxylate yields 3-isopropylidene-14-methyl-A-nor-5α-androstane-11,15-dione-17β-carboxylic acid.

*Example 86.—Methyl 14-methyl-A-nor-5α-androstane-3,11,15-trione-17β-carboxylate*

A solution of methyl 3-isopropylidene-14-methyl-A-nor-5α-androstane-11,15-dione-17β-carboxylate in ethyl acetate is ozonized at —20° until a potassium iodide trap, placed behind the reaction vessel, shows the color of iodine. Acetic acid is added and the ozonide decomposed reductively by the portionwise addition of zinc dust. After stirring for a total of 1 hour at room temperature the ozonide is completely decomposed as indicated by a negative starch iodide test. The mixture is then filtered, the ethyl acetate filtrate extracted with water, dried over sodium sulfate and evaporated to dryness in vacuo. The crystalline residue upon recrystallization from acetone-hexane yields the pure methyl 14-methyl-A-nor-5α-androstane-3,11,15-trione-17β-carboxylate.

*Example 87.—Methyl 14-methyl-A-nor-5β-androstane-3,11,15-trione-17β-carboxylate*

A solution of 220 mg. of methyl-A-nor-5α-androstane-3,11,15-trione-17β-carboxylate in .01 N KOH in methanol is allowed to remain at room temperature for ½ hour. The solution is neutralized with glacial acetic acid, diluted with water, concentrated in vacuo and extracted with chloroform. The chloroform extract is dried over sodium sulfate and evaporated to dryness in vacuo. The residue upon crystallization from methanol furnishes methyl 14 - methyl - A-nor-5β-androstene-3,11,15-trione-17β-carboxylate.

*Example 88.—Methyl 14-methyl-A-nor-5β-androstane-3,11,15-trione-17β-carboxylate*

A solution of methyl 14-methyl-A-nor-5α-androstane-3,11,15-trione-17β-carboxylate in 0.1% HBr in glacial acetic acid is allowed to remain at room temperature for 10 minutes. The solution is neutralized with aqueous bicarbonate, diluted with water, concentrated in vacuo and extracted with chloroform. The chloroform extract is dried over sodium sulfate and evaporated to dryness in vacuo. The residue upon recrystallization from methanol furnishes methyl 14-methyl-A-nor-5β-androstane-3,11,15-trione-17β-carboxylate.

*Example 89.—14-methyl-A-nor-5β-androstane-3,11,15-trione-17β-carboxylic acid*

To a mixture of .7 N KOH in methanol and water, which has been refluxed for 10 minutes and cooled under a blanket of helium is added methyl 14-methyl-A-nor-5α-androstane - 3,11,15 - trione-17β-carboxylate and the resulting light yellow solution is refluxed for 7½ hours under a blanket of helium. The mixture is then cooled and after the addition of glacial acetic acid is diluted with water. After removal of the bulk of the methanol in vacuo the 14-methyl-A-nor-5β-androstane-3,11,15-trione-17β-carboxylic acid crystallizes and is filtered and washed with water.

*Example 90.—Methyl 14-methyl-3,15-diacetoxy-A-nor-$\Delta^{3(5)}$-androstene-11-one-17β-carboxylate*

A solution of methyl 14-methyl-15α-acetoxy-A-nor-5α-androstane-3,11-dione-17β-carboxylate and p-toluenesulfonic acid in redistilled isopropenyl acetate is slowly distilled under anhydrous conditions. One ml. is distilled off rapidly and a second milliliter over a 30 minute period. After a total of 45 minutes the mixture is cooled to room temperature, taken up in chloroform and the chloroform extract washed with dilute sodium bicarbonate and water, dried over sodium sulfate and taken to dryness in vacuo, yielding methyl 14-methyl-3,15α-diacetoxy-A-nor-$\Delta^{3(5)}$-androstene-11-one-17β-carboxylate.

*Example 91.—Methyl 14-methyl-15α-acetoxy-5β-bromo-A-nor-androstane-3,11-trione-17β-carboxylate*

To a solution of methyl 14-methyl-3,15α-diacetoxy-A-nor - $\Delta^{3(5)}$ - androstene-11-one-17β-carboxylate in dioxane and a solution containing 70% perchloric acid in water, is added N-bromoacetamide. After 5 minutes the reaction is stopped by the addition of dilute sodium bisulfite solution until colorless and the methyl 14-methyl-15α-acetoxy-5β-bromo-A-nor-androstane-3,11-dione-17β-carboxylate is extracted with chloroform.

Similarly, following the procedure of Example 91, but substituting N - bromosuccinimide, dibromodimethylhydantoin, or bromine for N-bromoacetamide, yields methyl 14 - methyl - 15α-acetoxy-5β-bromo-A-nor-androstane-3,11-dione-17β-carboxylate.

If an N-chloro compound such as N-chlorosuccinimide or an N-iodo compound such as N-iodo acetamide is used in place of N-bromoacetamide in following the procedure of Example 91, there is obtained the corresponding methyl 14 - methyl - 15α-acetoxy-5β-chloro-A-nor-androstane-3,11-dione-17β-carboxylate and methyl 14-methyl-15α-acetoxy - 5β - iodo - A - nor - androstane-3,11,15-trione-17β-carboxylate.

*Example 92.—Methyl 14-methyl-15α-acetoxy-5β-fluoro-A-nor-androstane-3,11-dione -17β-carboxylate*

Into a solution of methyl 14-methyl-3-15α-diacetoxy-A-nor - $\Delta^{3(5)}$-androstene-11-one-17β-carboxylate in pyridine and dioxane maintained at 0° is passed with stirring a stream of perchloryl fluoride. After 3 minutes excess chloroform is added and the mixture is then extracted with water, dilute acid, sodium bicarbonate solution and again with water. The chloroform-dioxane extract is evaporated to dryness in vacuo and the resulting methyl 14 - methyl-15α-acetoxy-5β-fluoro-A-nor-androstane-3,11-dione-17β-carboxylate recrystallized from acetone.

*Example 93.—Methyl 14 - methyl - 15α-acetoxy-A-nor-$\Delta^5$-androstene-3,11-dione-17β-carboxylate and methyl 14-methyl - 15α - acetoxy - A - nor-$\Delta^1$-5β-androstene-3,11-dione-17β-carboxylate*

A solution of methyl 14-methyl-15α-acetoxy-5β-bromo-A-nor-androstane-3,11-dione-17β-carboxylate and lithium chloride in dimethylformamide is heated on the steam bath for 2 hours. The cooled mixture is diluted with water, extracted with chloroform and the chloroform extract washed thoroughly with water. The chloroform extract is dried over sodium sulfate, evaporated to dryness in vacuo and the residue obtained is separated into the methyl 14-methyl-15α-acetoxy-A-nor-$\Delta^5$-androstene-3,11-trione-17β-carboxylate and methyl 14-methyl-15α-acetoxy - A-nor-$\Delta^1$-5β-androstene-3,11-dione-17β-carboxylate components by fractional crystallization.

The material from the mother liquors is dissolved in benzene and hexane and chromatographed on neutral alumina. Elution with benzene-hexane (1:9) and benzene-hexane (1:3) gives additional crystalline material which furnishes the pure methyl 14-methyl-15α-acetoxy-A-nor-$\Delta^1$-androstene-3,11-dione-17β-carboxylate.

Similarly, an equimolar amount of lithium bromide may be substituting for the lithium chloride employed in Example 93 without altering the results obtained.

*Example 94.—Methyl 14-methyl-15α-acetoxy-A-nor-Δ⁵-androstene-3,11-dione-17β-carboxylate and methyl 14-methyl - 15α - acetoxy - A - nor - Δ¹ - 5β - androstene-3,11-dione-17β-carboxylate*

A solution of methyl 14-methyl-15α-acetoxy-5β-bromo-A-nor-androstane-3,11-dione-17β-carboxylate in collidine is refluxed for one hour. The reaction mixture is dissolved in chloroform and the resulting chloroform solution is extracted with 1 N hydrochloric acid. Concentration of the chloroform extract to dryness furnishes a mixture of methyl 14-methyl-15α-acetoxy-A-nor-Δ⁵-androstene - 3,11 - dione - 17β - carboxylate and methyl 14-methyl - 15α - acetoxy - A - nor-Δ¹-5β-androstene-3,11-dione-17β-carboxylate, which may be separated into its individual components by fractional crystallization.

*Example 95.—Methyl 14-methyl-5α-bromo-A-nor-androstane-3,11,15-trione-17β-carboxylate*

To a suspension of methyl 14-methyl-A-nor-5α-androstatne-3,11,15-trione-17β-carboxylate in glacial acetic acid is added 6% hydrogen bromide in glacial acetic acid. The crystals dissolve immediately upon addition of the mineral acid. A bromine solution consisting of .2 mmole of bromine and .2 mmole of anhydrous sodium acetate per milliliter of glacial acetic acid is then added (3.3 ml.) followed by the addition of .8 ml. of 6% hydrogen bromide in glacial aectic acid. Decolorization of the bromine occurs immediately accompanied by a precipitation of the methyl 14-methyl-5α-bromo-A-nor-androstane-3,11,15-trione-17β-carboxylate.

The acetic acid-water filtrate from the methyl 14-methyl-5α-bromo - A - nor-androstane-3,11,15-trione-17β-carboxylate is diluted further with water, extracted with chloroform and the chloroform extract washed thoroughly with water, bicarbonate and again with water. The chloroform extract is dried over sodium sulfate, evaporated to dryness and fractionally crystallized from methanol. There is obtained additional methyl 14-methyl-5α - bromo - A - nor - androstane-3,11,15-trione-17β-carboxylate in the first crop, and by concentration of the mother liquors, methyl 14-methyl-5β-bromo-A-nor-androstane-3,11,15-trione-17β-carboxylate.

*Example 96.—Methyl 14-methyl-A-nor-Δ⁵-androstene-3,11,15-trione-17β-carboxylate*

A solution of methyl 14-methyl-5α-bromo-A-nor-androstane-3,11,15-trione-17β-carboxylate and lithium bromide in dimethylformamide is refluxed in the steam bath for 2 hours. The resulting mixture is diluted with water, the mixture extracted with chloroform and the chloroform extract washed with water and sodium bicarbonate, dried over sodium sulfate and evaporated to dryness in vacuo. The residue yields on crystallization from methanol pure methyl 14-methyl-A-nor-Δ⁵-androstene-3,11,15-trione-17β-carboxylate.

*Example 97.—14-methyl-A-nor-Δ⁵-androstene-3,11,15-trione-17β-carboxylic acid*

A solution of methyl 14-methyl-A-nor-Δ⁵-androstene-3,11,15-trione-17β-carboxylate in .7 N methanolic potassium hydroxide and water that has been refluxed and cooled under helium is refluxed under a blanket of helium for 7 hours. The mixture is then acidified with glacial acetic acid, diluted with water and extracted with chloroform. The chloroform extract is washed with water, dried over sodium sulfate and evaporated to dryness in vacuo. The crystalline residue after recrystallization from methanol yields 14-methyl-A-nor-Δ⁵-androstene-3,11,15-trione-17β-carboxylic acid.

*Example 98.—Methyl 14 - methyl-3,3-ethylenedioxy-A-nor - Δ⁶ - androstane-11,15-dione-17β-carboxylate and methyl 14 - methyl-3,3-ethylenedioxy-A-nor-Δ⁵-androstene-11,15-dione-17β-carboxylate*

To a stirred mixture of benzene, ethylene glycol and p-toluenesulfonic acid, which has been refluxed for 1 hour with the aid of a Dean-Stark separator is added methyl 14 - methyl-A-nor-Δ⁵-androstene-3,11,15-trione-17β-carboxylate and the resulting mixture is continued at reflux for 6 hours. The mixture is then cooled, neutralized rapidly by the addition of excess sodium bicarbonate, diluted with water and the layers separated. The aqueous layer is washed again with benzene and the combined benzene extracts dried over sodium sulfate. Evaporation of the solvent in vacuo produces a crystalline residue, which on recrystallization from methanol furnishes the pure methyl 14-methyl-3,3-ethylenedioxy-A-nor-Δ⁶-androstene-11,15-dione-17β-carboxylate. From the mother liquors there is obtained methyl 14-methyl-3,3-ethylenedioxy - A - nor-Δ⁵-androstene-11,15-dione-17β-carboxylate.

*Example 99.—Methyl 14-methyl-3,3-ethylenedioxy-A-nor-5β-androstane-11-one-17β-carboxylate (CXLVIII)*

Following the procedure set forth in Example 98, but substituting methyl 14-methyl-A-nor-5β-androstane-3,11,15-trione-17β-carboxylate for the methyl 14-methyl-A-nor-Δ⁵-androstene-3,11,15-trione-17β-carboxylate there is obtained methyl - 14 - methyl - 3,3 - ethylenedioxy-A-nor-5β-androstane-11,15-dione-17β-carboxylate.

*Example 100.—14-methyl-3,3-ethylenedioxy-A-nor-Δ⁶-androstene-11,15-dione-17β-carboxylic acid*

A solution of methyl 14-methyl-3,3-ethylenedioxy-A-nor-Δ⁶-androstene-11,15-dione-17β-carboxylate in a solution prepared by mixing .7 N KOH in methanol and water which has been thoroughly purged of oxygen by helium is heated under reflux under a blanket of helium for 7½ hours. After cooling, the mixture is brought to pH 6 by the addition of glacial acetic acid, diluted with water and the methanol removed in vacuo at a bath temperature of 25°. The residual 14-methyl-3,3-ethylenedioxy-A-nor-Δ⁶-androstene-11,15-dione-17β-carboxylic acid is triturated with acetonitrile and recrystallized from that same solvent.

*Example 101.—14-methyl-A-nor-Δ⁵-androstene-3,11,15-trione-17β-carboxylic acid*

A solution of 14-methyl-3,3-ethylenedioxy-A-nor-Δ⁵-androstene-11,15-dione-17β-carboxylic acid in methanol and 8% sulfuric acid is refluxed for 2 hours. After cooling to room temperature the mixture is diluted with water, taken up in chloroform, the chloroform solution washed with water, dried over sodium sulfate and taken to dryness in vacuo. The residue on recrystallization from methanol furnishes the pure 14-methyl-A-nor-Δ⁵-androstene-3,11,15-trione-17β-carboxylic acid.

*Example 102.—Methyl 14-methyl-3,3-ethylenedioxy-A-nor-Δ⁶-androstene-11β-ol-15-one-17β-carboxylate*

A solution of methyl 14-methyl-3,3-ethylenedioxy-A-nor-Δ⁶-androstene-11,15-dione-17β-carboxylate and lithium borohydride in 2 ml. of freshly distilled tetrahydrofuran is stirred at room temperature for 18 hours. At the end of this period excess borohydride is destroyed by the careful addition of water. The diluted solution is extracted with chloroform, the chloroform extract washed with water, dried over sodium sulfate and the solvent removed in vacuo. The residue contains the methyl 14-methyl-3,3 - ethylenedioxy-A-nor-Δ⁶-androstene - 11β-ol-15-one-17β-carboxylate.

*Example 103.—Methyl-14-methyl-3,3-ethylenedioxy-A-nor-Δ⁶,⁹(¹¹)-androstadiene-15-one-17β-carboxylate*

To a solution of methyl 14-methyl-3,3-ethylenedioxy-A-nor-Δ⁶-androstene-11β-ol-15-one-17β-carboxylate in dimethylformamide is added anhydrous pyridine and methanesulfonyl chloride. The mixture is allowed to remain at room temperature for 18 hours. The solution is then cooled to 0° and rendered alkaline by the addition of saturated sodium bicarbonate solution. The mixture is taken up in water, extracted with chloroform and the chloroform extract washed several times with water. Removal of the chloroform in vacuo furnishes methyl 14-methyl-3,3-ethylenedioxy-A-nor - $\Delta^{6,9(11)}$ - androstadiene-15-one-17β-carboxylate.

*Example 104.—Methyl 14-methyl-A-nor-$\Delta^{6,9(11)}$-androstadiene-3,15-dione-17β-carboxylate*

A solution of methyl 14-methyl-3,3-ethylenedioxy-A-nor-$\Delta^{6,9(11)}$-androstadiene-15-one-17β-carboxylate in 80% glacial acetic acid is allowed to stand at room temperature for 2 hours. After removal of the solvents in vacuo at room temperature the residue is recrystallized from methanol. It represents the pure methyl 14-methyl-A-nor-$\Delta^{6,9(11)}$-androstadiene-3-15-dione-17β-carboxylate.

*Example 105.—Methyl 14α-methyl-A-nor-$\Delta^{5,9(11)}$-androstadiene-3,15-dione-17β-carboxylate*

A solution of methyl 14α-methyl-3,3-ethylenedioxy-A-nor-$\Delta^{6,9(11)}$-androstadiene-15-one-17β-carboxylate in 1.13 N perchloric acid in methyl alcohol is heated under reflux on the steam bath for 4 hours. After cooling the mixture is neutralized with sodium bicarbonate, extracted with chloroform and the chloroform extract washed with water. Evaporation of the sodium sulfate dried solution in vacuo yields the desired methyl 14-methyl-A-nor-$\Delta^{5,9(11)}$-androstadiene-3,15-dione - 17β - carboxylate as a crystalline residue.

*Example 106.—14-methyl-A-nor-5β-androstane-3,11,15-trione-17β-carboxylic acid chloride*

To a suspension of vacuum-dried 14-methyl-A-nor-5β-androstane-3,11,15-trione-17β-carboxylic acid in anhydrous benzene is added with stirring redistilled oxalyl chloride. After 30 minutes all the acid has dissolved and the solution is allowed to remain at room temperature for an additonal 40 minutes. Upon removal of the solvent in vacuo there remains a crystalline solid to which is added anhydrous benzene and the latter removed again in vacuo, thus yielding 14-methyl-A-nor-5β-androstane-3,11,15-trione-17β-carboxylic acid chloride.

*Example 107.—14-methyl-3,3-ethylenedioxy-A-nor-$\Delta^6$-androstene-11,15-dione-17β-carboxylic acid chloride*

To a solution of 14-methyl-3,3-ethylenedioxy-$\Delta^6$-androstene-11,15-dione-17β-carboxylic acid in anhydrous benzene is added oxalyl chloride. Evolution of carbon monoxide and carbon dioxide occurs and the reaction is allowed to proceed at room temperature for ½ hour when the evolution of gas has subsided. Evaporation of the solvent in vacuo under strictly anhydrous conditions leaves the crude 14-methyl-3,3-ethylenedioxy-A-nor-$\Delta^6$-androstene-11,15-dione-17β-carboxylic acid chloride.

*Example 108.—Sodium 14-methyl-3-isopropylidene-A-nor-5α-androstane-11,15-dione-17β-carboxylate*

14-methyl-3-isopropylidene-A-nor - 5α - androstane-11,15-dione-17β-carboxylic acid is dissolved carefully in .1 N sodium hydroxide. When all the material has gone into solution the pH has reached 8.0. The solution is then diluted with water, lyophilized and subsequently dried at 110° in high vacuum, yielding the sodium 14-methyl-3-isopropylidene-A-nor-5α - androstane-11,15-dione-17β-carboxylate.

*Example 109.—14-methyl-3-isopropylidene-A-nor-5α-androstane-11,15-dione-17β-carboxylic acid chloride*

To an ice-cold suspension of sodium 14-methyl-3-isopropylidene-A-nor-5α-androstane-11,15-dione - 17β - carboxylate in sodium-dried benzene and anhydrous pyridine is added oxalyl chloride. The mixture is allowed to remain at 0° for 2 minutes, is then warmed up to near room temperature for 5 minutes and the solvents removed in vacuo. The residual solids are taken up in dry benzene, centrifuged from sodium chloride and the clear supernate evaporated to dryness in vacuo leaving the crystalline 14-methyl-3-isopropylidene-A-nor - 5α - androstane-11,15-dione-17β-carboxylic acid chloride.

*Example 110.—14-methyl-21-diazo-A-nor-5β-pregnane-3, 11,15,20-tetraone*

A solution of 14-methyl-A-nor-5β-androstane-3,11,15-trione-17β-carboxylic acid chloride in anhydrous benzene is added at 0° to 45 ml. of a concentrated distilled solution of diazomethane in ether. The mixture is allowed to warm up to room temperature and after a total reaction time of 1½ hours, it is filtered from flocculent polymethylene and evaporated to dryness in vacuo. The resulting crystalline residue is recrystallized from methanol and furnishes the pure 14-methyl-21-diazo-A-nor-5β-pregnane-3,11,15,20-tetraone.

*Example 111.—21-diazo-14-methyl-3,3-ethylenedioxy-A-nor-$\Delta^6$-pregnene-11,15,20-trione*

A solution of 14-methyl-3,3-ethylenedioxy-A-nor-$\Delta^6$-androstene-11,15-dione-17β-carboxylic acid chloride in anhydrous benzene is added to a twice distilled solution of diazomethane at 0°. The reaction is allowed to remain at 0° for 2 hours, after which time the solvents are removed in vacuo, yielding the 21-diazo-14-methyl-3,3-ethylenedioxy-A-nor-$\Delta^6$-pregnene-11,15,20-trione.

*Example 112.—4,4,14-trimethyl-17β-hydroxymethyl-5α-androstane-3β,11β,15α-triol*

A solution of methyl 4,4,14-trimethyl-3β,15α-diacetoxy-5α-androstane-11-one-17β-carboxylate and lithium aluminum hydride in freshly distilled tetrahydrofuran is heated under reflux for 2 hours. After the decomposition of excess lithium aluminum hydride by the addition of saturated sodium sulfate solution, the mixture is extracted with chloroform, the chloroform extract washed with water, dried over sodium sulfate and evaporated to dryness in vacuo. The residual material on recrystallization from methane gives the analytically pure 4,4,14-trimethyl-17β-hydroxymethyl-5α-androstane-3β,11β-15α-triol.

*Example 113.—14-methyl-21-chloro-A-nor-5β-pregnane-3,11,15,20-tetraone*

To a solution of 14-methyl-21-diazo-A-nor-5β-pregnane-3,11,15,20-tetraone was added at 0° a saturated solution of hydrogen chloride in chloroform. The mixture is allowed to remain at 0° for 20 minutes after which time it was extracted with dilute sodium bicarbonate. The chloroform extract is dried over sodium sulfate, evaporated to dryness and the residual crystals recrystallized from methanol. They represent the pure 14-methyl-21-chloro-A-nor-5β-pregnane-3,11,15,20-tetraone.

*Example 114.—14-methyl-21-fluoro-A-nor-5β-pregnane-3,11,15,20-tetraone*

To a mixture of anhydrous hydrogen fluoride and tetrahydrofuran maintained at —20° is added 14-methyl-21-diazo-A-nor-5β-pregnane-3,11,15,20-tetraone and the solution allowed to warm up to 0° and to remain at that temperature for 6 hours. The mixture is then diluted with chloroform and the chloroform extract neutralized with concentrated sodium bicarbonate solution, washed with water and dried over sodium sulfate. Evaporation of the solvent in vacuo furnishes 14-methyl-21-fluoro-A-nor-5β-pregnane-3,11,15,20-tetraone which may then be purified by recrystallization from methanol.

*Example 115.—14-methyl-21-chloro-A-nor-$\Delta^5$-pregnene-3,11,15,20-tetraone*

To a solution of 21-diazo-14-methyl-3,3-ethylene-dioxy-A-nor-$\Delta^6$-pregnene-11,15,20-trione in chloroform is added at 0°, 1 ml. of a solution of hydrogen chloride saturated at 0°. The mixture turns yellow immediately and then pales. After 15 minutes at 0°, the solution is neutralized with sodium bicarbonate, extracted with chloroform and the chloroform extract washed with water and dried over sodium sulfate. Evaporation of the solvent in vacuo yields the pure 14-methyl-21-chloro-A-nor-Δ⁵-pregnene-3,11,15,20-tetraone.

Similarly, substituting hydrogen bromide, hydrogen fluoride or a limited amount of hydrogen iodide for the hydrogen chloride of Example 115 yields 14-methyl-21-bromo-A-nor-Δ⁵-pregnene-3,11,15,20-tetraone, 14-methyl-21-fluoro-A-nor-Δ⁵-pregnene-3,11,15,20-tetraone and 14-methyl-21-iodo-A-nor-Δ⁵-pregnene - 3,11,15,20 - tetraone, respectively.

*Example 116.—14-methyl-3-isopropylidene-A-nor-5α-pregnane-11,15,20-trione*

A solution of 14-methyl - 3 - isopropylidene-A-nor-5α-androstane-11,15-dione-17β-carboxylic acid chloride in absolute benzene is added to an ethereal solution of dimethyl cadmium prepared from cadmium chloride and methyl magnesium bromide formed in turn by the reaction of magnesium with methyl bromide. The reaction mixture is refluxed for 1 hour and after cooling the excess of dimethyl cadmium is destroyed by the addition of 10% acetic acid. Chloroform is added, the layers are separated and the chloroform extract dried over sodium sulfate. Evaporation of the solvent in vacuo leaves the 14-methyl-3-isopropylidene-A-nor-5α-pregnane-11,15,20-trione as a crystalline solid.

*Example 117.—14-methyl-A-nor-5β-pregnane-3,11,15,20-tetraone*

To a solution of 14-methyl-21-diazo-A-nor-5β-pregnane-3,11,15,20-tetraone in chloroform is added under a blanket of carbon dioxide freshly distilled aqueous hydriodic acid. The mixture is thoroughly mixed by shaking for 3 minutes at room temperature, poured into water and chloroform and the chloroform solution extracted with dilute sodium bicarbonate with the aid of a small amount of sodium bisulfite. The chloroform extract is then washed with water, dried over sodium sulfate and evaporated to dryness in vacuo. The 90 mg. of obtained residue crystallizes readily from methanol and furnishes pure 14-methyl-A-nor-5β-pregnane-3,11,15,20-tetraone.

*Example 118.—14α-methyl-A-nor-5α-pregnane-3,11,20-trione*

A solution of 14-methyl - 3 - isopropylidene-A-nor-5α-pregnane-11,15,20-dione in chloroform is ozonized in accordance with procedure of Example 86. The resulting 14α-methyl-A-nor-5α-pregnane-3,11,15,20-tetraone is obtained in crystalline form.

*Example 119.—14-methyl-A-nor-5β-pregnane-3,11,15,20-tetraone*

14-methyl-A-nor-5α-pregnane-3,11,15,20-trione is isomerized by treatment with 0.02 NaOH, in accordance with the procedure set forth in Example 87, thus yielding 14-methyl-A-nor-5β-pregnane-3,11,15,20-tetraone.

*Example 120.—14-methyl-A-nor-Δ⁵-pregnene-3,11,15,20-tetraone*

A solution of 21-diazo-14-methyl-3,3-ethylene-dioxy-A-nor-Δ⁶-pregnene-11,15,20-trione in chloroform is shaken vigorously for 5 minutes with redistilled constant boiling hydrogen iodide solution with the exclusion of air. The resulting mixture is poured into dilute sodium bicarbonate solution and the steroid extracted with chloroform. The chloroform extract is washed with dilute sodium bisulfite solution and water, dried over sodium sulfate and evaporated to dryness in vacuo. The residual crystalline material obtained, on recrystallization from methanol furnishes the pure 14-methyl-A-nor-Δ⁵-pregnene-3,11,15,20-tetraone.

*Example 121.—14-methyl-A-nor-5β-pregnane-21-ol-3,11,15,20-tetraone 21-acetate*

A solution of 14-methyl-21-diazo-A-nor-5β-pregnane-3,11,15,20-tetraone in glacial acetic acid is heated on the steam bath for ½ hour. Water and chloroform are added and the resulting chloroform extract washed with sodium bicarbonate and water, dried over sodium sulfate and the solvent evaporated to dryness in vacuo. The residual crystals obtained after recrystallization from methanol, furnishes the pure 14-methyl-A-nor-5β-pregnane-21-ol-3,11,15,20-tetraone 21-acetate.

Similarly, substituting propionic acid, butyric acid or other fatty acids for the acetic acid employed in the practice of Example 121, there are obtained the corresponding propionic, butyric and other esters, of 14-methyl-A-nor-5β-pregnane-21-ol-3,11,15,20-tetraone.

*Example 122.—14-methyl-A-nor-5β-pregnane-21-ol 3,11,15,20-tetraone 21-actate*

A solution of 14-methyl-21-chloro-A-nor-5β-pregnane-3,11,15,20-tetraone, potassium iodide and anhydrous potassium acetate in acetone containing acetic acid in acetone is refluxed for 20 hours. After cooling, the mixture is diluted with water, the bulk of the acetone removed in vacuo and the resulting crystalline suspension extracted with chloroform. The chloroform extract is dried over sodium sulfate and evaporated to dryness in vacuo. The resulting residue upon crystallization from methanol furnishes the pure 14-methyl-A-nor - 5β - pregnane - 21 - ol-3,11,15,20-tetraone 21-acetate.

Similarly, replacing the potassium acetate employed in the practice of Example 122 by the potassium salt of other fatty acids, such as potassium proprionate or potassium butyrate, there are obtained the corresponding fatty acid esters of 14-methyl-A - nor - 5β - pregnane - 21 - ol-3,11,15,20-tetraone.

*Example 123.—14-methyl-A-nor-5β-pregnane-21-ol-3,11,15,20-tetraone*

To a solution of 14-methyl-A-nor-5β-pregnane-21-ol-3,11,15,20-tetraone-21-acetate in methanol is added, with stirring, under nitrogen, 10% oxygen-free potassium carbonate. After 2 hours at room temperature glacial acetic acid is added and after the addition of water, the methanol is removed in vacuo. The mixture is then extracted with chloroform, the chloroform extract washed with water, dried over sodium sulfate and evaporated to dryness in vacuo. The resulting crystalline 14-methyl-A-nor-5β-pregnane-21-ol-3,11,15,20-tetraone is recrystallized from acetone-hexane.

*Example 124.—14-methyl-5α-bromo-A-norpregnane-3,11,15,20-tetraone*

To a solution of 14 - methyl - A - nor - 5β - pregnane-3,11,15,20-tetraone in glacial acetic acid is added first 6% hydrogen bromide in glacial acetic acid followed by the dropwise addition of a solution containing bromine and anhydrous sodium acetate in glacial acetic acid. Bromination is complete after 30 minutes. The mixture is then diluted with water, extracted with chloroform and the chloroform extract washed with dilute sodium bicarbonate and water. The chloroform extract is dried over sodium sulfate and taken to dryness in vacuo. Crystallization of the resulting residue from methanol yields the pure 14-methyl-5α-bromo-A-norpregnane-3,11,15,20-tetraone.

*Example 125.—14-methyl-5-bromo-21-chloro-A-norpregnane-3,11,15,20-tetraone*

A solution of 14-methyl-21-chloro-A-nor-5β-pregnane-3,11,15,20-tetraone in glacial acetic acid is brominated as set forth in Example 124. A bromine-sodium acetate solution is required and the total reaction time is 1 hour. Crystalline material is obtained, which is then separated into the two epimers (i.e., 5α-bromo and 5β-bromo) by crystallization from chloroform-methanol. The first crop represents the essentially pure 14-methyl-5α-bromo-21-chloro-A-norpregnane-3,11,15,20-tetraone.

Concentration of the methanolic mother liquor furnishes additional crystalline material which, after recrystallization from methanol, represents the essentially pure 14-methyl-5β-bromo-21 - chloro - A - nor-pregnane-3,11,15,20-tetraone.

*Example 126.—14-methyl-5-bromo-A-norpregnane-21-ol-3,11,15,20-tetraone 21-acetate*

14-methyl-A-nor-5β-pregnane-21-ol-3,11,15,20-tetraone 21-acetate is brominated in glacial acetic acid with bromine-sodium acetone solution. The total reaction time is 45 minutes. The crystalline reaction product on recrystallization from methanol furnishes the 14-methyl-5α-bromo-A-norpregnane-21-ol - 3,11,15,20 - tetraone 21-acetate as the more insoluble product. After recrystallization from methanol, the pure 14-methyl-5α-bromo-A-norpregnane-21-ol-3,11,15,20-tetraone 21-acetate is obtained.

Concentration of the methanol mother liquors furnishes additional material which on recrystallization from methanol yields the essentially pure 14-methyl-5β-bromo-A-norpregnane-21-ol-3,11,15,20-tetraone 21-acetate.

*Example 127.—14-methyl-A-nor-$\Delta^5$-pregnene-3,11,15,20-tetraone*

A solution of 14-methyl-5α - bromo - A - norpregnane-3,11,15,20-tetraone and lithium bromide in dimethylformamide is heated on the steam bath for 2 hours. The mixture is then cooled, diluted with water and extracted with chloroform. The chloroform extract is washed with water, dried over sodium sulfate and evaporated to dryness in vacuo. The residual crystals on recrystallization from methanol furnish the pure 14-methyl-A-nor-$\Delta^5$-pregnene-3,11,15,20-tetraone.

*Example 128.—14-methyl-21-chloro-A-nor-$\Delta^5$-pregnene-3,11,15,20-tetraone*

A solution of 14-methyl-5α-bromo-21-chloro-A-norpregnane-3,11,15,20-trione and lithium chloride in dimethylformamide are heated on the steam bath for 2 hours. The cooled mixture is diluted with chloroform, extracted with water and the resulting chloroform extract dried over sodium sulfate and evaporated to dryness in vacuo. The crystalline residue after recrystallization from methanol furnishes the pure 14-methyl-21-chloro-A-nor-$\Delta^5$-pregnene-3,11,15,20-tetraone.

*Example 129.—14-methyl-A-nor-$\Delta^5$-pregnene-21-ol-3,11,15,20-tetraone 21-acetate*

A solution of 14-methyl-21-chloro-A-nor-$\Delta^5$-pregnene-3,11,15,20-tetraone, potassium iodide and anhydrous potassium acetate in acetone containing glacial acetic acid acetone is heated to reflux for 20 hours. The mixture is taken up in water, distilled in vacuo until most of the acetone has been removed and the steroid extracted with chloroform. The chloroform solution is washed with water, dried over sodium sulfate and evaporated to dryness in vacuo. The crystalline residue on recrystallization from acetone-hexane furnishes the pure 14-methyl-A-nor-$\Delta^5$-pregnene-21-ol-3,11,15,20-tetraone 21-acetate.

*Example 130.—3β,15α,21-triacetoxy-4,4,14α-trimethyl-$\Delta^8$-5α-pregnene-20-one*

The 3β,15α,21-triacetoxy-$\Delta^{8,20(22),23}$-lanostatriene is dissolved in ethyl acetate and ozonized at —25° with 3 mole equivalents of ozone. To the resulting solution are added at room temperature a few drops of acetic acid and then portionwise a total of 1 g. of zinc dust until a negative starch iodide test is observed, which requires about 3 hours. The mixture is then filtered, washed with a saturated salt solution, dried over sodium sulfate and evaporated to dryness in vacuo. A crystalline residue is obtained, which on recrystallization from methanol yields 3β,15α,21-triacetoxy-4,4,14α-trimethyl-$\Delta^8$ - 5α - pregnene-20-one.

*Example 131.—3β,15α,21-triacetoxy-4,4,14α-trimethyl-$\Delta^8$-5α-pregnene-7,11,20-trione*

A solution of 3β,15α,21-triacetoxy-4,4,14α-trimethyl-$\Delta^8$-5α-pregnene-20-one in glacial acetic acid is maintained at a temperature of 77–78°. Into this solution is slowly stirred a solution of chromium trioxide in glacial acetic acid over a 20-minute period. After allowing the stirred mixture to react for 25 minutes, it is cooled to room temperature, the bulk of the glacial acetic acid is removed in vacuo and the residue is taken up in water and chloroform. The chloroform extract is then washed three times with water, dried over sodium sulfate and the solvent removed in vacuo. The residue is readily crystallized from methanol to furnish 3β,15α,21-triacetoxy-4,4,14α-trimethyl-$\Delta^8$-5α-pregnene-7,11,20-trione.

*Example 132.—3β,15α-diacetoxy-21-hydroxy-4,4,14α-trimethyl-$\Delta^8$-5α-pregnene-7,11,20-trione*

To a solution 3β,15α,21-triacetoxy-4,4,14α-trimethyl-$\Delta^8$-5α-pregnene-7,11,20-trione in methanol is stirred in under nitrogen, oxygen-free potassium carbonate. After storage at room temperature for 2 hours, glacial acetic acid is added. After the addition of 10 ml. of water, the methanol is removed in vacuo. The mixture is then extracted with chloroform, the chloroform extract is washed with water, dried over sodium sulfate and evaporated to dryness in vacuo. The resulting crystalline residue after recrystallization from methanol furnishes the pure 3β,15α-diacetoxy-21-hydroxy-4,4,14α-trimethyl-$\Delta^8$-5α - pregnene-7,11,20-trione.

*Example 133.—3β,15α-diacetoxy-4,4,14α-trimethyl-$\Delta^8$-5α-pregnene-20-one*

A. *3β,15α-diacetoxy-21-hydroxy-4,4,14α-trimethyl - $\Delta^8$-5α-pregnene-20-one.*—To a solution of 3β,15α,21-triacetoxy-4,4,14α-trimethyl-$\Delta^8$-5α-pregnene-20-one in methanol is added with stirring under nitrogen oxygen-free potassium carbonate. After 2 hours at room temperature glacial acetic acid is added and after the addition of water the methanol is removed in vacuo. The mixture is extracted with chloroform, the chloroform extract washed with water, dried over sodium sulfate and evaporated to dryness in vacuo. The resulting crystalline residue after recrystallization from methanol furnishes the pure 3,15-diacetate.

B. *3β,15α-diacetoxy-21-mesyloxy - 4,4,14α - trimethyl-$\Delta^8$-5α-pregnene-20-one.*—To a solution of the 3β,15-diacetate (Part A) in anhydrous pyridine is added at 0° methanesulfonyl chloride in chloroform. The reaction is allowed to remain at 0° for 2¾ hours, after which it is stopped by the addition of a small amount of ice. Chloroform and water are added and after separation of the phases, the chloroform solution is washed with dilute sulfuric acid, water and then with dilute sodium bicarbonate keeping the extract cool at all times. The chloroform extract is dried over sodium sulfate, filtered and evaporated to dryness in vacuo leaving the 21-mesylate as a crystalline residue.

C. *3β,15-diacetoxy-21-iodo-4,4,14α - trimethyl - $\Delta^8$-5α-pregnene-20-one.*—A solution of the 21-mesylate (Part B) and sodium iodide in acetone is refluxed for 10 minutes on the steam bath. Water is added and the mixture is extracted with chloroform. The chloroform extract is washed with water, dried over sodium sulfate and the solvent removed in vacuo. The dry residue represents the 21-iodo compound.

D. *3β,15α-diacetoxy-4,4,14α-trimethyl-$\Delta^8$ - 5α - pregnene-20-one.*—To a solution of the iodo compound (Part C) in dioxane is added a sodium bisulfate solution and the resulting mixture refluxed for 1 hour on the steam cone. Water and chloroform are added and after separation of the layers, the chloroform phase is washed with water, dried over sodium sulfate and evaporated to dryness in vacuo. The residual crystalline material on recrystallization from methanol furnishes the pure pregnene derivative.

*Example 134.—3β,15α-diacetoxy-4,4,14α-trimethyl-$\Delta^8$-5α-pregnene-7,11,20-trione*

Following the procedure of Example 131, but substituting 3β,15α-diacetoxy-4,4,14α-trimethyl-$\Delta^8$-5α-pregnene-20- one for the 3β,15α,21-triacetoxy-4,4,14α-trimethyl-Δ⁸-5α-pregnene-20-one, 3β,15α-diacetoxy-4,4,14α-trimethyl - Δ⁸-5α-pregnene-7,11,20-trione is obtained.

*Example 135.—3β,15α,21-triacetoxy-4,4,14α-trimethyl-5α-pregnane-7,11,20-trione*

Zinc dust is added portionwise, over a 15-minute period, to a solution of 3β,15α,21-triacetoxy-4,4,14α-trimethyl-Δ⁸-5α-pregnene-7,11,20-trione in glacial acetic acid maintained at 75–85°. The solution is allowed to remain at that temperature for a total of 30 minutes, then cooled, filtered and the solution concentrated to a small volume. Water is added to the mixture which is then extracted with chloroform. The extract is successively washed with water, sodium carbonate and again with water. The washed extract is then dried over sodium sulfate and evaporated to dryness in vacuo. The material is readily crystallized from methanol and consists of 3β,15α,21-triacetoxy-4,4,14α-trimethyl-5α-pregnane-7,11,20-trione.

*Example 136.—3β,15α-diacetoxy-4,4,14α-trimethyl-5α-pregnane-7,11,20-trione*

Following the procedure of Example 135, but substituting 3β,15α-diacetoxy-4,4,14α-trimethyl-Δ⁸-5α-pregnene-7,11,20-trione for the 3β,15α,21-triacetoxy-4,4,14α-trimethyl-Δ⁸-5α-pregnene-7,11,20-trione, 3β,15α-diacetoxy-4,4,14α-trimethyl-5α-pregnane-7,11,20-trione is obtained.

*Example 137.—3β,15α-diacetoxy-21-hydroxy-4,4,14α-trimethyl-5α-pregnane-7,11,20-trione*

Following the procedure of Example 132, but substituting 3β,15α,21-triacetoxy-4,4,14α-trimethyl-5α-pregnane-7,11,20-trione, for the 3β,15α,21-triacetoxy-4,4,14α-trimethyl-Δ⁸-5α-pregnene-7,11,20-trione, 3β,15α-diacetoxy-21 - hydroxy - 4,4,14α - trimethyl - 5α - pregnane-7,11,20-trione is obtained.

*Example 138.—3,15,21-trihydroxy-4,4,14α-trimethyl-5α-pregnane-7,11,20-trione*

A solution of the triacetate obtained in Example 135 in oxygen-free 1 N ethanolic KOH is allowed to stand at room temperature for 19 hours with the exclusion of air. At the end of this period, the solution is neutralized with 1 N sulfuric acid, diluted with H₂O, the ethanol removed in vacuo and the aqueous suspension extracted with CCl₄. The CCl₄ extract is dried over sodium sulfate and evaporated to dryness in vacuo. There remains a crystalline residue, which after recrystallization from acetone furnishes 3β,15α,21-trihydroxy-4,4,14α-trimethyl-5α-pregnane-7,11,20-trione.

*Example 139.—3β,15α-dihydroxy-21-acetoxy-4,4,14α-trimethyl-5α-pregnane-7,11,20-trione*

The triol obtained in Example 138 is monoacylated with 1 ml. of a solution containing acetic anhydride in pyridine (1.1 mole equivalent of acetic anhydride) at room temperature for 18 hours. The reagents are evaporated in vacuo and the crystalline residue is recrystallized from methanol. After two crystallizations 3β,15α-dihydroxy - 21 - acetoxy - 4,4,14α - trimethyl - 5α - pregnane-7,11,20-trione is obtained.

*Example 140.—21-acetoxy-4,4,14α-trimethyl-5α-pregnane-3,7,11,15,20-pentaone*

A solution of the 21-acetate obtained in Example 139 in acetone is oxidized with a solution containing chromium trioxide and concentrated sulfuric acid in 90% aqueous acetone. The reaction is allowed to proceed for 15 minutes when excess chromium trioxide is decomposed by the addition of methanol. Water and chloroform are added and the chloroform extract washed with water, dried over sodium sulfate and evaporated to dryness, yielding 21-acetoxy-4,4,14α-trimethyl-5α-pregnane-3,7,11,15,20-pentaone.

*Example 141.—3β,15α-dihydroxy-4,4,14α-trimethyl-5α-pregnane-7,11,20-trione*

A solution of the pregnane 3,15-diacetate from Example 136 of oxygen-free 1 N ethanolic KOH is allowed to stand at room temperature for 19 hours with the exclusion of air. At the end of this period the solution is neutralized with 1 N sulfuric acid, diluted with water, the ethanol removed in vacuo and the aqueous suspension extracted with chloroform. The chloroform extract is dried over sodium sulfate and evaporated to dryness in vacuo. There remains a crystalline residue, which after recrystallization from acetone furnishes analytically pure 3β,15α-dihydroxy-4,4,14α-trimethyl-5α-pregnane-7,11,20-trione.

*Example 142.—4,4,14α-trimethyl-5α-pregnane-3,7,11,15,20-pentaone*

To a solution of the pregnane-3,15-diol of Example 141 in reagent grade acetone is added with stirring a solution containing chromium trioxide and sulfuric acid in 90% aqueous acetone. The reaction is allowed to proceed for 15 minutes after which time it is stopped by the addition of a few drops of 95% ethanol. Water is added and the steroid extracted with chloroform. The chloroform extract is dried over sodium sulfate and evaporated to dryness in vacuo. There remains a crystalline residue which, after recrystallization from acetone produces 4,4,14α - trimethyl - 5α - pregnane - 3,7,11,15,20 - pentaone. The invention may be variously otherwise embodied within the scope of the appended claims.

What is claimed is:

1. A compound selected from the group consisting of steroids of the formulae

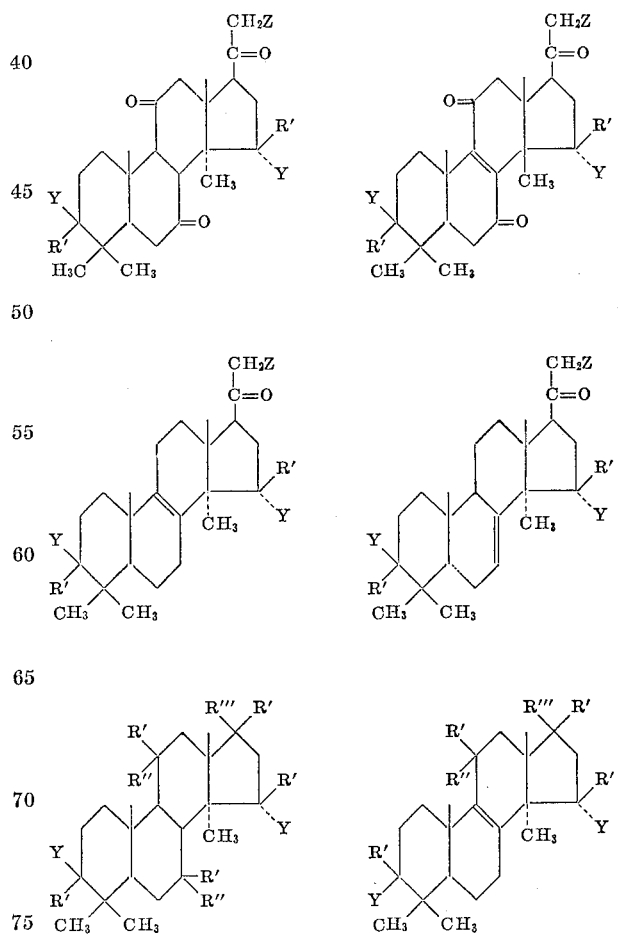

3,271,390

81

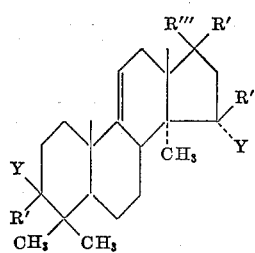
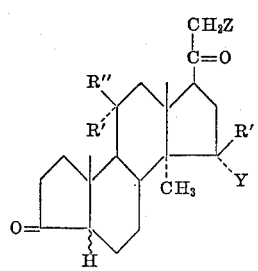

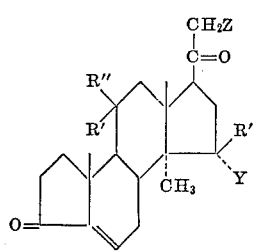
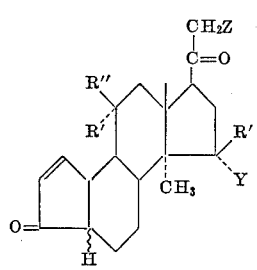

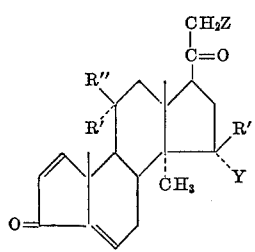
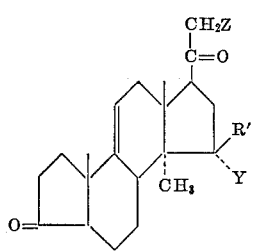

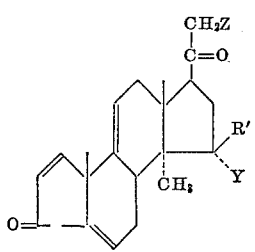
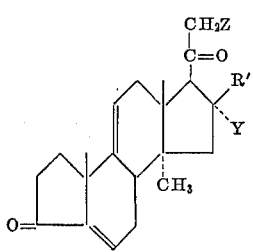

an unsaturated double bond in the 1,2-position
and

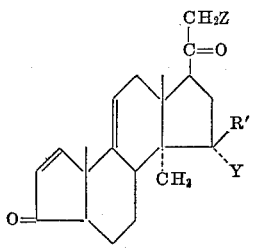

wherein R' is hydrogen; each Y is selected from the group consisting of hydroxy and acyloxy; and together Y and R' is oxo (O=); each R'' is selected from the group consisting of hydrogen and hydroxy; and together R' and R'' is oxo (O=); R''' is selected from the group consisting of hydroxy, acyloxy and alkanoyloxy; and together R' and R''' is oxo (O=); and Z is selected from the group consisting of hydrogen, hydroxy, halogen and acyloxy.

2. Sulfurenic acid.

82

3. A compound selected from the group consisting of steroids of the formula

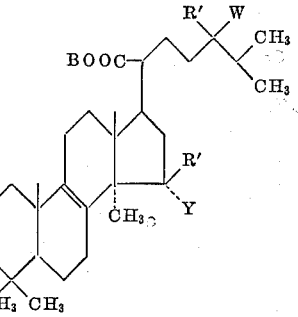

wherein each R' is hydrogen; each Y is selected from the group consisting of hydroxy and acyloxy; and together R' and Y is oxo (O=); W is selected from the group consisting of hydrogen and lower alkyl; and together W and R' is selected from the group consisting of lower alkenyl and oxo (O=); and B is selected from the group consisting of hydrogen and lower alkyl.

4. A compound selected from the group consisting of steroids of the formula

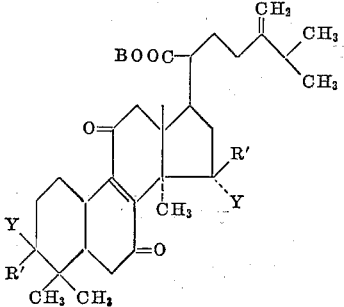

wherein Y, R' and B are as defined in claim 3.

5. A compound selected from the group consisting of steroids of the formulae

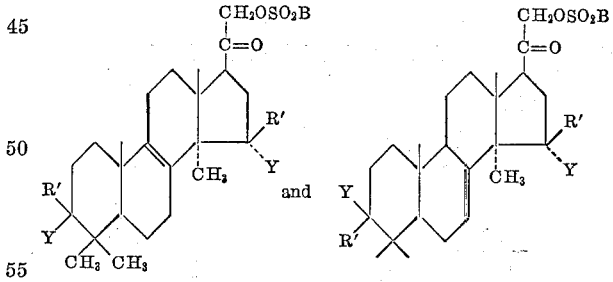

wherein R', Y and B are as hereinbefore defined.

6. A compound selected from the group consisting of steroids of the formulae

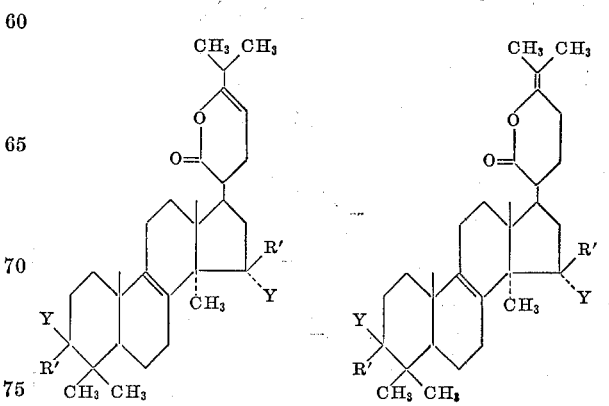

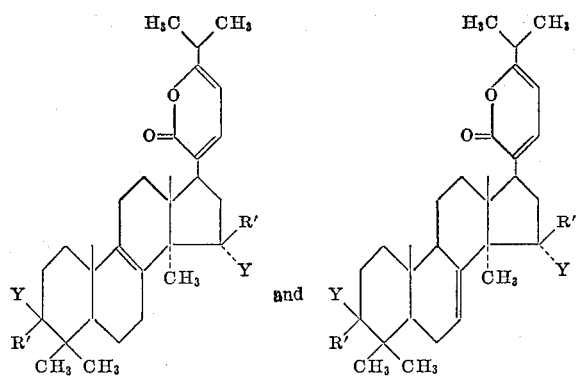

wherein Y and R' are as hereinbefore defined.

7. A compound selected from the group consisting of steroids of the formulae

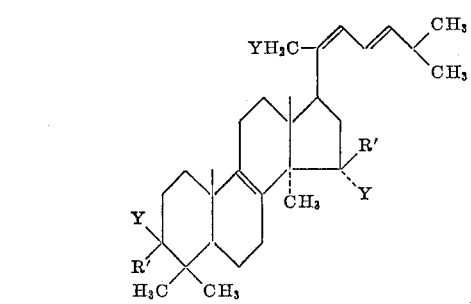

and

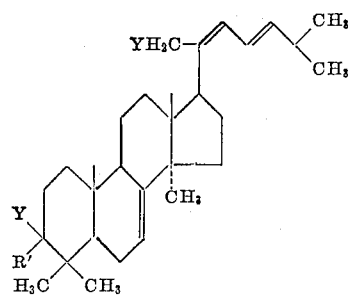

wherein Y and R' are as hereinbefore defined.

8. A compound selected from the group consisting of steroids of the formulae

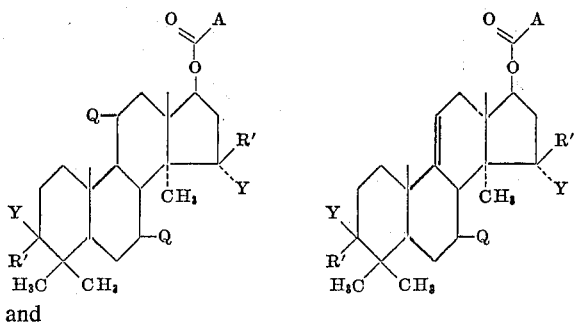

and

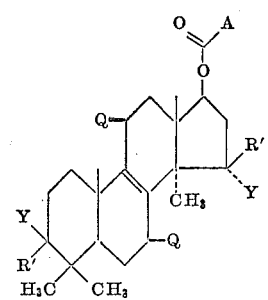

wherein each Q is selected from the group consisting of hydrogen and oxo (O=); A is alkyl; and Y and R' are as hereinbefore defined.

9. A compound selected from the group consisting of steroids of the formulae

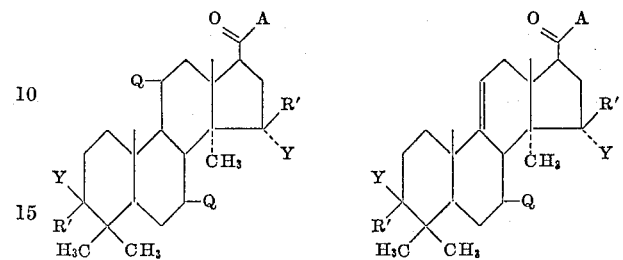

and

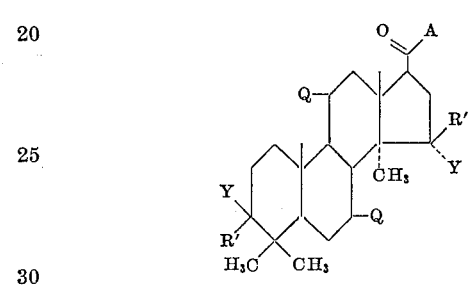

wherein Y, R', Q and A are as hereinbefore defined.

10. A compound selected from the group consisting of steroids of the formulae

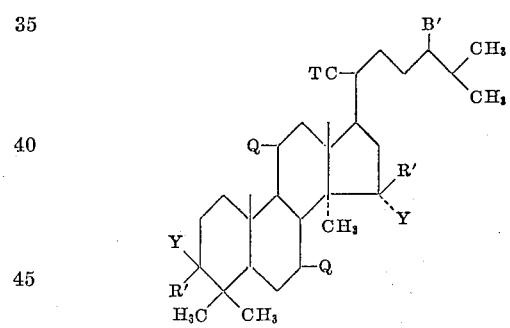

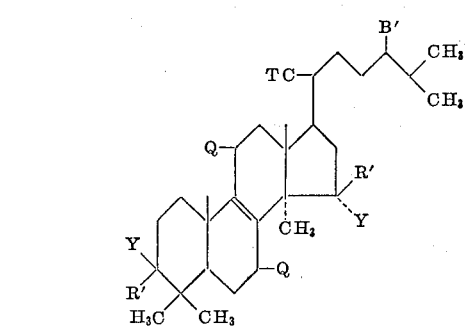

and

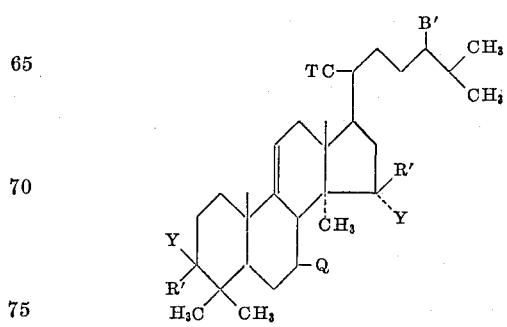

wherein T is selected from the group consisting of $$\overset{O}{\underset{H}{\|}} \text{ and } \overset{O}{\underset{A'}{\|}}$$

wherein A' is halogen; B' is selected from the group consisting of hydrogen, alkyl and alkenyl; and Y, R' and Q are as hereinbefore defined.

11. A compound selected from the group consisting of steroids of the formulae

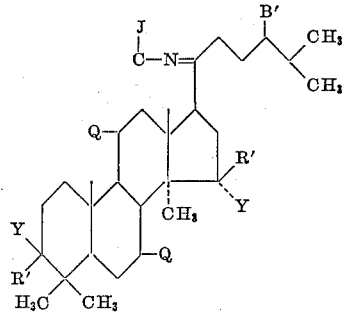

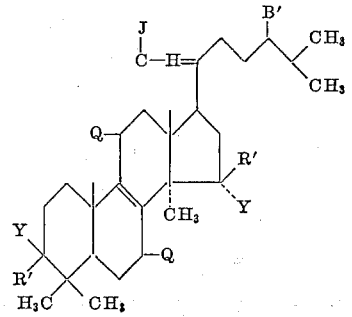

and

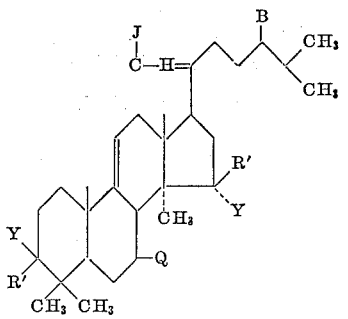

wherein J is selected from the group consisting of morpholyl, piperidyl and pyrrolidyl; and Y, R', B' and Q are as hereinbefore defined.

12. A compound selected from the group consisting of steroids of the formulae

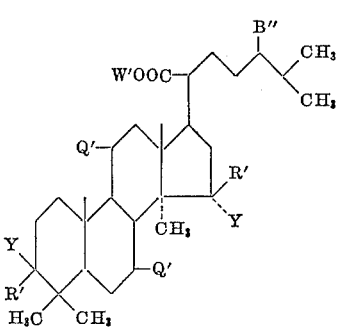

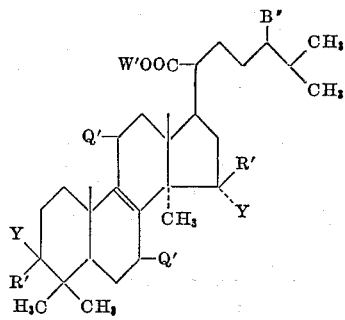

and

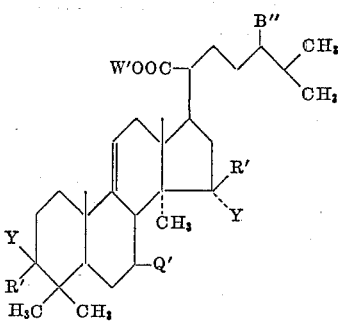

wherein each Q' is selected from the group consisting of hydrogen, dithioalkylene, and oxo (O=); W' is selected from the group consisting of hydrogen and lower alkyl; B" is selected from the group consisting of hydrogen, lower alkyl, alkenyl, dithioalkylene and oxo (O=); and Y and R' are as hereinbefore defined.

13. A compound selected from the group consisting of steroids of the formulae

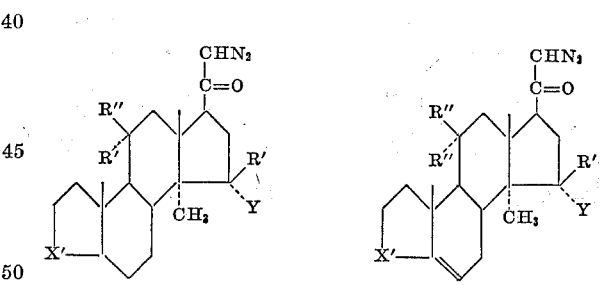

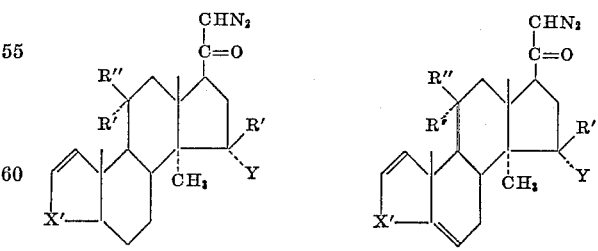

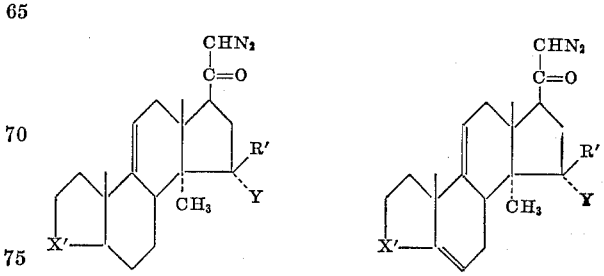

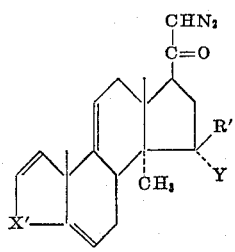 and 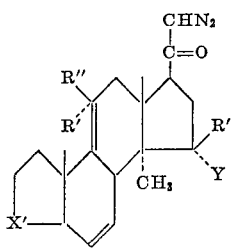

wherein X' together with the carbon atom in the 3 position is selected from the group consisting of keto, alkylenedioxy and alkylidene; and R', R" and Y are as hereinbefore defined.

14. A compound selected from the group consisting of steroids of the formulae

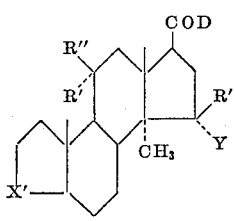 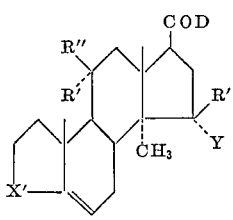

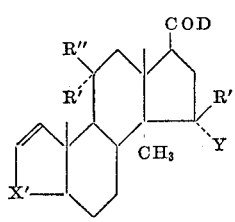 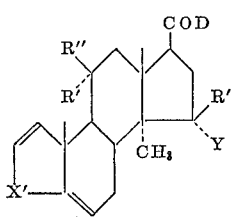

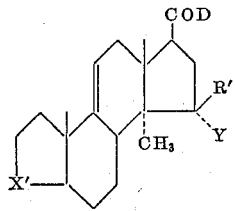 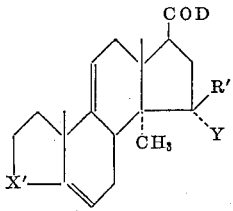

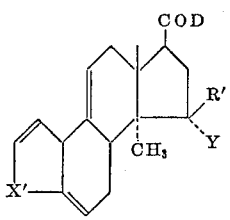 and 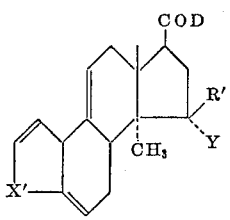

wherein D is selected from the group consisting of halogen, hydroxy and lower alkoxy; and R', R", Y and X' are as hereinbefore defined.

15. A compound of the formula

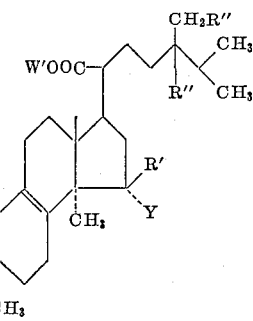

wherein W', Y, R' and R" are as hereinbefore defined.

16. A compound of the formula

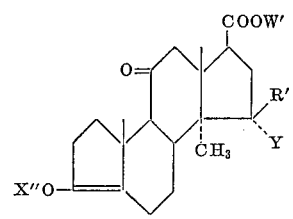

wherein X" is acyl and Y, R' and W' are as hereinbefore defined.

17. Methyl 3,15-diacetyl sulfurenate.
18. Diacetyl sulfurenic acid.
19. Methyl dihydrosulfurenate.
20. Methyl diacetyl dihydrosulfurenate.

No references cited.

ELBERT L. ROBERTS, *Acting Primary Examiner.*

UNITED STATES PATENT OFFICE
CERTIFICATE OF CORRECTION

Patent No. 3,271,390                              September 6, 1966

Josef Fried

It is hereby certified that error appears in the above numbered patent requiring correction and that the said Letters Patent should read as corrected below.

Column 1, insert commas between formulas I and II, formulas III and IV, formulas V and VI, formulas VII and VIII, and formulas IX and X; same column 1, formula V, for "$R''$", in the fifteenth position, read -- R --; same column 1, formula VI, for "$R''$", in the fifteenth position, read -- R --; column 2, formula XIV, change the saturated carbon bond in the 5,6-position to unsaturated; column 5, line 17, for "Initiallly" read -- Initially --; column 8, line 34, for "153-155ŏ" read -- 153-155° --; line 58, for "73.5°" read -- 83.5° --; column 10, line 57, for "tent" read -- tene --; column 11, formula $F'$, insert "----OY" in the fifteenth position; column 15, line 44, for "derivaives" read -- derivatives --; column 22, formula I, insert "$CH_2$" in the twenty-fourth position; formula $P''$, for "=OY", in the fifteenth position, read -- ----OY --; column 23, formula $T''$, for =C", in the seventh position, read -- =O --; column 26, line 67, for "alkylendithiol" read -- alkylenedithiol --; column 33, formula $Q'''$, for "LXIIc X=OH; Y=$CH_3$CO" read -- LXIIc Z=OH; Y=$CH_3$CO --; column 35, line 8, for "oxyalyl" read -- oxalyl --; column 36, formula $Z'''$, for "LXVIIb R=H; X=halide; Y=$CH_3$CO" read -- LXVIIb R=H; Z=halide; Y=$CH_3$CO --; column 44, formula $ZZ'''$, for "---OH" read -- ----OY --; column 47, formula LLL, for "---OH", in the fifteenth position, read -- ---OY --;

column 49, formula RRR, the formula should appear as shown below instead of as in the patent:

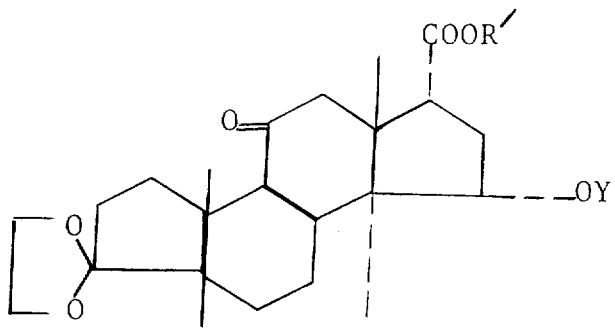

column 56, line 37, for "dyness" read -- dryness --; column 58, line 3, for "-12-" read -- -21- --; column 60, line 65, for "$(-\alpha)_B$" read -- $(-\alpha)_D$ --; line 66, for "5.75" read -- 5.78 --; column 63, line 9, for "-trio-" read -- -triol- --; column 64, line 32, before "diacetyl" insert -- 3,15- --; column 76, line 15, for "actate", in italics, read -- acetate --, in italics; column 80, insert commas between formulas I and II, formulas III and IV and formulas V and VI; column 81, insert commas between formulas I and II, formulas III and IV, formulas V and VI, and formulas VII and VIII; same column 81, line 53, strike out "an unsaturated double bond in the 1,2-position"; column 85, claim 11, the substituent at C-20, in each of the three formulae should appear as shown below instead of as in the patent:

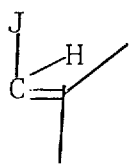

column 86, claim 13, insert commas between formulas I and II, formulas II and III, formulas III and IV, formulas IV and V, formulas V and VI, and after formula VI; column 87, claim 14, insert commas between formulas I and II, formulas II and III, formulas III and IV, formulas IV and V, formulas V and VI, and after formula VI.

Signed and sealed this 5th day of September 1967.

(SEAL)
Attest:

ERNEST W. SWIDER
Attesting Officer

EDWARD J. BRENNER
Commissioner of Patents